United States Patent
Ohkawara

(10) Patent No.: US 6,577,343 B2
(45) Date of Patent: *Jun. 10, 2003

(54) IMAGE PICKUP APPARATUS WITH LENS CONTROL APPARATUS AND FOCUSING LENS CONTROL

(75) Inventor: Hiroto Ohkawara, Toride (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,160

(22) Filed: Dec. 1, 1997

(65) Prior Publication Data

US 2002/0171751 A1 Nov. 21, 2002

(30) Foreign Application Priority Data

Dec. 3, 1996 (JP) ............................................. 08-322675
Dec. 27, 1996 (JP) ............................................. 08-350993

(51) Int. Cl.⁷ ......................... H04N 5/232; H04N 5/262
(52) U.S. Cl. .................. 348/347; 348/345; 348/240.99
(58) Field of Search ................................. 348/240, 345, 348/347, 358, 240.99, 240.1, 240.2, 240.3; 396/81, 85

(56) References Cited

U.S. PATENT DOCUMENTS

| | | | | |
|---|---|---|---|---|
| 5,200,860 A | * | 4/1993 | Hirasawa et al. | 396/81 |
| 5,223,981 A | * | 6/1993 | Kaneda | 396/81 |
| 5,323,200 A | * | 6/1994 | Hirasawa | 396/81 |
| 5,436,684 A | * | 7/1995 | Hirasawa | 396/81 |
| 5,933,187 A | * | 8/1999 | Hirasawa et al. | 348/347 |
| 5,956,528 A | * | 9/1999 | Tanaka | 348/347 |

* cited by examiner

Primary Examiner—Wendy R. Garber
Assistant Examiner—Luong Nguyen
(74) Attorney, Agent, or Firm—Robin, Blecker & Daley

(57) ABSTRACT

A lens control apparatus and an image pickup apparatus each of which, during a magnification varying operation in an inner focus type of lens system, predicts a destination position to be reached by a variator lens after a predetermined time period, calculates a speed at which to move a focusing lens to a correction position of a focal plane relative to the predicted position of the variator lens, and controls the focusing lens.

26 Claims, 35 Drawing Sheets

$$ax = ak - \frac{(Zk - Zx)(ak - ak\text{-}1)}{(Zk - Zk\text{-}1)}$$

$$bx = bk - \frac{(Zk - Zx)(bk - bk\text{-}1)}{(Zk - Zk\text{-}1)}$$

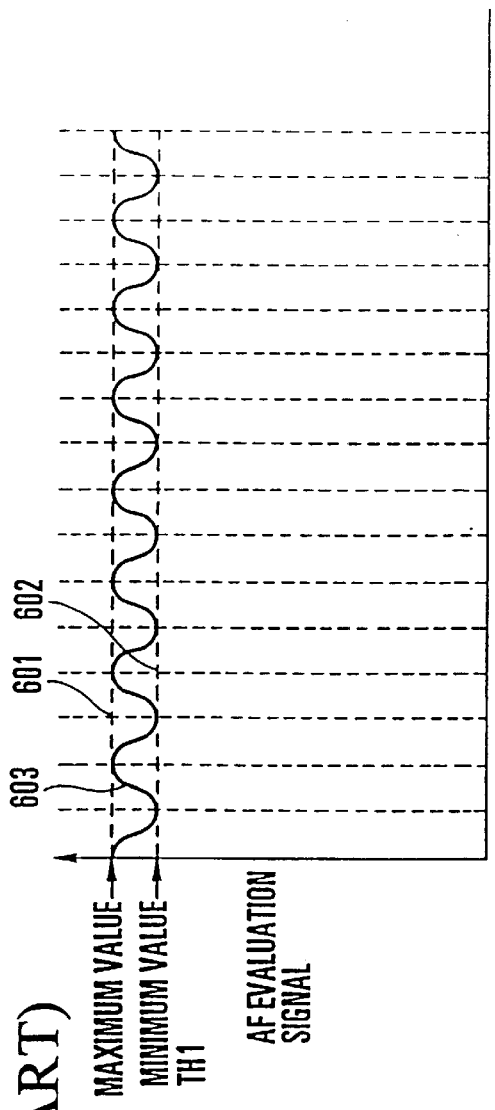
FIG. 6 (A) (PRIOR ART)
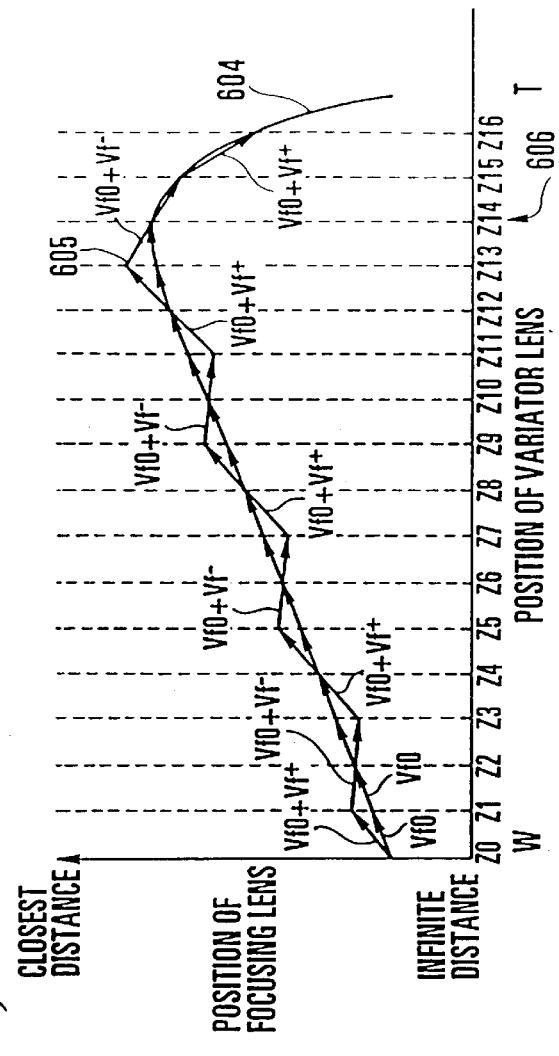
FIG. 6 (B) (PRIOR ART)

IMAGE PICKUP APPARATUS WITH LENS CONTROL APPARATUS AND FOCUSING LENS CONTROL

BACKGROUND OF THE INVENTION

1. Field of the Invention

The present invention relates to an image pickup apparatus such as a video camera and, more particularly, to an arrangement which is suitable for use in an apparatus using an inner focus type of lens system.

2. Description of Related Art

FIG. 2 is a view showing a simple arrangement of an inner focus type of lens system which has conventionally been used. The arrangement shown in FIG. 2 includes a fixed first lens group 101, a second lens group (variator lens) 102 for performing a magnification varying operation, an iris 103, a fixed third lens group 104, a fourth lens group (focusing lens) 105 having both a focus adjusting function and a so-called compensation function which compensates for a movement of a focal plane due to a magnification varying operation, and an image pickup element 106.

As is already known, in the lens system which is arranged as shown in FIG. 2, since the focusing lens 105 has both the compensation function and the focus adjusting function, the position of the focusing lens 105 for forming an in-focus image on an image pickup surface of the image pickup element 106 differs for different subject distances even in the case of the same focal length. If a variation in the position of the focusing lens 105 for forming an in-focus image on the image pickup surface of the image pickup element 106 is continuously plotted against different subject distances for different focal lengths, the resultant loci are as shown in FIG. 3. During a magnification varying operation, zooming free of defocusing is enabled by selecting a locus from the loci shown in FIG. 3 according to the subject distance and moving the focusing lens 105 along the selected locus.

A front-lens focus type of lens system is provided with a compensator lens which is independent of a variator lens, and the variator lens and the compensator lens are connected to each other by a mechanical cam ring. Accordingly, if a knob for manual zooming is provided on the cam ring so that the focal length can be manually varied, no matter how fast the knob may be moved, the cam ring rotates in accordance with the movement of the knob, and the variator lens and the compensator lens move along a cam groove in the cam ring. Therefore, as long as the focusing lens is in focus, the above operation does not cause defocusing.

In the control of the above-described inner focus type of lens system, it is general practice to previously store a plurality of pieces of locus information such as those shown in FIG. 3 in a lens control microcomputer in a particular form, select a locus according to the relative position between the focusing lens and the variator lens, and perform zooming while tracing the selected locus. In such control, it is necessary to read the position of each of the focusing lens and the variator lens with a certain degree of accuracy, because the position of the focusing lens relative to the position of the variator lens is read from a storage element and applied to lens control.

As can be seen from FIG. 3 as well, if the variator lens moves at or near a uniform speed, the inclination of the locus of the focusing lens successively varies with a variation in the focal length. This indicates that the moving speed and direction of the focusing lens vary successively. In other words, an actuator for the focusing lens, if it is a stepping motor, needs to make a highly accurate speed response of 1 Hz up to several hundred Hz.

It is becoming general practice to use a stepping motor for the focusing lens group of the inner focus type of lens system as an actuator which satisfies the above requirement. The stepping motor is capable of rotating in complete synchronism with a step pulse outputted from a lens control microcomputer or the like and showing a constant stepping angle per pulse, so that the stepping motor can realize high speed response, high stopping accuracy and high positional accuracy. Furthermore, the stepping motor provides the advantage that since its rotating angle per step pulse is constant, the step pulse can be used for an increment type of encoder and a special position encoder is not needed.

As described above, if a magnification varying operation is to be carried out while keeping an in-focus state by using such a stepping motor, it is necessary to previously store the locus information shown in FIG. 3 in the lens control microcomputer or the like in a particular form (the loci themselves may be stored or a function which uses lens positions as variables may be stored), and read locus information according to the position or the moving speed of the variator lens and move the focusing lens on the basis of the read locus information.

FIG. 4 is a view aiding in explaining a locus tracing method which has previously been proposed. In FIG. 4, Z0, Z1, Z2, ..., Z6 indicate the position of the variator lens, a0, a1, a2, ..., a6 and b0, b1, b2, ..., b6 respectively indicate representative loci stored in the lens control microcomputer, and p0, p1, p2, ..., p6 indicate a locus calculated on the basis of the two loci. An equation for calculating this locus is shown below:

$$p(n+1)=(|p(n)-a(n)|/|b(n)-a(n)|)\times|b(n+1)-a(n+1)|+a(n+1). \quad (1)$$

According to Equation (1), for example, if the focusing lens is located at the point p0 in FIG. 4, the ratio in which the point p0 internally divides a line segment b0-a0 is obtained, and a point which internally divides a line segment b1-a1 in accordance with that ratio is determined as p1. The standard moving speed of the focusing lens required to keep an in-focus state can be found from the p1–p0 positional difference and the time required for the variator lens to move from Z0 to Z1.

A case in which the stop position of the variator lens is not limited only to boundaries having stored representative locus data will be described below with reference to FIG. 5.

FIG. 5 is a view aiding in explaining a method of interpolating the position of the variator lens. FIG. 5 is an extracted portion of FIG. 4 (a dashed-line portion in FIG. 4) and shows a case in which the variator lens can be stopped at an arbitrary stop position. In FIG. 5, the vertical and horizontal axes respectively represent the position of the focusing lens and the position of the variator lens. Letting Z0, Z1, ..., Zk–1, Zk, ... Zn represent the position of the variator lens, the corresponding positions of the focusing lens for different subject distances, i.e., the representative locus positions (the position of the focusing lens relative to the position of the variator lens) stored in a lens control microcomputer are as follows:

a0, a1, ..., ak–1, ak, ... an, b0, b1, ..., bk–1, bk, ... bn.

If it is now assumed that the position of the variator lens is Zx which is not a zoom boundary position and that the position of the focusing lens is px, positions ax and bx are obtained as follows:

$$ax=ak-(Zk-Zx)\times((ak-ak-1)/(Zk-Zk-1)), \quad (2)$$

$$bx=bk-(Zk-Zx)\times((bk-bk-1)/(Zk-Zk-1)). \quad (3)$$

Specifically, in accordance with an internal ratio which is obtained from the current position of the variator lens and two adjacent opposite zoom boundary positions (for example, Zk and Zk−1 in FIG. 5), locus data corresponding to the same subject distance are selected from among four stored representative locus data (ak, ak−1, bk, bk−1 in FIG. 5) and are internally divided by the internal ratio shown by the above equation (1), whereby ax and bx can be obtained.

Then, in accordance with an internal ratio which is obtained from ax, px and bx, the locus data corresponding to the same focal length, which are selected from among the four stored representative locus data (ak, ak−1, bk, bk−1 in FIG. 5), are internally divided by the internal ratio shown by the above equation (1), whereby pk and pk−1 can be obtained. Furthermore, during zooming from the wide-angle end toward the telephoto end, the moving speed of the focusing lens required to keep an in-focus state can be found from the difference between the target focusing-lens position pk and the current focusing-lens position px and the time required for the variator lens to move from Zx to Zk.

Furthermore, during zooming from the telephoto end toward the wide-angle end, the standard moving speed of the focusing lens required to keep an in-focus state can be found from the difference between the target focusing-lens position pk−1 and the current focusing-lens position px and the time required for the variator lens to move from Zx to Zk−1. The above-described locus tracing method has been devised.

As can be seen from FIG. 3, if the variator lens moves from the telephoto end toward the wide-angle end in the direction in which divergent loci gradually converge, an in-focus state can be maintained by the above-described locus tracing method. However, if the variator lens moves from the wide-angle end toward the telephoto end, it is impossible to determine which locus should be traced by the focusing lens which is located at a point on convergent loci, so that an in-focus state cannot be maintained by the above-described locus tracing method.

FIGS. 6(A) and 6(B) are views aiding in explaining one example of a locus tracing method which has previously been devised to solve the above-described problem. In each of FIGS. 6(A) and 6(B), the horizontal axis represents the position of the variator lens, and the vertical axis of FIG. 6(A) represents the level of a high-frequency component (sharpness signal) of a video signal which is an AF evaluation signal, whereas the vertical axis of FIG. 6(B) represents the position of the focusing lens.

In FIG. 6(B), it is assumed that a locus 604 is an in-focus cam locus to be used for zooming relative to a certain subject. It is also assumed that the standard moving speed for in-focus cam locus tracing on the wide-angle side of a zoom position 606 (Z14) is positive (the focusing lens moves toward its closest-distance end), and that the standard moving speed for in-focus cam locus tracing on the telephoto side of the zoom position 606 is negative (the focusing lens moves toward its infinity end). If the focusing lens traces the cam locus 604 while maintaining an in-focus state, the magnitude of the AF evaluation signal becomes as shown at 601 in FIG. 6(A). It is generally known that zooming which maintains an in-focus state exhibits an AF evaluation signal level which has an approximately constant value.

In FIG. 6(B), Vf0 indicates the standard moving speed of the focusing lens which traces the in-focus cam locus 604 during zooming, and Vf indicates an actual moving speed of the focusing lens. If zooming is performed while varying its speed with respect to the speed Vf0 which traces the locus 604, a zigzag locus like a locus 605 is obtained. In this case, the sharpness signal level varies in such a manner that hills and valleys repeatedly occur like a locus 603.

The magnitude of the sharpness signal 603 reaches its maximum at each position where the loci 604 and 605 cross each other (even-numbered points among Z0, Z1, . . . , Z16), whereas the magnitude of the sharpness signal 603 reaches its minimum at each position where the moving-direction vector of the locus 605 switches over (odd-numbered points among Z0, Z1, . . . , Z16). The sharpness signal 603 has a minimum value 602, and if the minimum value 602 is set as a level TH1 and the moving-direction vector of the locus 605 is switched over each time the magnitude of the sharpness signal 603 becomes equal to the level TH1, the moving direction of the focusing lens after switchover can be set to a direction closer to the locus 604.

In other words, each time an image is defocused by the difference between the levels 601 and 602 (TH1) of the AF evaluation signal, if the moving direction and the moving speed of the focusing lens are controlled to decrease the amount of defocusing, it is possible to effect zooming with the amount of defocusing reduced.

By using the above-described method, in the case of zooming from the wide-angle end toward the telephoto end in which convergent cam loci gradually diverge as shown in FIG. 3, even if the standard moving speed Vf0 of the focusing lens which maintains an in-focus state is not optimum for a target subject distance, it is possible to select a locus capable of preventing the AF evaluation signal level from falling below the minimum value 602 (TH1), i.e., preventing occurrence of not less than a certain amount of defocusing, by repeating a switchover operation like the locus 605 in accordance with a variation in the AF evaluation signal level while controlling the moving speed Vf of the focusing lens with respect to the standard moving speed (calculated by using p(n+1) obtained from Equation (1)). Furthermore, regarding the amount of defocusing, if the level TH1 is appropriately set, it is possible to realize zooming during which defocusing apparently is not observed.

Letting $Vf^+$ and $Vf^-$ be a positive correction speed and a negative correction speed, respectively, the moving speed Vf of the focusing lens is determined as:

$$Vf=Vf0+Vf^+, \quad (4)$$

$$Vf=Vf0+Vf^-. \quad (5)$$

At this time, to prevent the correction speeds $Vf^+$ and $Vf^-$ from deviating in either correction direction when a focus locus to be traced is selected, the correction speeds $Vf^+$ and $Vf^-$ are determined so that the internal angle made by the two direction vectors of the moving speed Vf which are obtained from the above equations (4) and (5) is divided into two equal angles by the direction vector of the standard moving speed Vf0. In addition, another method has been devised which is intended to improve the accuracy of selection of a focus locus to be traced, by varying the increase-decrease period of the sharpness signal by varying the amount of correction due to a correction speed according to the kind or state of a subject, the focal length or the depth of field.

In general, the above-described control for the magnification varying operation is performed in synchronism with a vertical synchronizing signal because a video signal from an image pickup element is used to detect focus.

FIG. 7 shows a control flowchart of a conventional example of lens control performed by a lens control microcomputer. Step S1 indicates the start of processing. Step S2 is an initial setting routine for executing the processing of initializing various ports and a RAM in the lens control microcomputer.

Step S3 is a routine for intercommunication with a system control microcomputer which controls the operating system of a camera body. In Step S3, when the lens control microcomputer receives zoom-switch-unit information from a zoom switch unit operated by a photographer, the lens control microcomputer provides magnification-varying-operation information, such as the position of a zooming lens, to inform the photographer that a zooming operation is being executed, and the information is given to the photographer through a display or the like.

Step S4 is an AF processing routine for performing the processing of making automatic adjustment of focus according to a variation in the AF evaluation signal.

Step S5 is a zooming processing routine for processing a compensation operation for maintaining an in-focus state during a magnification varying operation.

By the above-described method, calculations are performed on a standard driving direction and a standard moving speed of a focusing lens which traces a cam locus such as that shown in FIG. 4.

Step S6 is a routine for making selection from among the driving directions and the driving speeds for the variator lens and the focusing lens which have been calculated in the processing routines of Steps S4 and S55, according to whether to execute an AF operation or a magnification varying operation, and executing setting so as not to drive the lenses beyond their respective telephoto ends, wide-angle ends, closest-distance ends or infinity ends all of which are set by software so as not to prevent the lenses from coming into contact with end portions of their respective mechanical portions.

In Step S7, the lens control microcomputer outputs control signals to motor drivers according to the driving directions and the driving speeds for the variator lens and the focusing lens which have been determined in Step S6, thereby controlling the respective motors to drive or stop the variator lens and the focusing lens.

After the completion of the processing of Step S7, the process returns to Step S3.

The entire processing shown in FIG. 7 is executed in synchronism with each vertical synchronizing period (in the processing of Step S3, the process waits for the arrival of the next vertical synchronizing signal).

However, in the case of a recent type of video camera having a far faster zooming speed, for example, the variator lens may often move from a position Z4 to a position Z6 (shown in FIG. 4) within the time of one vertical synchronizing period. During this time, if the lens control processing of FIG. 7 is performed in synchronism with the vertical synchronizing period, the standard moving speed of the focusing lens remains the speed at which the focusing lens is moving from p4 to p5, and the updating of the standard moving speed is not performed until the variator lens reaches the position Z6. Accordingly, when the position of the variator lens is Z6, the focusing lens lies at a point p6' on a line which rectilinearly extends from the line p4-p5 in FIG. 4, so that defocusing occurs by the difference between p6' and p6 and accurate tracing of a cam locus cannot be performed during zooming.

To solve the above-described problem, a method based on the processing routine shown in FIG. 8 has been proposed. In this method, the standard moving speed of a focusing lens is calculated by a plurality of times (twice, in the example shown in FIG. 8) within one vertical synchronizing period so that the occurrence of defocusing is prevented. In FIG. 8, the processing of Steps S11 to S17 is similar to that of Steps S1 to S7 of FIG. 7.

After the completion of the processing of Step S17, the process waits for a predetermined period of time in Step S18 until the middle point of the vertical synchronizing period. After the lapse of the predetermined time, if it is determined in Step S19 that zooming is being executed, it is determined that the position of the variator lens has been updated, and processing similar to the processing of Steps S15 to S17 is again executed.

In Step S20, the driving directions for the variator lens and the focusing lens as well as the standard moving speed for the focusing lens are again calculated, and in Step S21, selection is made from among the driving directions and the driving speeds for the variator lens and the focusing lens which have been calculated in Step S20. In Step S22, the selected driving directions and speeds are output to the respective motor drivers to execute lens control, and the process then returns to Step S13.

If it is determined in Step S19 that zooming is not being executed, the process returns to Step S13 and waits for the next operation.

The entire processing shown in FIG. 8 is executed in synchronism with the vertical synchronizing period, and in the processing of Step S13, the process waits for the arrival of the next vertical synchronizing signal.

If the standard moving speed of the focusing lens is calculated only once within one vertical synchronizing period during zooming, the focusing lens reaches the point p6' at a focusing speed equivalent to the inclination of the line p4-p5 during the movement of the variator lens from Z4 to Z6 (in FIG. 4) within one vertical synchronizing period. In contrast, in the above-described method, since the standard moving speed of the focusing lens is calculated twice within one vertical synchronizing period, the focusing lens reaches the point p5 at a focusing speed equivalent to the inclination of the line p4-p5 during the first half of one vertical synchronizing period, and moves past the point p5 at a focusing speed equivalent to the inclination of the line p5-p6 during the second half of the one vertical synchronizing period, so that the focusing lens can reach the point p6 after the one vertical synchronizing period. Accordingly, it is possible to realize accurate tracing of a cam locus and prevention of occurrence of defocusing.

However, in the above-described conventional example, since the standard moving speed of the focusing lens is calculated by a plurality of times during one vertical synchronizing period so that defocusing is prevented during the tracing of a cam locus, the load on the lens control microcomputer becomes large during high-speed zooming. Specifically, the conventional example needs a microcomputer having a fast processing speed which is capable of executing a calculation of the standard moving speed by a plurality of times during one vertical synchronizing period, and a video camera using such a microcomputer becomes expensive for a user.

The standard moving speed for the focusing lens which is calculated by the above-described cam locus tracing method is obtained by calculating a destination target position relative to a zoom-lens position having representative locus data indicative of the closest distance to the current zoom position Zx, i.e., the boundary position (Zk−1 or Zk) in the zoom area shown in FIG. 5. Accordingly, there is a case in which the period of time required for the variator lens to move from Zx to Zk−1 or Zk is short because of the timing of executing the calculation. At this time, a large calculation error occurs in the division computation ((the moving distance of the focusing lens)÷(the time period of movement of the variator lens)) required to calculate the standard moving speed, so that the problem that an in-focus locus cannot be accurately traced also arises.

A number of problems which occur in the above-described conventional cam locus tracing method will be further described below with reference to an example in which a linear motor is used as a lens driving actuator. Linear motors have recently been used in more and more products because of their superior high-speed performance.

In general, in a system in which a linear motor such as a voice coil motor is used as a focusing motor, a position encoder for detecting the position of a focusing lens is disposed to form a feedback loop so that a deviation signal between the output signal of the position encoder and a target position signal outputted from a control circuit approaches zero, and the driving speed of the motor is determined by the response characteristics of the feedback loop.

Accordingly, the focus correcting operation of the focusing lens during the tracing of a cam locus is effected not by a control method based on the driving direction and the driving speed but by a control method using a destination target position as a parameter. Accordingly, during the tracing of a cam locus, the destination target position to be reached by the focusing lens corresponds to the position px obtained from the above-described equation (1).

However, in a recent type of video camera having a far faster zooming speed, for example, in a case where the variator lens moves from the position Z4 to the position Z6 (shown in FIG. 4) within the time of one vertical synchronizing period, if the lens control processing of FIG. 7 is performed in synchronism with the vertical synchronizing period as in the case of the above-described conventional example, the point p5 at a zoom boundary having cam locus data is calculated as a target position. Even if the variator lens proceeds to Z6, the updating of the target position is not performed, and because of loop control, the position of the focusing lens remains p5 (p6" in FIG. 4) and defocusing occurs.

In particular, both the time required for the variator lens to move by the distance difference between the current position of the variator lens and the zoom boundary position and the time required for the focusing lens to move by the distance difference between a calculated target trace position and the current position of the focusing lens vary depending on computation timing and zooming speed. Accordingly, if the focusing lens is to be located at a target position when the variator lens reaches a boundary, it is necessary to execute complicated processing extremely difficult to realize.

BRIEF SUMMARY OF THE INVENTION

One object of the present invention is to provide an image pickup apparatus and an image pickup method both of which make it possible to inexpensively realize comfortable and superior zooming performance without the need to produce loads on a processing microcomputer and irrespective of the zooming speed of a magnification varying operation and the kind of focusing motor.

Another object of the present invention is to provide an image pickup apparatus capable of effecting high-performance zooming free of defocusing even during high-speed zooming.

Another object of the present invention is to provide an image pickup apparatus and a lens control apparatus both of which are capable of preventing defocusing from occurring when a zooming operation stops.

To achieve the above objects, in accordance with one aspect of the present invention, there is provided an image pickup apparatus which comprises a first lens group for performing a magnification varying operation, a second lens group for correcting a movement of a focal plane during a movement of the first lens group, driving means for respectively driving the first lens group and the second lens group, a storage medium for storing, according to a subject distance, an in-focus position of the second lens group relative to a position of the first lens group, predicting means for predicting a destination position to be reached by the first lens group after a predetermined time period, during the magnification varying operation, and control means for performing correction of focus by calculating a standard moving speed of the second lens group for correcting a movement of the focal plane with respect to the predicted destination position, according to information stored in the storage medium, and driving the second lens group at the standard moving speed.

In accordance with another aspect of the present invention, there is provided an image pickup apparatus which comprises a first lens group for performing a magnification varying operation, a second lens group for correcting a movement of a focal plane during a movement of the first lens group, driving means for respectively driving the first lens group and the second lens group, a storage medium for storing, according to a subject distance, an in-focus position of the second lens group relative to a position of the first lens group, focus detecting means for outputting a focus signal, predicting means for predicting a destination position to be reached by the first lens group after a predetermined time period, during the magnification varying operation, and control means for calculating a standard moving speed of the second lens group for correcting a movement of the focal plane with respect to the predicted destination position, according to information stored in the storage medium, and driving the second lens group while varying the standard moving speed according to an increase or decrease in the focus signal.

In accordance with another aspect of the present invention, there is provided an image pickup apparatus which comprises a first lens group for performing a magnification varying operation, a second lens group for correcting a movement of a focal plane during a movement of the first lens group, driving means for respectively driving the first lens group and the second lens group, a storage medium for storing, according to a subject distance, an in-focus position of the second lens group relative to a position of the first lens group, predicting means for predicting a destination position to be reached by the first lens group after a predetermined time period, during the magnification varying operation, calculating means for finding a correction position of the second lens group for correcting a movement of the focal plane with respect to the destination position, according to information stored in the storage medium, and control means for controlling a position of the second lens group so that the second lens group reaches the correction position after the predetermined time period.

In accordance with another aspect of the present invention, there is provided a lens control apparatus which comprises a first lens group for performing a magnification varying operation, a second lens group for correcting a movement of a focal plane during a movement of the first lens group, driving means for respectively driving the first lens group and the second lens group, a storage medium for storing, according to a subject distance, an in-focus position of the second lens group relative to a position of the first lens group, extracting means for extracting a focus signal from a signal of an image picked up by image pickup means, predicting means for predicting a destination position to be reached by the first lens group after a predetermined time period, during the magnification varying operation, calculating means for finding a correction position of the second lens group for correcting a movement of the focal plane with respect to the destination position, according to information stored in the storage medium, correction position changing means for changing the correction position according to an increase or decrease in the focus signal, and control means for controlling a position of the second lens group so that the second lens group reaches the changed correction position after the predetermined time period.

Another object of the present invention is to provide a lens control apparatus capable of effecting high-speed zooming free of defocusing irrespective of the kind of lens driving actuator.

Another object of the present invention is to provide a lens control apparatus capable of effecting speed control and smooth driving in a position servo system driving by feedback loop.

To achieve the above objects, in accordance with one aspect of the present invention, there is provided a lens control apparatus which comprise a movable part which is movable along an optical axis for performing focus adjustment, an actuator for driving the movable part, position-of-movable-part detecting means for detecting a position of the movable part, focus control means for determining a state of focus and supplying a driving signal which causes the movable part to move toward an in-focus position, according to the determined state of focus, and position control means for performing position control of the movable part via the actuator by updating the driving signal by a plurality of times during a predetermined time period so that an average moving speed of the movable part during the predetermined time period becomes a predetermined speed.

Another object of the present invention is to realize a lens control system capable of effecting highly accurate speed control even if the lens control system is used with a position-feedback-system actuator such as a linear motor or a voice coil motor.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIGS. 6(A) and 6(B) are views aiding in describing one example of a locus tracing method which has previously been devised;

DETAILED DESCRIPTION OF THE INVENTION

Preferred embodiments of an image pickup apparatus according to the present invention will be described below in detail with reference to the accompanying drawings.

First Embodiment

Figure 1:
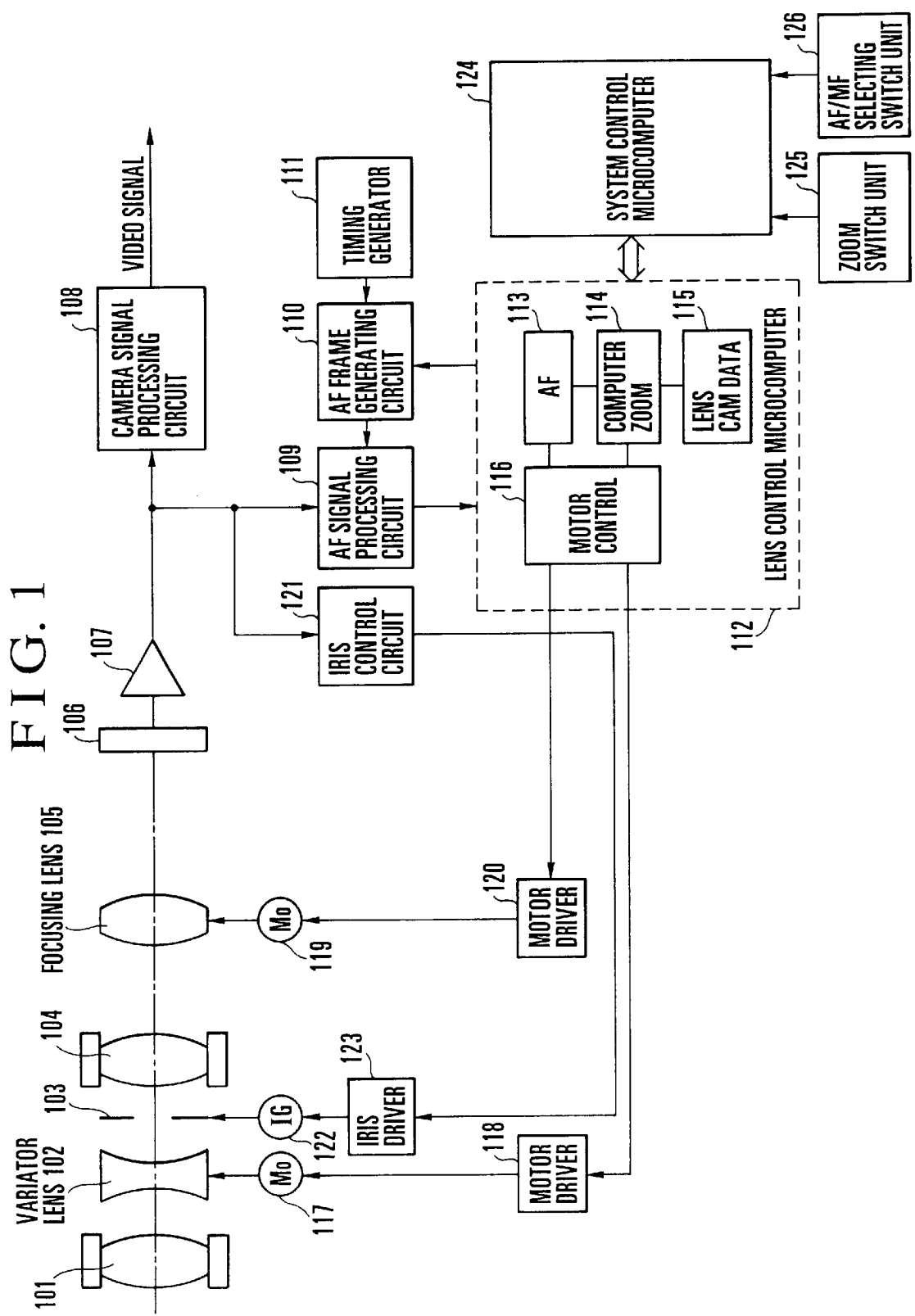
FIG. 1 is a block diagram showing the entire arrangement of a first embodiment of the present invention.

FIG. 1 is a block diagram showing the entire arrangement of a first embodiment of the present invention. The arrangement shown in FIG. 1 includes a fixed front lens group 101, a second lens group (variator lens) 102 for performing a magnification varying operation, an iris 103, a fixed third lens group 104, and a fourth lens group (focusing lens) 105 which has both a compensation function and a focusing function. These constituent elements 101 to 105 constitute an inner focus type of lens system. Image light which has passed through this lens system is focused on an image pickup surface of an image pickup element 106 and converted into a video signal by photoelectric conversion. The video signal is amplified to an optimum level by an amplifier 107, and the amplified video signal is inputted to a camera signal processing circuit 108 and converted into a standard television signal (video signal).

The video signal amplified by the amplifier 107 is sent to both an iris control circuit 121 and an AF signal processing circuit 109. The iris control circuit 121 drives an iris driver 123 and an IG meter 122 according to the input level of the video signal, thereby controlling the iris 103 to make adjustment of the amount of light.

The AF signal processing circuit 109 receives a gate signal from an AF frame generating circuit 110 which generates a gate signal for gating a predetermined area of a picked-up image in accordance with vertical and horizontal synchronizing signals supplied from a timing generator 111, and extracts only a high-frequency component of the video signal contained in an AF frame and performs processing of the extracted high-frequency component.

An lens control microcomputer 112 has a memory 113 which stores an AF program for making adjustment of focus according to the strength of an AF evaluation signal, a memory 114 which stores a zoom control program for maintaining the focusing lens 105 in an in-focus state while causing the focusing lens 105 to trace a cam locus, a memory 115 which stores lens cam data to be referred to by the lens control microcomputer 112 during the tracing of a cam locus, and a memory 116 which stores a motor control program for driving the focusing lens 105 and the variator lens 102 during AF or zooming. The lens control microcomputer 112 performs control of lens driving as well as AF frame control for varying a distance measuring area.

In addition, the lens control microcomputer 112 and a system control microcomputer (hereinafter referred to as the system controller) 124 communicate predetermined information to each other, such as information relative to a zoom switch unit 125 and an AF/MF (manual focusing) mode selecting switch 126, which information is read by the system controller 124 through A/D conversion or the like, and magnification-varying-operation information such as a zooming direction and a focal length for zooming which is controlled by the lens control microcomputer 112. (The zoom switch unit 125 is a zoom switch which outputs a voltage according to the rotating angle of an operating member, and variable-speed zooming is effected according to the output voltage.) A driver 118 outputs driving energy to a zooming motor 117 for driving the variator lens 102, in accordance with an instruction to drive the variator lens 102, whereas a driver 120 outputs driving energy to a focusing motor 119 for driving the focus lens 105, in accordance with an instruction to drive the focusing lens 105, both instructions being outputted from the lens control microcomputer 112. The motors 117 and 119 are provided for driving the variator lens 102 and the focusing lens 105, respectively.

A method of driving the lens driving motors 117 and 119 will be described below. In the following description, by way of example, both motors 117 and 119 are assumed to be stepping motors.

The lens control microcomputer 112 determines a driving speed for the zooming motor 117 and a driving speed for the focusing motor 119 by program processing, and supplies the respective driving speeds to the driver 118 for driving the zooming motor 117 and to the driver 120 for driving the focusing motor 119, in the form of rotating-frequency signals for the respective stepping motors 117 and 119. The lens control microcomputer 112 also supplies drive/stop instructions for the respective motors 117 and 119 and rotating-direction instructions for the respective motors 117 and 119 to the corresponding drivers 118 and 120. The drive/stop signal and the rotating-direction signal for the zooming motor 117 primarily correspond to the state of the zoom switch unit 125, whereas those for the focusing motor 119 correspond to a drive instruction which is determined by processing executed in the lens control microcomputer 112 during AF or zooming.

Each of the motor drivers 118 and 120 sets the phase order of four motor excitation phases to a phase order for forward rotation or a phase order for reverse rotation according to the corresponding rotating-direction signal, and outputs voltages (or currents) for the respective four motor excitation phases while varying the voltages (or the currents), according to the received rotating-frequency signal, thereby controlling the rotating direction and rotating frequency of the corresponding one of the motors 117 and 119. The respective motor drivers 118 and 120 turn on/off their outputs to the motors 117 and 119 according to the corresponding drive/stop instructions.

Figure 7:
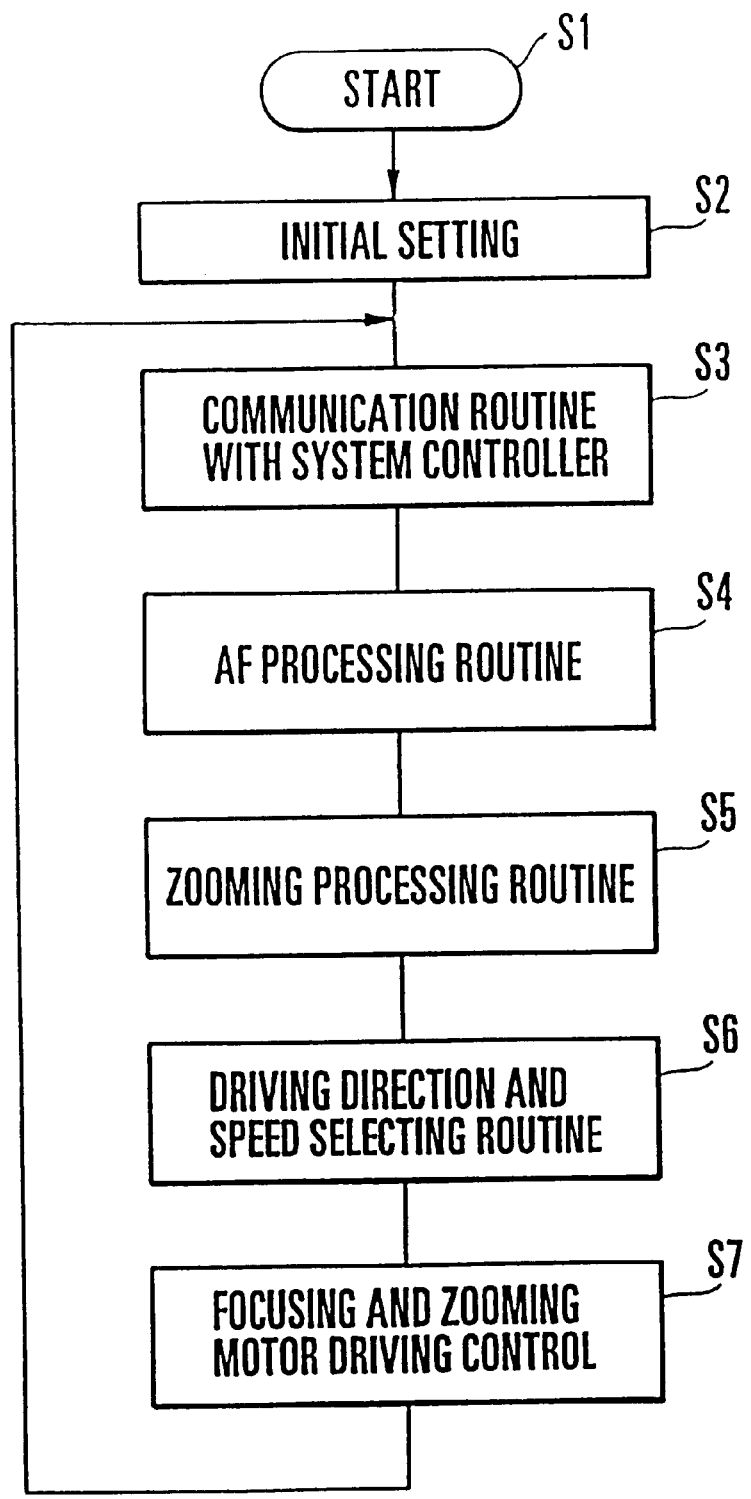
FIG. 7 is a flowchart showing a conventional lens control sequence.
Figure 8:
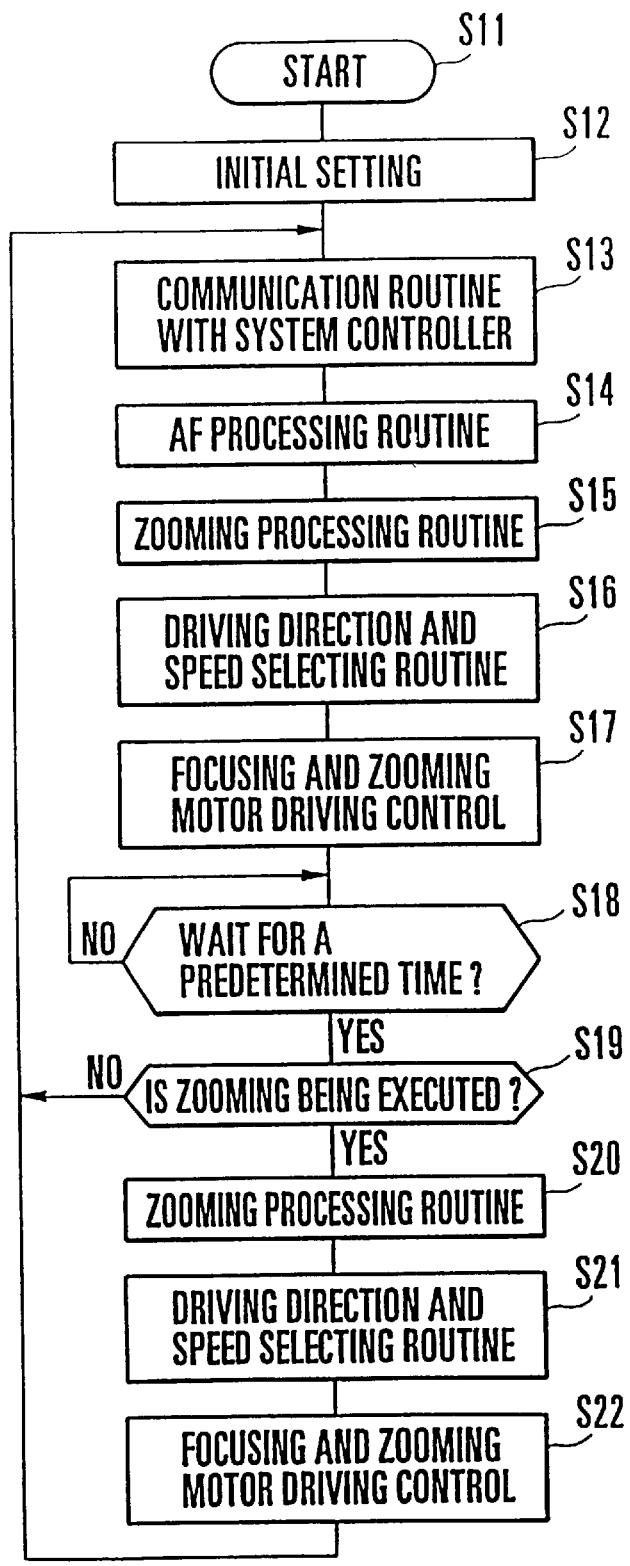
FIG. 8 is a flowchart showing a conventional lens control sequence.
Figure 9:
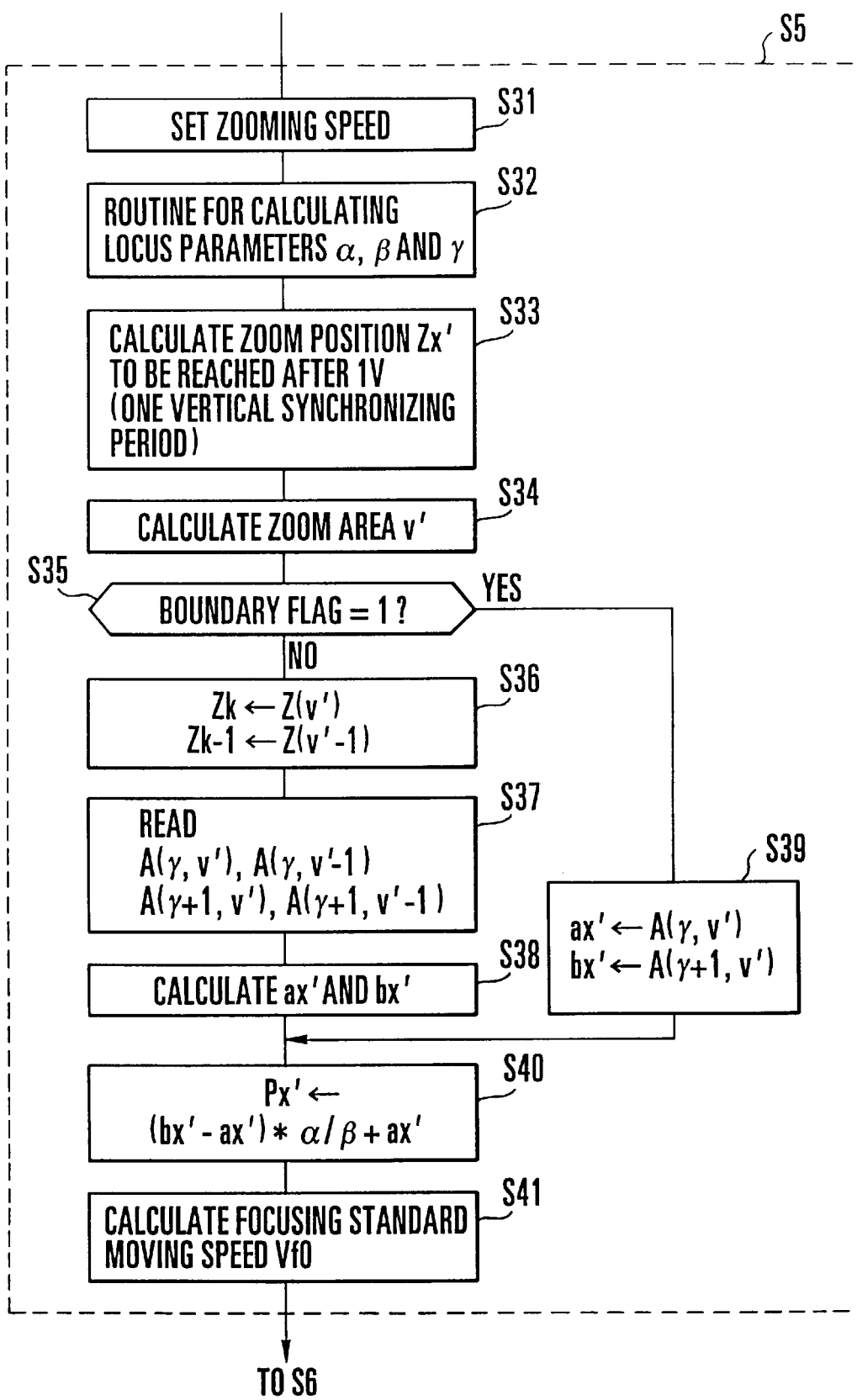
FIG. 9 is a flowchart showing a control sequence according to a first embodiment.

FIG. 9 is a control flowchart for carrying out the first embodiment, which is processed in the lens control microcomputer 112 once during one vertical synchronizing period, and is a view showing detailed contents to be executed in Step S5 of FIG. 7 described previously in connection with the related art. The operation of the first embodiment will be described below with reference to FIGS. 9, 10, 11 and 12.

Figure 3:
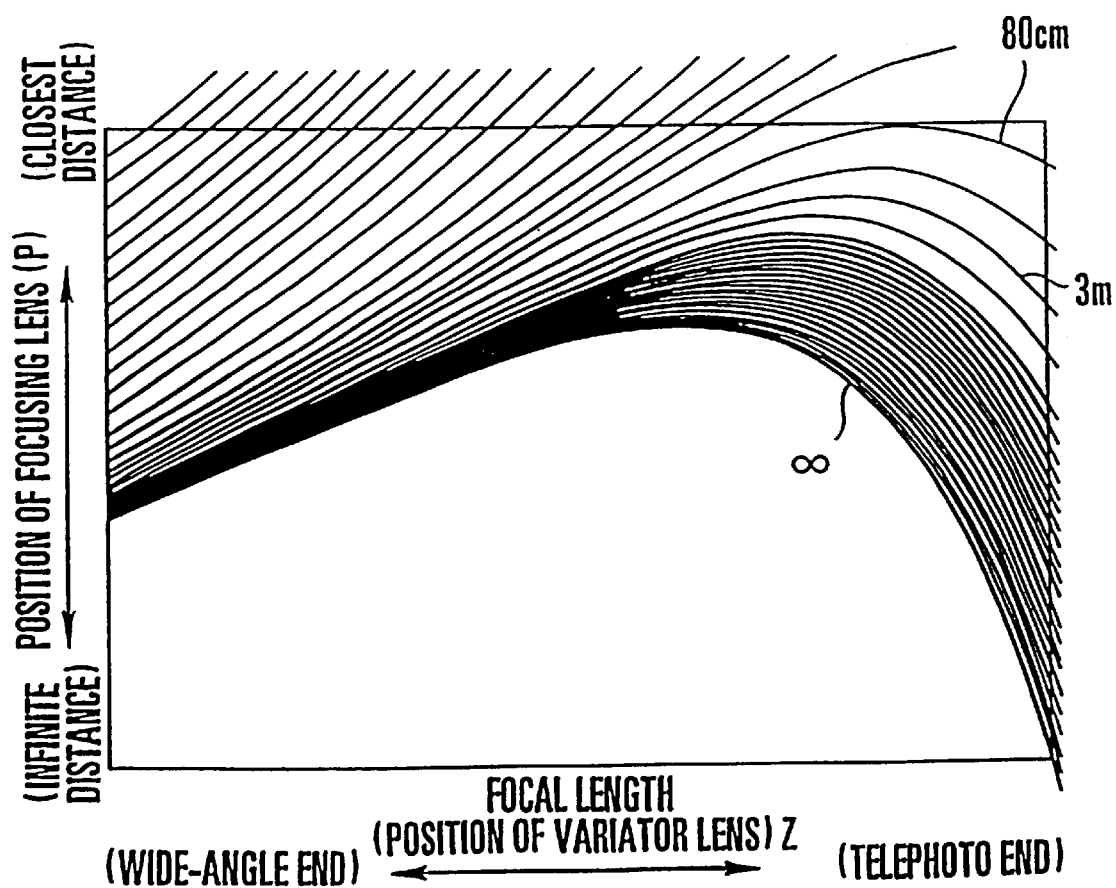
FIG. 3 is a diagram showing the relationship between the position of a variator lens and the position of a focusing lens.
Figure 12:
FIG. 12 is a view showing a data table of cam locus information used in the first embodiment.

FIG. 12 shows a data table of the cam locus information of FIG. 3 (described previously as the related art) which is stored in the lens control microcomputer 112 for executing lens control. The data table shows in-focus position data A(n, v) for the focusing lens 105 for each subject distance, and the in-focus position of the focusing lens 105 varies according to the position of the variator lens 102 for each subject distance. The subject distance varies along the column of a variable n, and a zoom position (focal length) varies along the row of a variable v.

In this data table, n=0 represents the subject distance of a subject lying at infinity, and as n becomes larger, the subject distance varies toward a closest distance, and n=m represents a subject distance of 1 cm. Further, v=0 represents a zoom position for a wide-angle end, and as v becomes larger, the focal length increases, and v=s represents a zoom position for a telephoto end. According to the data table, one cam locus is drawn with one column of table data.

The operation of the first embodiment will be described below with reference to the processing sequence shown in FIG. 9.

Step S31 is a routine for setting a driving speed Zsp of the zooming motor 117 so that the variator lens 102 can perform a natural magnification varying operation according to information indicative of the state of depression of the zoom switch unit 125, which information is received by the lens control microcomputer 112 from the system controller 124.

Step S32 is a routine for identifying the distance to a subject which is being photographed, on the basis of the current positions of the variator lens 102 and the focusing lens 105, and storing information indicative of the identified subject distance in a memory area (not shown) such as a RAM in the form of three locus parameters α, β and γ. This routine consists of the processing contents shown in FIG. 10 which will be described below. In the description of the first embodiment, it is assumed for the sake of simplicity that the focusing lens 105 is maintaining an in-focus state at the current lens position.

Figure 10:
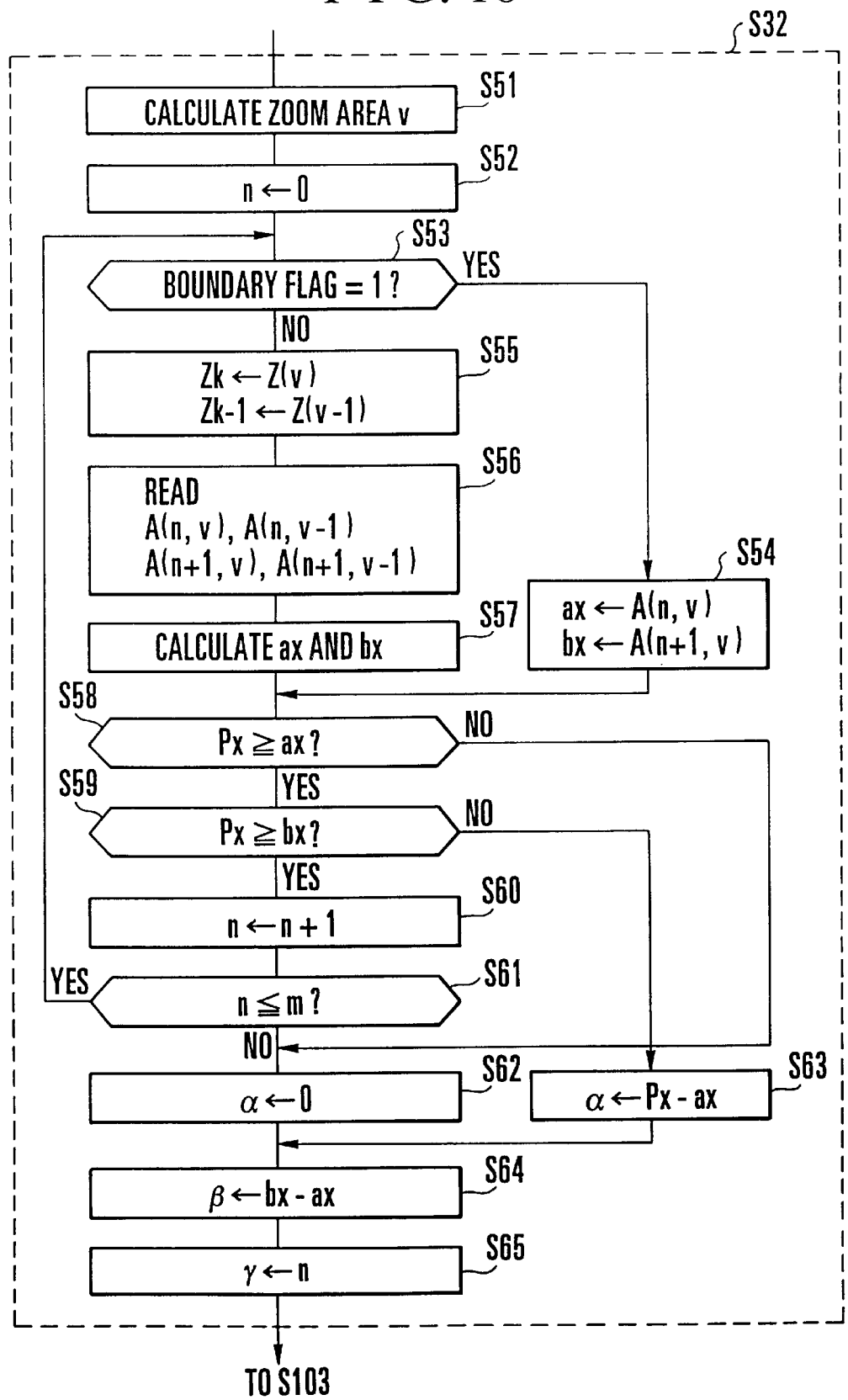
FIG. 10 is a flowchart showing a control sequence according to the first embodiment.

Referring to FIG. 10, Step S51 executes the processing of calculating which of the zoom areas v on the table of FIG. 12 corresponds to a current zoom position Zx, the zoom areas v being obtained by dividing the entire zoom area from the wide-angle end to the telephoto end into s equal areas. The calculating method will be described below with reference to FIG. 11.

Figure 4:
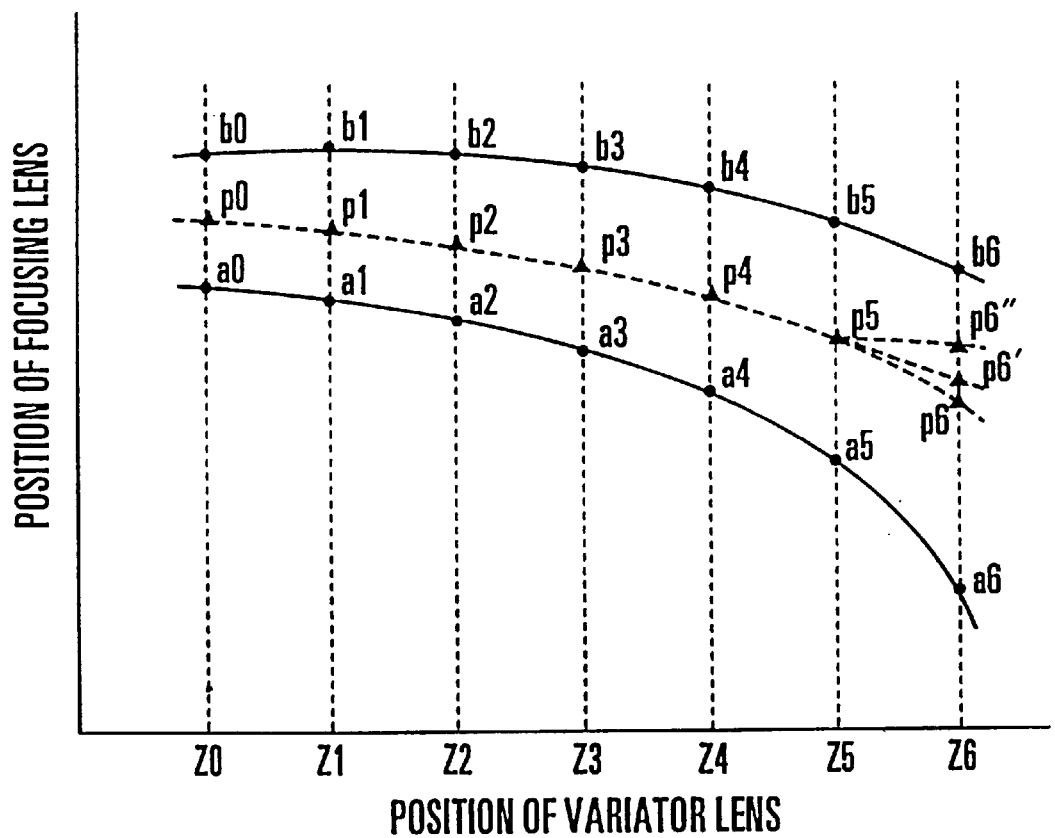
FIG. 4 is a view showing one example of a locus tracing method which has previously been devised.
Figure 5:
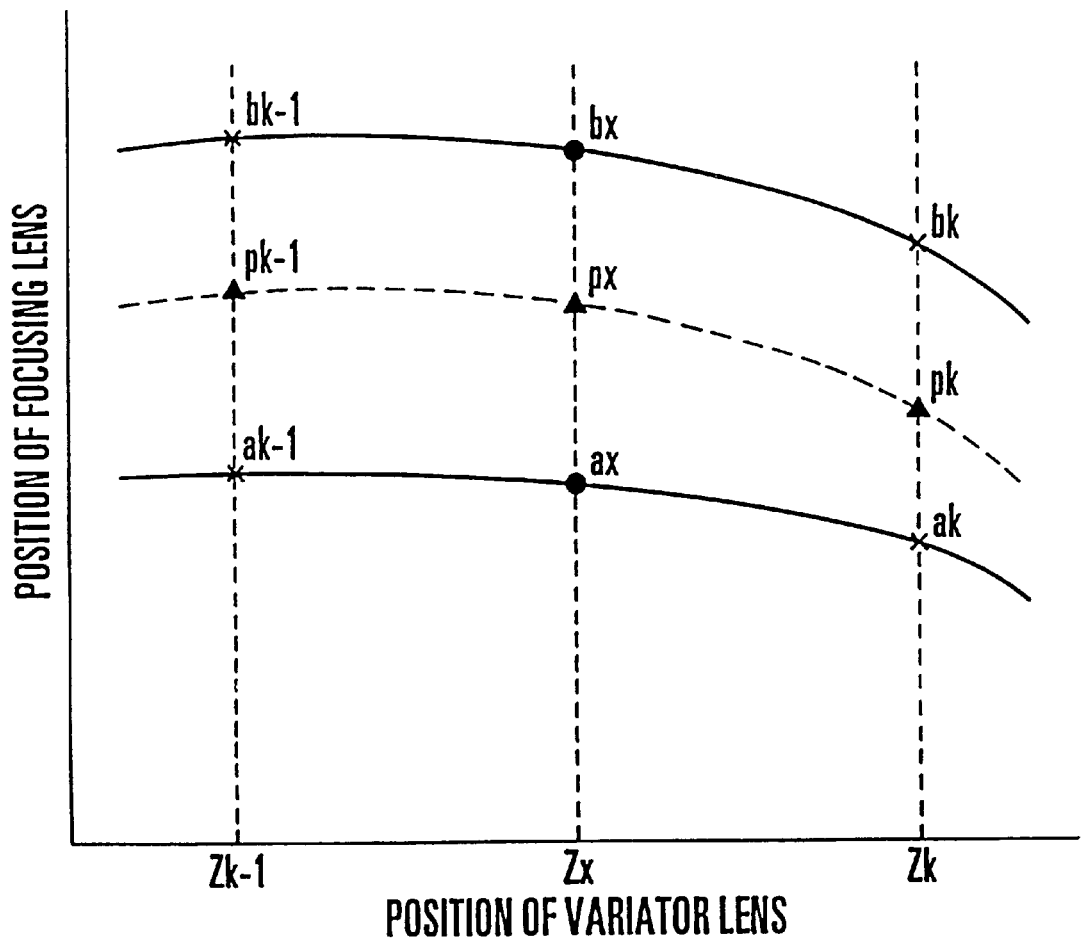
FIG. 5 is a view showing an interpolation method relative to the direction of the position of a variator lens.
Figure 11:
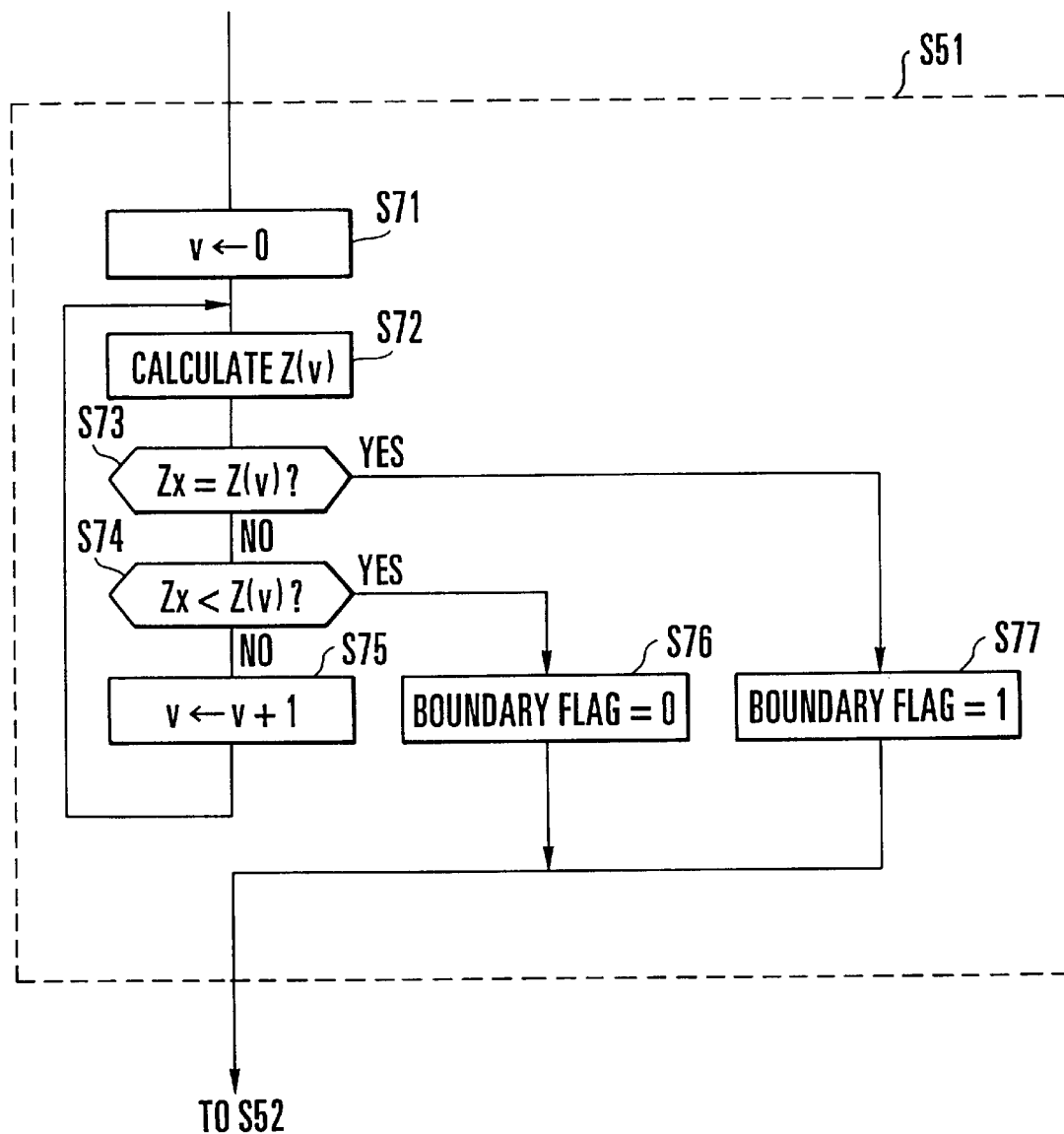
FIG. 11 is a flowchart showing a control sequence according to the first embodiment.

In Step S71 of FIG. 11, the zoom area (variable) v is cleared, and a zoom position Z(v) at a boundary in the zoom area v is calculated in accordance with the following equation (6), The zoom position Z(v) corresponds to any one of the positions Z0, Z1, Z2, . . . of the variator lens 102 which are shown in FIG. 4 described previously:

$$Z(v)=(\text{zoom position for telephoto end}-\text{zoom position for wide-angle end})\times v/s+\text{zoom position for wide-angle end}. \quad (6)$$

In Step S73, it is determined whether the zoom position Z(v) obtained in Step S72 is equal to a current zoom position Zx. If the zoom position Z(v) is equal to the zoom position Zx, it is determined that the zoom position Zx lies on the boundary in the zoom area v, and a boundary flag is set to 1 in Step S77. If the answer in Step S73 is false, it is determined in Step S74 whether the zoom position Zx is smaller than the zoom position Z(v). If the answer in Step S74 is true, it is determined that the zoom position Zx lies between a zoom position Z(v-1) and the zoom position Z(v), and the boundary flag is set to 0 in Step S73. If the answer in Step S74 is false, the zoom area (variable) v is incremented, and the process returns to Step S72.

When the above-described processing is repeatedly performed and the processing shown in FIG. 11 is completed, it can be determined whether the current zoom position Zx is present in the k-th zoom area v on the table shown in FIG. 12 and is present at a boundary in the k-th zoom area v.

Referring again to FIG. 10, since the zoom area v is determined in Step S51, it is calculated in the following processing where the position of the focusing lens 105 (a focus position) is on the table shown in FIG. 12.

First, in Step S52, the subject distance variable n is cleared, and it is determined in Step S53 whether the current zoom position Zx is present at a boundary in the k-th zoom area v. If the value of the boundary flag is 0, it is determined that the current zoom position Zx does not lie on the boundary, and the process proceeds to Step S55. In Step S55, Zk←Z(v) and Zk-1←Z(v-1) are set.

Then, in Step S56, four table data A(n, v-1), A(n, v), A(n+1, v-1) and A(n+1, v) are read, and ax and bx are calculated from the respective equations (2) and (3) described above.

On the other hand, if the answer in Step S53 is true, the in-focus focus positions A(n, v) and A(n+1, v) for the subject distance n and the zoom position v are read and memorized as ax and bx, respectively.

In Step S58, it is determined whether a current focus position Px is not less than ax. If the answer in Step S58 is true, it is determined in Step S59 whether the current focus position Px is not less than bx. If the answer is false, it is determined that the current focus position Px lies between the subject distances n and n+1, and the locus parameters α, β and γ obtained at this time are stored in the memory area in Steps S63, S64 and S65, respectively.

In Step S63, the locus parameter α is set to a α=Px−ax, then, in Step S64, the locus parameter β is set to β=bx−ax, and then, in Step S65, the locus parameter γ is set to γ=n. If the answer in Step S58 is false, it is determined that the current focus position Px is at ultra infinity, and the process proceeds to Step S62 in which the locus parameter α is set to α=0. Then, in Step S64, a locus parameter for infinity is stored in the memory area.

If the answer in Step S59 is true, it is determined that the current focus position Px is closer to the closest-distance end, and the subject distance n is incremented in Step S60, and it is determined in Step S61 whether the subject distance n is not greater than a closest subject distance m. If the answer is true, the process returns to Step S53. If the answer in Step S61 is false, it is determined that the current focus position Px is at the ultra closest distance, and the process proceeds to Step S62 in which the locus parameters α, β and γ for the closest distance are stored in the memory area.

Referring again to FIG. 9, in Step S32, it is calculated where the current zoom position Zx and the current focus position Px are located in the cam locus diagram shown in FIG. 3, and the locus parameters α, β and γ are recorded. Step S33 is a routine for calculating a zoom position Zx' to be reached by the variator lens 102 after one vertical synchronizing period. Letting Zsp (pps) be the zoom driving speed of the zooming motor 117 (a zooming speed), the zoom position Zx' to be reached by the variator lens 102 after one vertical synchronizing period is given by the following equation (7). The unit "pps" represents the rotating speed of a stepping motor, and indicates the number of steps per second of the stepping motor during rotation (1 step=1 pulse). The sign "±" used in Equation (7) indicates different moving directions of the variator lens 102, and the sign "+" indicates that the variator lens 102 moves toward the telephoto end, while the sign "−" indicates that the variator lens 102 moves toward the wide-angle end:

$$Zx'=Zx\pm Zsp/(\text{vertical synchronizing frequency}). \quad (7)$$

Then, in Step S34, it is determined in which zoom area v' the zoom position Zx' is present. Step S34 is a processing similar to that shown in FIG. 11, and Zx→Zx' and v→v' are set in a manner similar to that shown in FIG. 11.

Then, in Step S35, it is determined whether the zoom position Zx' after 1V (one vertical synchronizing period) is present at a boundary in the zoom area v'. If the value of the boundary flag is 0, it is determined that the zoom position Zx' does not lie on a boundary, and the process proceeds to Step S36. In Step S36, Zk←Z(v') and Zk−1←Z(v'−1) are set.

Then, in Step S37, four table data A(γ, v'−1), A(γ, v'), A(γ+1, v'−1) and A(γ+1, v') for the subject distance γ identified by the processing shown in FIG. 10 are read, and in Step S38, ax' and bx' are calculated from the respective equations (2) and (3) described above.

On the other hand, if the answer in Step S35 is true, the process proceeds to Step S39, in which the in-focus focus positions A(γ, v') and A(γ+1, v') for the subject distance γ and the zoom area v' are read and memorized as ax' and bx', respectively. Then, in Step S40, an in-focus focus position Px' to be reached by the focusing lens 105 when the variator lens 102 reaches the zoom position Zx' is calculated. A target trace position after 1V is expressed by the following equation (8) by using Equation (1):

$$Px'=(bx'-ax')\times\alpha/\beta+ax'. \quad (8)$$

The difference between the target trace position and the current focus position becomes:

$$\Delta F=(bx'-ax')\times\alpha/\beta+ax'-Px. \quad (9)$$

Then, in Step S41, a focusing standard moving speed Vf0 is calculated. Vf0 is obtained by dividing a focus position difference ΔF by the time required for the variator lens 102 to move the distance of ΔF. When the processing shown in FIG. 9 is completed, the process proceeds to Step S7 of FIG. 7 (described previously). In Step S7, if zooming is being executed, the focusing lens 105 is moved for focus compensation at the focusing speed determined in Step S40 in the direction indicated by the sign of the focusing speed (toward the closest-distance end in the case of the positive sign or toward the infinity end in the case of the negative sign).

As described above, by predicting a destination to be reached by the variator lens 102 after one vertical synchronizing period and determining a trace destination on a cam locus to be reached by the focusing lens 105 according to the position of the destination of the variator lens 102, it is possible to realize manual-mode zooming performance which is capable of stably maintaining an in-focus state irrespective of the zooming speed without performing a plurality of cam-locus tracing computations for one vertical synchronizing period. Accordingly, it is possible to reduce the load on the microcomputer. In addition, in calculating the focusing standard moving speed Vf0, the time required for the variator lens 102 to move by the distance of the focus position difference ΔF is the time of a vertical synchronizing period, so that even if Vf0 is calculated by a division computation, a computational error is small and a cam locus can be accurately traced.

Second Embodiment

In the description of the first embodiment, reference has been made to the tracing method of accurately tracing a cam locus while reducing the load on a microcomputer. Even during a manual mode in which an in-focus cam locus to be traced is previously identified or even during an AF mode, as long as zooming is effected from a telephoto side toward a wide-angle side, the tracing method of the first embodiment does not give rise to defocusing. However, during zooming from the wide-angle side toward the telephoto side in the AF mode, since the variator lens moves in the direction in which in-focus cam loci gradually diverge from a point of convergence as described previously, defocusing will occur if a zooming operation is not performed while an in-focus cam locus is being identified. To solve the above problem, in accordance with the second embodiment which will be described below, there is provided an extended version of the first embodiment which can prevent occurrence of defocusing even during zooming from the wide-angle side toward the telephoto side in the AF mode in the tracing method of the first embodiment.

Figure 13:
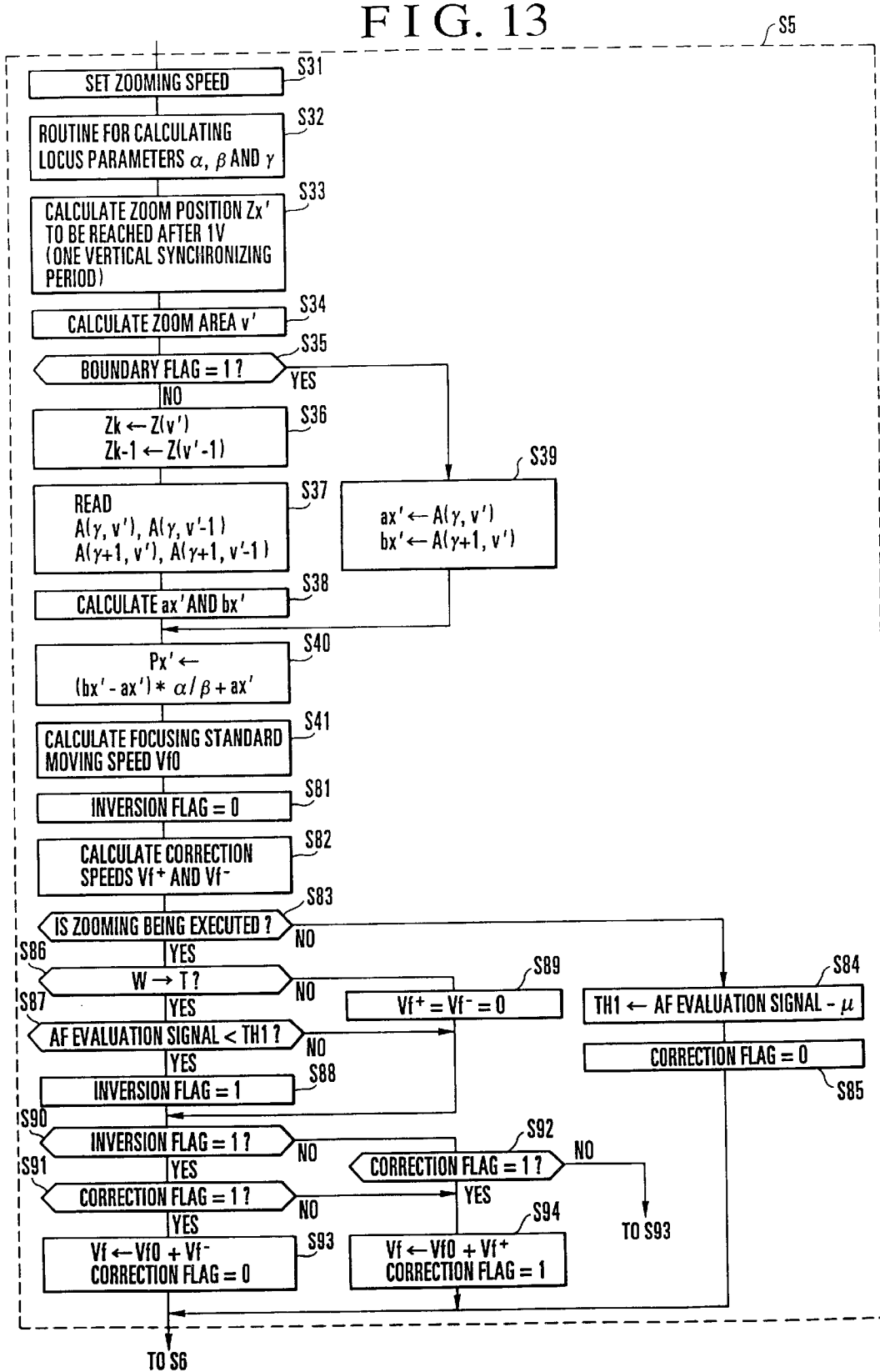
FIG. 13 is a flowchart showing a control sequence according to a second embodiment of the present invention.

FIG. 13 is a flowchart similar to FIG. 9, showing the details of Step S5 shown in FIG. 7. The processing shown in FIG. 13 handles a method of causing the focusing lens 105 to trace a cam locus while making a zigzag movement to identify the cam locus to be traced as described previously. Incidentally, since the processing routine from Step S31 to Step S41 is previously described with reference to FIG. 9, the detailed description of the same processing routine is omitted.

In Step S81 which executes the processing of initializing each parameter, an inversion flag to be used in subsequent steps is cleared. Step S82 is a routine for calculating correction speeds Vf$^+$ and Vf$^-$ for zigzag movement from the focusing standard moving speed Vf0 obtained in Step S41. In Step S82, an amount-of-correction parameter δ and the correction speeds Vf$^+$ and Vf$^-$ are calculated in the following manner.

Figure 14:
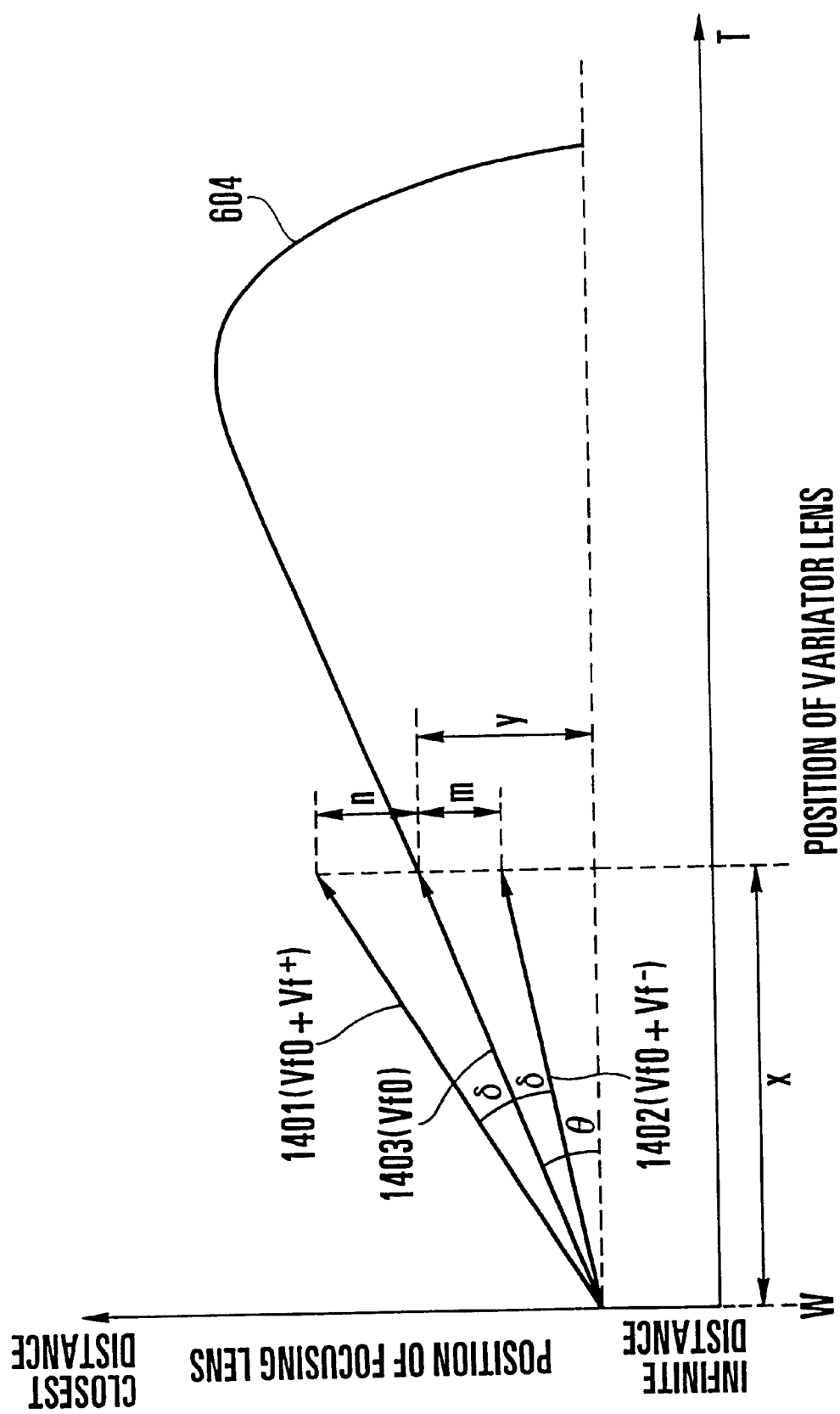
FIG. 14 is a view aiding in describing a computation according to the second embodiment.

FIG. 14 is a view aiding in describing a method of calculating the correction speeds Vf$^+$ and Vf$^-$ according to the amount-of-correction parameter δ. In FIG. 14, the horizontal axis represents the position of the variator lens 102, while the vertical axis represents the position of the focusing lens 105, and a curve 604 represents a cam locus to be traced.

The focusing speed at which the position of the focusing lens 105 varies by an amount y as the position of the variator lens 102 varies by an amount x is the standard speed Vf0 calculated with a direction vector 1403, while the focusing speed at which the position of the focusing lens 105 varies by an amount n or m with respect to the displacement y as the position of the variator lens 102 varies by the amount x is the correction speed Vf$^+$ or Vf$^-$ to be obtained.

The amounts n and m are determined so that a direction vector 1401 of a speed at which to drive the focusing lens 105 toward a closest-distance side from the displacement y (the sum of the standard speed Vf0 and the positive correction speed Vf$^+$) and a direction vector 1402 of a speed at which to drive the focusing lens 105 toward an infinity side from the displacement y (the sum of the standard speed Vf0 and the negative correction speed Vf$^-$) are spaced apart from each other in such a manner that each of the direction vectors 1401 and 1402 makes an equal angle δ with the direction vector 1403.

First, n and m are obtained. From FIG. 14, geologically, $$\tan\theta=y/x, \ \tan(\theta-\delta)=(y-m)/x, \ \tan(\theta+\delta)=(y+n)/x, \quad (10)$$

and also $$\tan(\theta\pm\delta)=(\tan\theta\pm\tan\delta)/(1\pm(-1)\times\tan\theta\times\tan\delta). \quad (11)$$

From (10) and (11), $$m=(x2+y2)/(x/k+y), \quad (12)$$

$$n=(x2+y2)/(x/k-y), \text{ where } \tan \delta = k. \quad (13)$$

Thus, n and m are obtained. The correction angle δ is a variable using parameters such as depth of field and focal length. In this manner, the increase-decrease period of a sharpness signal level which varies according to the driven state of the focusing lens 105 can be kept constant with respect to a predetermined amount of variation in the position of the focusing lens 105, whereby it is possible to reduce the possibility of missing a cam locus to be traced during zooming.

According to the value of δ, the value of k is stored in the memory area of the lens control microcomputer 112 in the form of a data table, and a particular value of k is read from the stored values, as required, to calculate Equations (12) and (13). If it is assumed here that the position of the variator lens 102 varies by x per unit time, then the zooming speed Zsp=x, the focusing standard moving speed Vf0=y, the correction speed $Vf^+$=n, and the correction speed $Vf^-$=m, and the correction speeds $Vf^+$ and $Vf^-$ (negative speed) can be obtained from Equations (12) and (13).

Referring again to FIG. 13, in the processing of Step S83, it is determined whether zooming is being executed, on the basis of information indicative of the state of operation of the zoom switch unit 125, which information is obtained from a mutual communication with the system controller 124 in Step S3 of FIG. 7. If the answer in Step S83 is true, the process proceeds to Step S86. If the answer is false, the process proceeds to Step S84, in which a value TH1 is obtained by subtracting an arbitrary constant μ from the current value of an AF evaluation signal level, thereby determining an AF evaluation signal level which becomes a criterion for switchover between correcting-direction vectors (a criterion for switchover in zigzag movement), as described previously with reference to FIGS. 6(A) and 6(B). This value TH1 is determined immediately before the start of zooming, and corresponds to the level of the minimum value 602 shown in FIG. 6(A).

Then, in Step S85, a correction flag is cleared, and the processing shown in FIG. 13 is completed. The correction flag is a flag which indicates whether the tracing of a cam locus is in a state corrected in a positive direction (the value of the correction flag=1) or in a state corrected in a negative direction (the value of the correction flag=0).

If it is determined in Step S83 that zooming is being executed, it is determined in Step S86 whether zooming from the wide-angle side toward the telephoto side is being executed. If the answer is false, the process proceeds to Step S89 in which $Vf^+$=0 and $Vf^-$=0 are set, and then proceeds to Step S90. If the answer in Step S86 is true, it is determined in Step S87 whether the current AF evaluation signal level is smaller than TH1. If the answer is false, the process proceeds to Step S90. If the answer is true, since the current AF evaluation signal level is lower than the level of TH1 (the minimum value 602) shown in FIG. 6(A), the process proceeds to Step S88, in which the inversion flag is set to 1 which means an instruction to execute a switchover between the correcting directions.

In Step S90, it is determined whether the value of the inversion flag is 1. If the answer is true, it is determined in Step S91 whether the correction flag is set to 1. If the answer in Step S91 is false, the process proceeds to Step S94, in which the correction flag is set to 1 (the state corrected in the positive direction) and a focusing speed Vf is determined from Equation (4) as follows:

$$Vf=Vf0+Vf^+ \text{ (where } Vf^+ \geq 0). \quad (14)$$

If the answer in Step S91 is true, the process proceeds to Step S93, in which the correction flag is reset to 0 (the state corrected in the negative direction) and the focusing speed Vf is determined from Equation (5) as follows:

$$Vf=Vf0+Vf^- \text{ (where } Vf^- \leq 0). \quad (15)$$

If the answer in Step S90 is false, it is determined in Step S92 whether the correction flag is set to 1. If the answer is true, the process proceeds to Step S94, whereas if the answer is false, the process proceeds to Step S93.

After the completion of the processing shown in 13, the driving direction and the driving speed of each of the focusing lens 105 and the variator lens 102 are selected according to the mode of operation in Step S6 of FIG. 7. In the case of a zooming operation, in Step S6, the driving direction of the focusing lens 105 is set so that the focusing lens 105 is driven toward the closest-distance end or the infinity end according to whether the focusing speed Vf obtained in Step S93 or S94 is positive or negative.

As described above, according to the second embodiment, the method of predicting a destination to be reached by the variator lens 102 after one vertical synchronizing period and determining a trace destination on a cam locus to be reached by the focusing lens 105 according to the position of the destination of the variator lens 102 can also be applied to zooming from the wide-angle side to the telephoto side during AF. Accordingly, it is possible to realize comfortable zooming performance for AF which is capable of stably maintaining an in-focus state irrespective of the zooming speed while reducing the load on the microcomputer.

Third Embodiment

Although each of the above-described first and second embodiments uses a stepping motor as an actuator for driving a focusing lens, a third embodiment which will be described below uses a linear motor which features low drive noise, small drive vibration and superior high-speed driving performance.

First of all, the merit of using such linear motor as the focusing motor 119 for driving the focusing lens 105 (refer to FIG. 1) will be described. In a camera provided with an inner focus type of lens, if its focusing lens needs to keep maintaining an in-focus state while its variator lens is being moved at a uniform speed, it is necessary to increase the moving speed of the focusing lens near the telephoto end at which the slope of a cam locus becomes sharp. However, if a stepping motor is used as a focusing motor in the camera, the speed of the stepping motor which is required for increasing the moving speed of the focusing lens near the telephoto end may exceed a controllable limit speed.

To prevent the required speed of the stepping motor from exceeding the controllable limit speed, it is general practice to adopt a method of maintaining an in-focus state by reducing the speed of a zooming motor while maintaining the speed of the focusing motor within the controllable limit speed.

However, if a linear motor which is superior in high-speed driving performance is used as the focusing-lens driving motor, not only is it unnecessary to reduce the speed of the zooming motor, but it is also possible to increase the speed of the variator lens which moves at a uniform speed. Accordingly, it is possible to realize high-speed zooming.

Figure 16A:
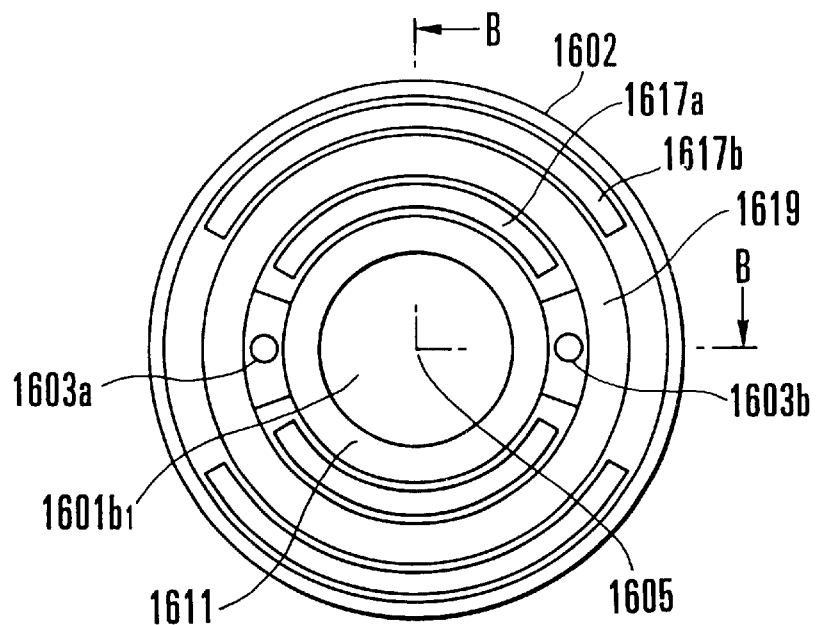
FIGS. 16(A) and 16(B) are schematic views of a linear motor according to the third embodiment.
Figure 16B:
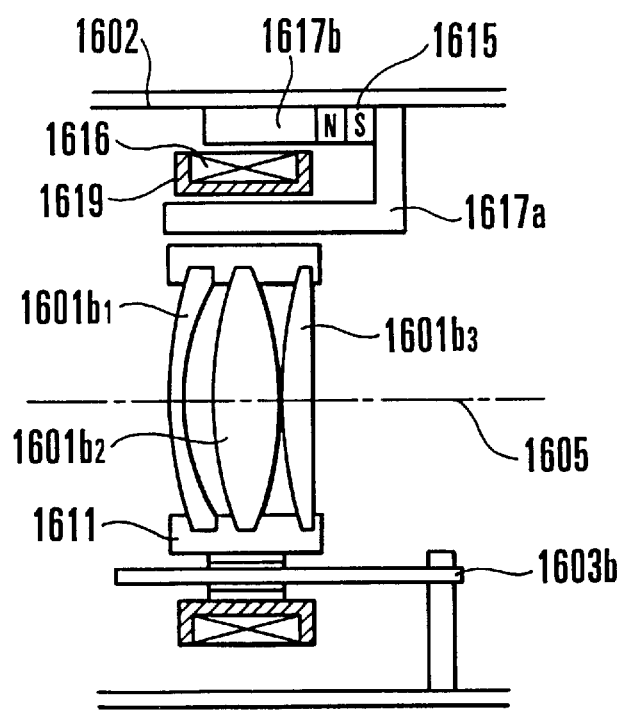

FIGS. 16(A) and 16(B) show an example of a lens moving mechanism to which a moving coil type of voice coil motor is applied as such linear motor. FIG. 16(B) is a vertical sectional view taken along line B—B of FIG. 16(A). As shown in FIGS. 16(A) and 16(B), a yoke 1617a and a coil 1616 which is wound around a bobbin 1619 are disposed around the periphery of a lens holding frame 1611 which holds lenses 1610b1 to 1601b3, and a yoke 1617b and a magnet 1615 bonded thereto are disposed outside the coil 1616. The yokes 1617a and 1617b and the magnet 1615 are secured to a fixed tube 1602. The lens holding frame 1611 is held for movement along an optical axis 1605 by two guide rods 1603a and 1603b parallel to the optical axis 1605. Since the magnet 1615 is magnetized as shown in FIG. 16(B), a radial magnetic field is formed between the yokes 1617a and 1617b. The coil 1616 is present between the yokes 1617a and 1617b and is wound in the circumferential direction of the bobbin 1619. Accordingly, if a current is made to flow through the coil 1616, a driving force acting along the optical axis is produced so that the lens holding frame 1611 which is formed integrally with the bobbin 1619 and the lenses 1610b1 to 1601b3 are driven to move along the optical axis.

Figure 15:
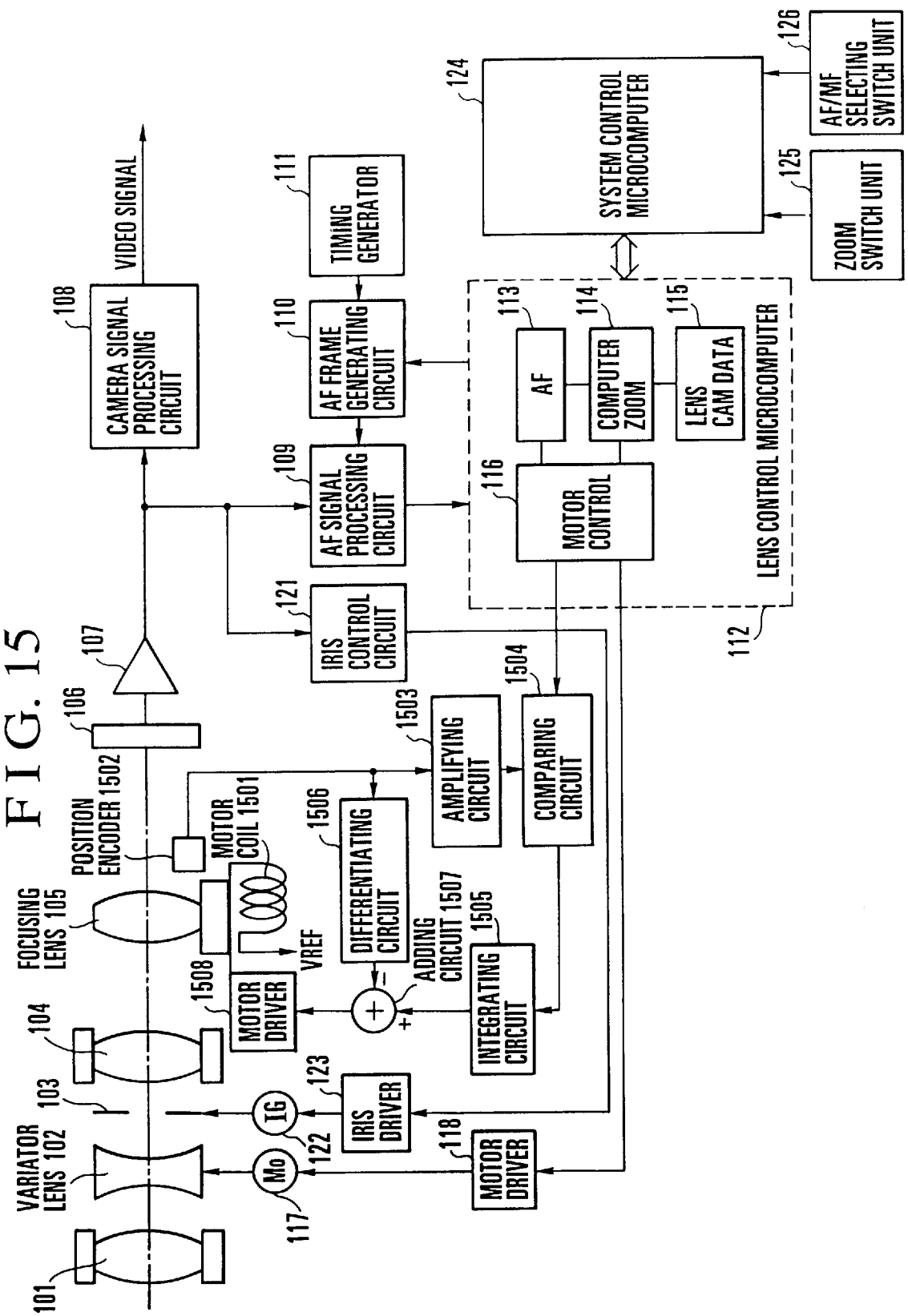
FIG. 15 is a block diagram showing a third embodiment of the present invention.

FIG. 15 is a block diagram of an image pickup apparatus in which the linear motor having the arrangement and construction shown in FIGS. 16(A) and 16(B) is used as a focusing-lens driving motor. In FIG. 15, identical reference numerals are used to denote constituent elements similar to those shown in FIG. 1, and the description thereof is omitted herein.

A method of controlling the linear motor will be described below with reference to FIG. 15. The position of the focusing lens 105 is detected by a position encoder 1502, and the output signal of the position encoder 1502 is inputted to and appropriately gain-controlled by an amplifying circuit 1503. The output signal of the amplifying circuit 1503 is inputted to a comparing circuit 1504. In the meantime, a target signal for moving the focusing lens 105 is outputted from the lens control microcomputer 112 to the comparing circuit 1504.

The comparing circuit 1504 outputs a deviation signal equivalent to the difference between the two signals to an integrating circuit 1505, and the integrating circuit 1505 performs integration of the deviation signal and supplies the integral output signal to an adding circuit 1507. The output signal of the position encoder 1502 is also inputted to a differentiating circuit 1506, and the differentiating circuit 1506 performs differentiation of the input signal and supplied the differential output signal to the adding circuit 1507. The adding circuit 1507 adds together the integral output signal and the differential output signal, and sends the sum signal to a motor driver 1508 so that the motor driver 1508 applies a voltage to a motor coil 1501 to perform loop control. A reference voltage is applied to one end of the motor coil 1501, and the motor driver 1508 applies to the other end of the motor coil 1501 a voltage which is positive or negative with respect to the reference voltage, thereby switching the polarity of the current flowing through the motor coil 1501 to change the moving direction of the focusing lens 105. In addition, the motor driver 1508 varies its output voltage level to vary the amount of driving of the focusing lens 105.

The speed feedback given by the differentiating circuit 1506 is intended to stabilize the entire loop system and to inhibit an abrupt movement of the focusing lens 105 so that a natural picked-up image is produced as well as so that the focusing lens 105 can be prevented from moving beyond its movable range and colliding with a mechanical member. The lens control microcomputer 112 generates a movement target signal by referring to a data table for a desired lens position and converting the corresponding data into an output value. The data table contains, for example, a predetermined correlation between the output level of the target signal and the position of the focusing lens 105, and is previously stored in the lens control microcomputer 112.

Figure 17:
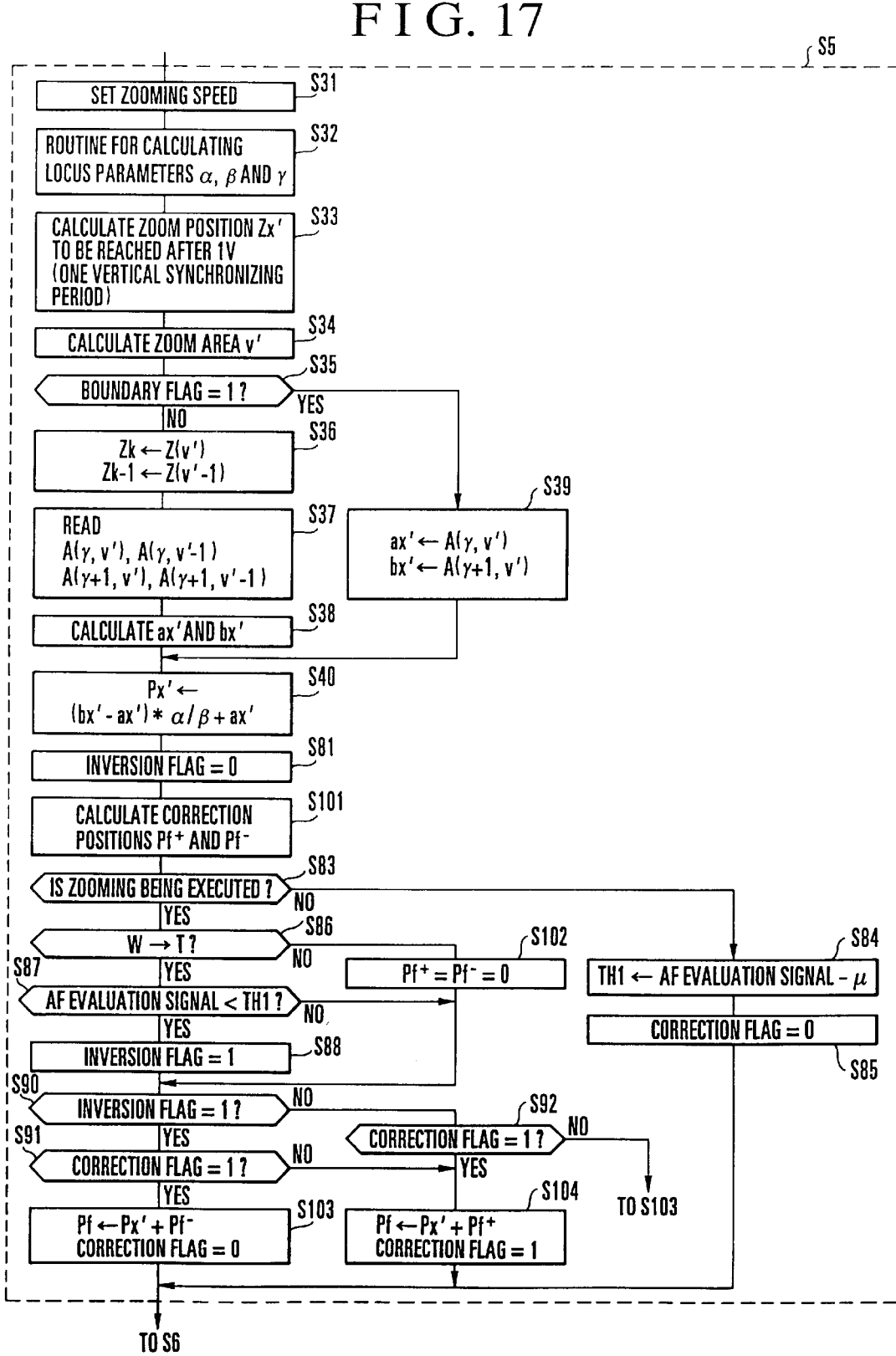
FIG. 17 is a flowchart showing a control sequence according to the third embodiment.

A method of tracing a cam locus according to the third embodiment will be described below with reference to FIG. 17. FIG. 17 is a flowchart showing in detail the zooming processing routine of Step S5 shown in FIG. 7. Incidentally, in the case of focusing control using a linear motor, the processing for the focusing motor shown in FIG. 7 does not need the item "speed", and adopts the above-described type of control method of outputting a target position signal. In the processing routine shown in FIG. 17, identical step numbers are used to denote processing steps similar to those shown in FIGS. 9 and 13.

Step S31 of FIG. 17 is a routine for setting the driving speed Zsp of the zooming motor 117 so that the variator lens 102 can perform a natural magnification varying operation according to information indicative of the state of depression of the zoom switch unit 125, which information is received by the lens control microcomputer 112 from the system controller 124.

Step S32 is a routine for identifying the distance to a subject which is being photographed, on the basis of the current positions of the variator lens 102 and the focusing lens 105, and storing information indicative of the identified subject distance in the memory area such as a RAM in the form of three locus parameters α, β and γ. This routine consists of the processing contents shown in FIG. 10 as described previously in connection with the first embodiment. In Step S32, it is calculated where the current positions of the variator lens 102 and the focusing lens 105 are located in the cam locus diagram shown in FIG. 3, and the locus parameters α, β and γ are stored.

Step S33 is a routine for calculating a zoom position Zx' to be reached by the variator lens 102 after one vertical synchronizing period. Letting Zsp (pps) be the zooming speed determined in Step S33, the zoom position Zx' to be reached by the variator lens 102 after one vertical synchronizing period is given by the above-described equation (7).

Then, in Step S34, it is determined in which zoom area v' the zoom position Zx' is present. Step S34 is a processing similar to that shown in FIG. 11, and Zx→Zx' and v→v' are set in a manner similar to that shown in FIG. 11.

Then, in Step S35, it is determined whether the zoom position Zx' after 1V (one vertical synchronizing period) is present at a boundary in the zoom area v'. If the value of the boundary flag is 0, it is determined that the zoom position Zx' does not lie on a boundary, and the process proceeds to Step S36.

In Step S36, Zk←Z(v') and Zk-1←Z(v'-1) are set. Then, in Step S37, four table data A(γ, v'-1), A(γ, v'), A(γ+1, v'-1) and A(γ+1, v') for the subject distance γ identified by the processing shown in FIG. 10 are read, and in Step S38, ax' and bx' are calculated from the respective equations (2) and (3) described above.

On the other hand, if the answer in Step S35 is true, the process proceeds to Step S39, in which the in-focus focus positions A(γ, v') and A(γ+1, v') for the subject distance γ and the zoom area v' are read and memorized as ax' and bx', respectively. Then, in Step S40, an in-focus focus position Px' to be reached by the focusing lens 105 when the variator lens 102 reaches the zoom position Zx' is calculated. A standard target trace position to be reached the focusing lens 105 after 1V is given from the above-described equation (8) as follows:

$$Px'=(bx'-ax')\times\alpha/\beta+ax'. \quad (16)$$

In Step S81, an inversion flag to be used in subsequent steps is cleared. In Step S101, correction positions $Pf^+$ and $Pf^-$ for zigzag movement are calculated on the basis of the focusing standard target position Px' obtained in Step S40 so that the linear motor can be used to realize a zooming operation similar to that of the aforesaid stepping motor in the AF mode.

As described above with reference to FIG. 14, the correction speeds $Vf^+$ and $Vf^-$ for zigzag movement are determined as variation speeds relative to the standard moving speed Vf0 according to the amount-of-correction parameter δ. Since each of the correction speeds $Vf^+$ and $Vf^-$ represents the amount of movement per unit time of the focusing lens 105, the amount of correction movement based on the standard target position Px' for one vertical synchronizing period becomes an amount obtained by dividing the absolute value of each of the correction speeds $Vf^+$ and $Vf^-$ by a vertical synchronizing period. Accordingly, $$Pf^+=|Vf^+|/(\text{vertical synchronizing period}), \quad (17)$$

and $$Pf^-=|Vf^-|/(\text{vertical synchronizing period}). \quad (18)$$

Then, in the processing of Step S83, it is determined whether zooming is being executed, on the basis of information indicative of the state of operation of the zoom switch unit 125, which information is obtained from a mutual communication with the system controller 124 in Step S3 of FIG. 7. If the answer in Step S83 is true, the process proceeds to Step S86. If the answer is false, the process proceeds to Step S84, in which a value TH1 is obtained by subtracting an arbitrary constant μ from the current value of an AF evaluation signal level, thereby determining an AF evaluation signal level which becomes a criterion for switchover between correcting-direction vectors (a criterion for switchover in zigzag movement), as described previously with reference to FIGS. 6(A) and 6(B). This value TH1 is determined immediately before the start of zooming, and corresponds to the level of the minimum value 602 shown in FIG. 6(A).

Then, in Step S85, a correction flag is cleared, and the processing shown in FIG. 17 is completed. The correction flag is a flag which indicates whether the tracing of a cam locus is in a state corrected in a positive direction (the value of the correction flag=1) or in a state corrected in a negative direction (the value of the correction flag=0).

If it is determined in Step S83 that zooming is being executed, it is determined in Step S86 whether zooming from the wide-angle side toward the telephoto side is being executed. If the answer is false, the process proceeds to Step S102 in which $Pf^+=0$ and $Pf^-=0$ are set, and then proceeds to Step S90. If the answer in Step S86 is true, it is determined in Step S87 whether the current AF evaluation signal level is smaller than TH1. If the answer is false, the process proceeds to Step S90. If the answer is true, since the current AF evaluation signal level is lower than the level of TH1 (the minimum value 602) shown in FIG. 6(A), the process proceeds to Step S88, in which the inversion flag is set to 1 which means an instruction to execute a switchover between the correcting directions.

In Step S90, it is determined whether the value of the inversion flag is 1. If the answer is true, it is determined in Step S91 whether the correction flag is set to 1. If the answer in Step S91 is false, the process proceeds to Step S104, in which the correction flag is set to 1 (the state corrected in the positive direction) and a focusing target value Pf to be reached by the focusing lens 105 after one vertical synchronizing period is determined as follows:

$$Pf=Px'+Pf^+. \quad (19)$$

If the answer in Step S91 is true, the process proceeds to Step S103, in which the correction flag is reset to 0 (the state corrected in the negative direction) and the focusing target value Pf to be reached by the focusing lens 105 after one vertical synchronizing period is determined as follows:

$$Pf=Px'-Pf^-. \quad (20)$$

If the answer in Step S90 is false, it is determined in Step S92 whether the correction flag is set to 1. If the answer is true, the process proceeds to Step S104, whereas if the answer is false, the process proceeds to Step S103 and the processing shown in FIG. 17 is completed.

As is apparent from the above description, according to the third embodiment, the method of predicting a destination to be reached by the variator lens 102 after one vertical synchronizing period and determining a trace destination on a cam locus to be reached by the focusing lens 105 according to the position of the destination of the variator lens 102 can also be applied to focus-position control using a linear motor. Accordingly, it is possible to realize high-speed zooming while preventing the problem that, for example, when the variator lens 102 moves from the position Z4 to the position Z6 (as viewed in FIG. 4) within the time of one vertical synchronizing period, only the position of the focusing lens 105 is left at the point p5 (p6" in FIG. 4) and defocusing is caused.

In particular, even if computation timing and the zooming speed vary, the time required for the variator lens 102 to move for a predetermined period of time (one vertical synchronizing period in each of the first to third embodiments) is constant, so that if only the time required for the variator lens 102 to moved by the difference in distance between a calculated trace target position and the current focus position is found, it is possible to readily shift the focus position to a target position according to a position to be reached by the variator lens 102 after the predetermined period of time. Accordingly, it is possible to provide a comfortable image pickup apparatus having both superior focusing performance and high-speed zooming performance.

As is also apparent from the above description, according to each of the first to third embodiments, it is possible to provide an image pickup apparatus and an image pickup method both of which make it possible to inexpensively realize comfortable and superior zooming performance without the need to produce loads on a processing microcomputer and irrespective of the zooming speed of a magnification varying operation and the kind of focusing motor.

Specifically, by predicting a destination to be reached by the variator lens 102 after the predetermined period of time and determining a trace destination on a cam locus to be reached by the focusing lens 105 according to the position of the destination of the variator lens 102, it is possible to realize manual-mode zooming performance which is capable of stably maintaining an in-focus state irrespective of the zooming speed without performing a plurality of cam-locus tracing computations within the predetermined period of time. Accordingly, it is possible to reduce the load on the microcomputer. In addition, since it is possible to reduce a computational error in calculating the focusing standard moving speed Vf0, it is possible to accurately trace a cam locus.

In addition, the method of predicting a destination to be reached by the variator lens 102 after the predetermined period of time and determining a trace destination on a cam locus to be reached by the focusing lens 105 according to the position of the destination of the variator lens 102 can also be applied to zooming during AF. Accordingly, it is possible to realize comfortable zooming performance for AF which is capable of stably maintaining an in-focus state irrespective of the zooming speed while reducing the load on the microcomputer.

In addition, the method of predicting a destination to be reached by the variator lens 102 after the predetermined period of time and determining a trace destination on a cam locus to be reached by the focusing lens 105 according to the position of the destination of the variator lens 102 can also be applied to focus-position control using a linear motor. Accordingly, it is possible to realize ultra-high-speed zooming while preventing a problem peculiar to a system placed under loop position control, i.e., the problem that even if the zoom position changes, only the focus position does not change and defocusing is caused. In particular, even if the computation timing and the zooming speed vary, the time required for the variator lens 102 to move for a predetermined period of time is constant, so that if only the time required for the variator lens 102 to moved by the difference in distance between a calculated trace target position and the current focus position is found, it is possible to readily shift the focus position to a target position according to a position to be reached by the variator lens 102 after the predetermined period of time. Accordingly, it is possible to provide a comfortable image pickup apparatus having both superior focusing performance and high-speed zooming performance.

In addition, the method of predicting a destination to be reached by the variator lens 102 after the predetermined period of time and determining a trace destination on a cam locus to be reached by the focusing lens 105 according to the position of the destination of the variator lens 102 can also be applied to both focus position control using a linear motor and zooming during AF. Accordingly, it is possible to realize comfortable zooming performance for AF which is capable of stably maintaining an in-focus state irrespective of the zooming speed.

In addition, since the aforesaid predetermined period of time is one vertical synchronizing period, it is possible to synchronize the predetermined period of time with the timing of generating a focus voltage signal from an picked-up image signal. Accordingly, only if zooming control processing is executed once for one vertical synchronizing period, it is possible to identify an in-focus cam locus and realize zooming performance free of defocusing.

Fourth Embodiment

A fourth embodiment of the present invention will be described below. The fourth embodiment is intended to enable accurate position control and speed control by using an inner focus type of lens and by using a linear motor (or a voice coil motor) as an actuator. The fourth embodiment will be described below in detail along with the background thereof.

An image pickup apparatus such as a video camera having a two-dimensional image pickup element or the like has heretofore adopted a focusing method which includes detecting the sharpness of an image displayed on the basis of a video signal obtained by picking up an image of a subject, and controlling the position of a focusing lens so that the sharpness detected becomes a maximum.

To evaluate the sharpness, it is general practice to use the strength of a high-frequency component of a video signal extracted by a band-pass filter or the detection strength of a defocusing width of a video signal extracted by a differentiating circuit or the like. In a case where an image of a subject is picked up, if the focusing lens is out of focus, the strength of such high-frequency component and the detection strength of such defocusing width are small, but as the focusing lens approaches an in-focus point, the level of such strength signal becomes larger. If the focusing lens completely reaches the in-focus point, the level of the strength signal reaches a maximum.

Accordingly, during position control, if the degree of such sharpness is small, the focusing lens is moved as fast as possible in the direction in which the degree of the sharpness becomes greater, and as the degree of the sharpness becomes greater, the focusing lens is moved slower. When the degree of the sharpness reaches the maximum value, the focusing lens is precisely stopped on "the top of a hill", i.e., brought into focus.

Such a focus adjusting method (autofocus system) using the above-described position control of the focusing lens is generally called a hill-climbing autofocus system (hereinafter referred to as "hill-climbing AF"). The hill-climbing AF system has recently become popular in latest video cameras which are reduced in size and weight, because the hill-climbing AF system makes it possible to realize an autofocus (AF) mechanism by using a simple system.

Figure 2:
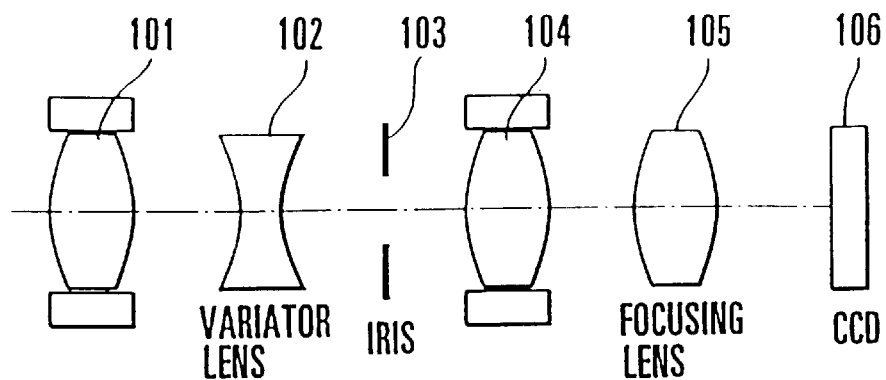
FIG. 2 is a schematic view showing the arrangement of an inner focus type of lens system which has heretofore been used.

As described previously, to realize further reductions in the size and weight of a video camera or the like, it has also become popular to use an inner focus type of lens system, such as that shown in FIG. 2, as a lens system for the video camera or the like.

In the inner focus type of lens system in which a focusing lens is driven to correct a variation in a focal plane during zooming, since the focusing lens has a light weight, an actuator for driving the focusing lens can be reduced in size and weight and the focusing lens can be driven at high speeds. In addition, it is possible to make a closest focusing distance to a subject far smaller in optical terms.

A cam locus tracing method for the inner focus type of lens system is as described previously with reference to FIGS. 2 to 5 and Equations (1) to (3), and the processing of control of the zooming operation of the inner focus type of lens system is normally performed in synchronism with a vertical synchronizing signal peculiar to a video camera.

However, in the case of a recent type of video camera having a far faster zooming speed, for example, the variator lens 102 may often move from the position Z4 to the position Z6 (shown in FIG. 4) within the time of one vertical synchronizing period.

During this time, if lens control is performed in synchronism with a vertical synchronizing signal, the standard moving speed of the focusing lens 105 remains the speed at which the focusing lens 105 is moving from p4 to p5, and the updating of the standard moving speed is not performed until the variator lens 102 reaches the position Z6. Accordingly, when the position of the variator lens 102 is Z6, the focusing lens 105 lies at a point p6' on a line which rectilinearly extends from the line p4-p5 in FIG. 4, so that defocusing occurs by the difference between p6 and p6' and accurate tracing of a cam locus cannot be performed during zooming.

To solve the above-described problem, it is considered to adopt a control system which predicts a position to be reached by the variator lens 102 after one vertical synchronizing period, calculates a correction position of the focusing lens 105 for making a correction on a focal plane with respect to the predicted position, and performs lens control so that the focusing lens 105 reaches the correction position after one vertical synchronizing period.

In this control system, for example, a linear motor which features low drive noise, small drive vibration and superior high-speed driving performance is used in place of the above-described stepping motor as an actuator for driving the focusing lens 105.

First of all, the merit of using the aforesaid linear motor as the actuator for driving the focusing lens 105 will be described. In a camera or the like which is provided with an inner focus type of lens system 100 such as that shown in FIG. 2, if the focusing lens 105 needs to keep maintaining an in-focus state while the variator lens 102 is being moved at a uniform speed, it is necessary to increase the moving speed of the focusing lens 105 near the telephoto end at which the slope of a cam locus becomes sharp. However, if a stepping motor is used as the aforesaid actuator, the speed of the stepping motor which is required for increasing the moving speed of the focusing lens 105 near the telephoto end may exceed a controllable limit speed.

To prevent the required speed of the stepping motor from exceeding the controllable limit speed, it is general practice to adopt a method of maintaining an in-focus state by reducing the driving speed of a motor for moving the variator lens 102 while maintaining the speed of the stepping motor within the controllable limit speed.

However, if a linear motor which is superior in high-speed driving performance is used as the aforesaid actuator, not only is it unnecessary to reduce the driving speed of the motor for moving the variator lens 102, but it is also possible to increase the speed of the variator lens 102 which moves at a uniform speed. Accordingly, it is possible to realize ultra-high-speed zooming.

If a stepping motor or a DC motor is used as the actuator for driving the focusing lens 105, it is necessary to use a driving-power transmitting mechanism for converting the rotational driving force of the motor into a driving force for rectilinear movement for the purpose of lens driving, and the size and weight of the entire lens moving mechanism are, therefore, difficult to reduce In contrast, if the linear motor is used, the driving-power transmitting mechanism is not needed and the size and weight of the entire lens moving mechanism can be reduced.

A lens moving mechanism to which, for example, a moving coil type of voice coil motor is applied as the above-described linear motor is as shown in FIGS. 16(A) and 16(B) referred to previously, and the description thereof is omitted.

Figure 30:
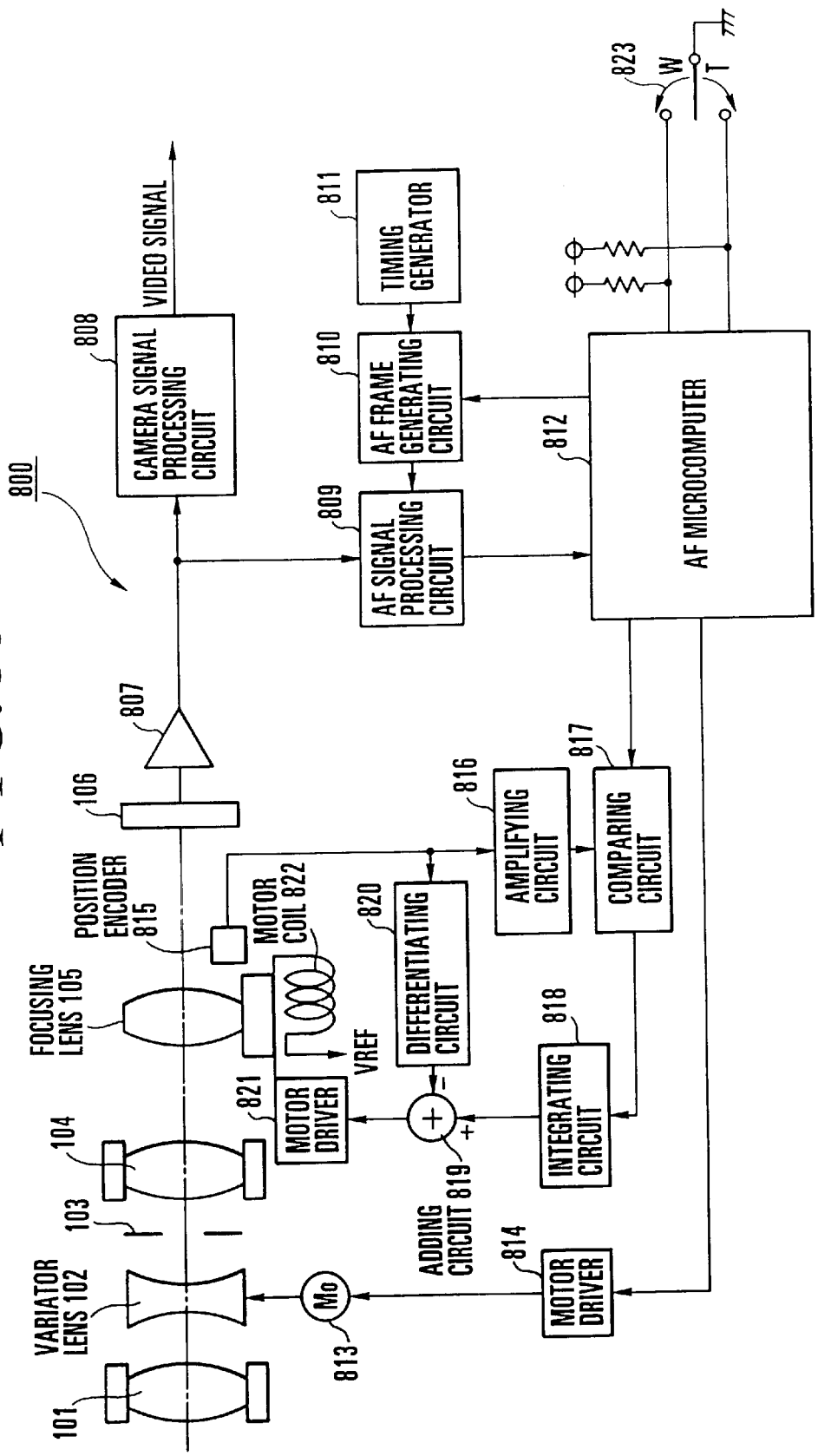
FIG. 30 is a block diagram showing the construction of a general image pickup apparatus.

An image pickup apparatus in which such lens moving mechanism is used for driving the focusing lens 105 shown in FIG. 2 has, for example, the construction shown in FIG. 30.

Light (image light) from a subject (not shown) passes through the first lens group 101, the variator lens 102, the iris 103, the third lens group 104 and the focusing lens 105 in that order, and is focused on the image pickup surface of the image pickup element 106 of an image pickup element.

The image light focused on the image pickup surface of the image pickup element 106 is converted into a video signal by photoelectric conversion. The video signal is amplified to an optimum signal level by an amplifier 807, and the amplified video signal is inputted to a camera signal processing circuit 808.

The camera signal processing circuit 808 performs predetermined signal processing on the video signal supplied from the amplifier 807, and generates and outputs a standard television signal.

The video signal amplified by the amplifier 807 is also supplied to an AF signal processing circuit 809.

At this time, an AF frame generating circuit 810 generates a gate signal for gating a predetermined area of an image picked up on the image pickup surface of the image pickup element 106, in response to vertical and horizontal synchronizing signals supplied from a timing generator 811 in accordance with AF-frame control (to be described later) provided by an AF microcomputer 812, and outputs the gate signal to the AF signal processing circuit 809.

The AF signal processing circuit 809 extracts only a high-frequency component of the video signal contained in an AF frame from the video signal supplied from the amplifier 807, in response to the gate signal supplied from the AF frame generating circuit 810, and performs predetermined processing such as the processing of generating the above-described AF evaluation signal.

The AF microcomputer 812 is arranged to perform processing for lens control, such as focus adjustment according to the strength of the AF evaluation signal generated by the AF signal processing circuit 809, zooming control for maintaining the focusing lens 105 in an in-focus state while causing it to trace a cam locus, lens driving control such as motor control for driving the focusing lens 105 and the variator lens 102 during AF or zooming, and AF frame control for varying a distance measuring area.

In addition, the AF microcomputer 812 sends an instruction to drive the variator lens 102 to a zooming motor driver 814, in accordance with a switch state supplied from a zoom switch 823, thereby causing the zooming motor driver 814 to drive a zooming motor 813.

If the zooming motor 813 is the above-described type of stepping motor, the AF microcomputer 812 determines a driving speed of the zooming motor 813 on the basis of its built-in processing program, and supplies the driving speed to the zooming motor driver 814 for driving the zooming motor 813, as a rotating-frequency signal.

The AF microcomputer 812 also supplies a drive/stop instruction and a rotating-direction instruction signal for the zooming motor 813 to the zooming motor driver 814.

The drive/stop signal and the rotating-direction instruction signal correspond to the switch state of the zoom switch 823, and the zooming motor driver 814 sets the phase order of four motor excitation phases to a phase order for forward rotation or a phase order for reverse rotation according to the rotating-direction instruction signal supplied from the AF microcomputer 812, and outputs voltages (or currents) for the respective four motor excitation phases to the zooming motor 813 while varying the voltages (or the currents), according to the drive/stop signal supplied from the AF microcomputer 812.

Thus, the rotating direction and rotating frequency of the zooming motor 813 are controlled, while the zooming motor driver 814 turns on/off its output to the zooming motor 813 according to the aforesaid drive/stop signal.

The position of the focusing lens 105 is detected by a position encoder 815, and the detection result is appropriately gain-controlled by an amplifying circuit 816 and supplied from the amplifying circuit 816 to a comparing circuit 817.

In the meantime, a target signal for moving the focusing lens 105 to a target position is supplied from the AF microcomputer 812 to the comparing circuit 817.

The comparing circuit 817 compares the signal from the amplifying circuit 816 and the target signal from the AF microcomputer 812, generates a deviation signal equivalent to the difference between the two signals, and supplies the deviation signal to an integrating circuit 818.

The integrating circuit 818 performs integration processing on the deviation signal supplied from the comparing circuit 817, and supplies the integral result to an adding circuit 819.

At this time, the detection result outputted from the position encoder 815 is differentiated by a differentiating circuit 820, and the differential result outputted from the differentiating circuit 820, i.e., information indicative of the current driving speed of the focusing lens 105, is also supplied to the adding circuit 819.

The adding circuit 819 adds together the integral result of the integrating circuit 818 and the differential result of the differentiating circuit 820, and sends the sum to a motor driver 821.

The motor driver 821 applies to a motor coil 822 a current according to the sum supplied from the adding circuit 819.

At this time, a reference voltage is applied to one end of the motor coil 822.

Accordingly, the motor driver 821 applies to the other end (to which the reference voltage is not applied) of the motor coil 822 a voltage which is positive or negative with respect to the reference voltage, thereby switching the polarity of the current flowing through the motor coil 822 to change the moving direction of the focusing lens 105. In addition, the motor driver 821 varies the levels of the voltages applied to the motor coil 822, thereby varying the amount of driving of the focusing lens 105.

Loop control is performed in the above-described manner. The purpose of feeding back the driving speed of the focusing lens 105 (the differential result of the differentiating circuit 820) by means of the differentiating circuit 820 is to stabilize the entire loop system and to inhibit an abrupt movement of the focusing lens 105 so that a natural picked-up image is obtained as well as so that the focusing lens 105 can be prevented from moving beyond its movable range and colliding with a mechanical member of an image pickup apparatus 800.

The target signal supplied from the AF microcomputer 812 to the comparing circuit 817 is generated by referring to a data table for a desired position to which the focusing lens 105 is to be moved. The data table contains, for example, the correlation between the output level of the target signal and the position of the focusing lens 105, and is previously stored in the AF microcomputer 812.

The zooming-operation control processing of the AF microcomputer 812 will be described below.

Figure 31:
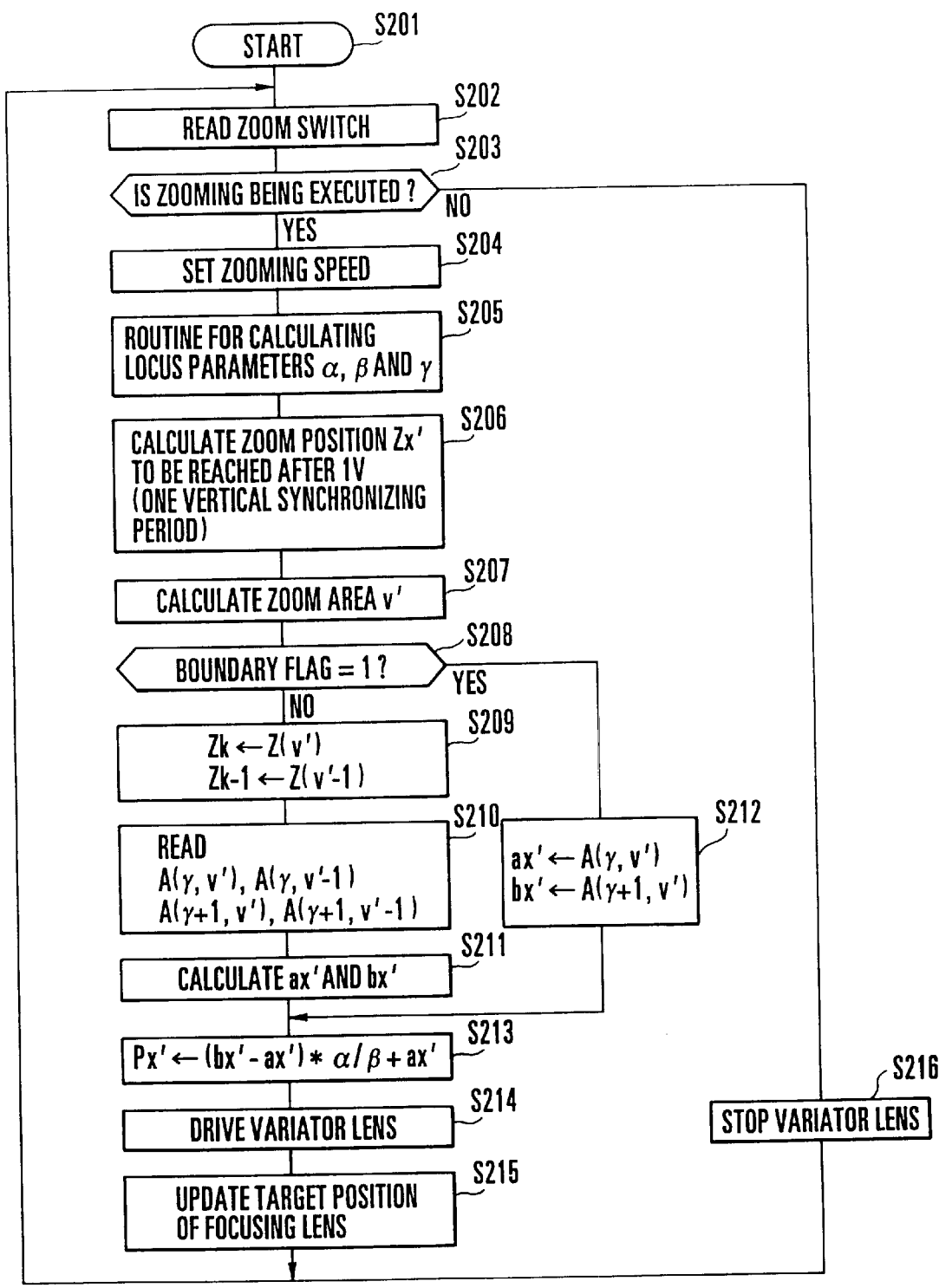
FIG. 31 is a flowchart aiding in describing zooming operation processing in the image pickup apparatus using a linear motor.

The AF microcomputer 812 is arranged to execute zooming-operation control processing once during one vertical synchronizing period in accordance with the flowchart shown in FIG. 31 by way of example.

Figure 32:
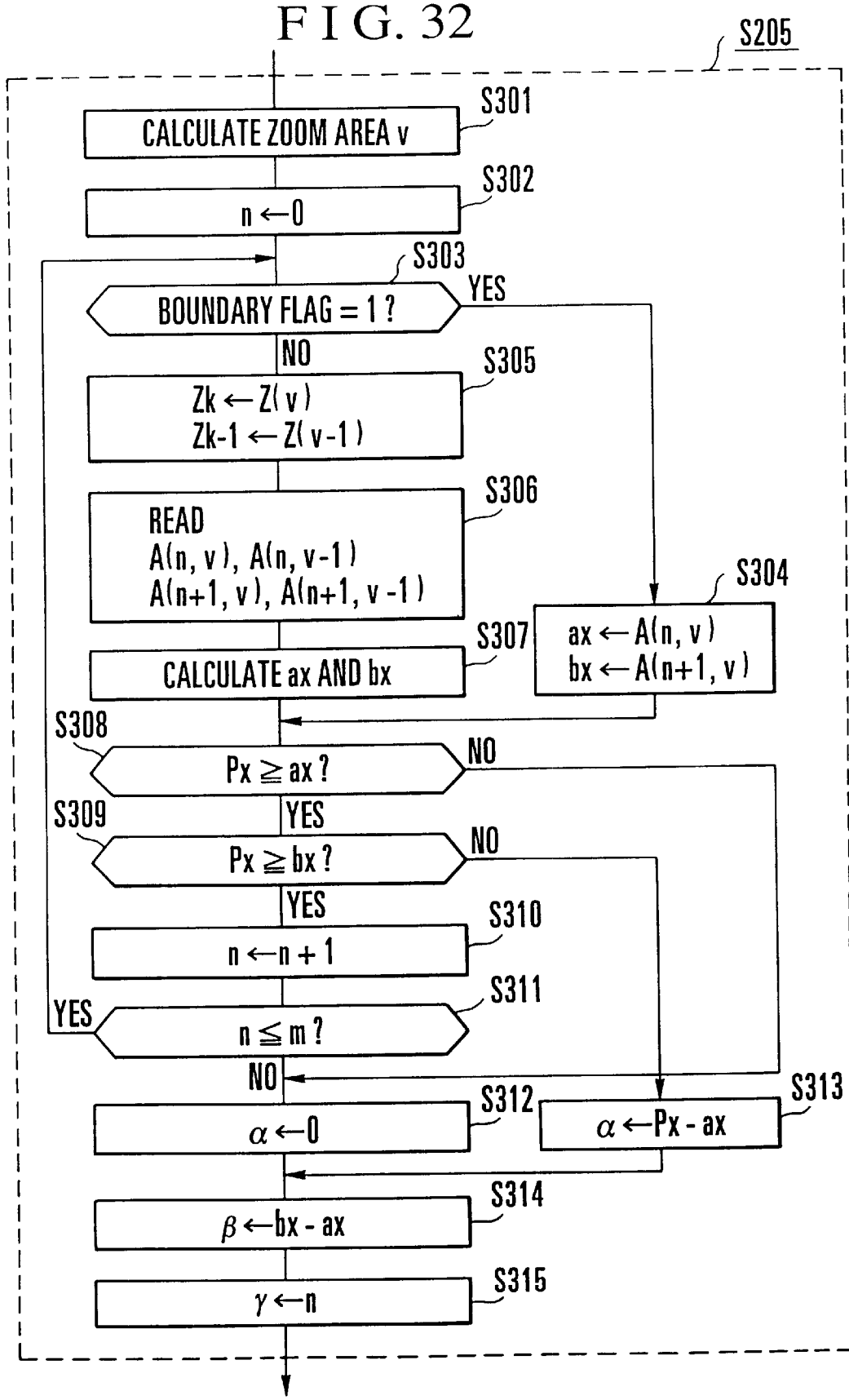
FIG. 32 is a flowchart aiding in describing the details of locus parameter calculating processing in the zooming operation processing.
Figure 33:
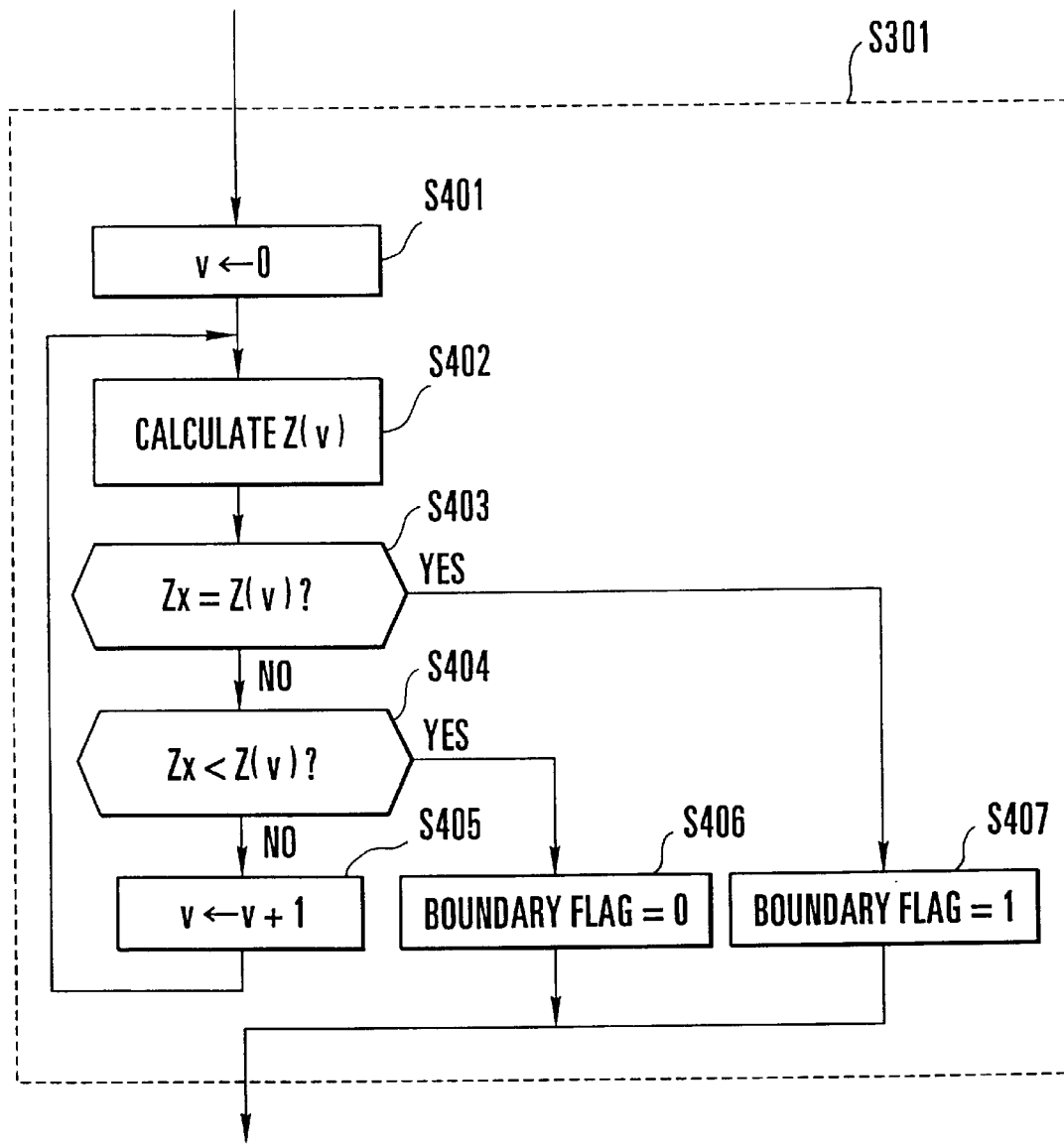
FIG. 33 is a flowchart aiding in describing the details of zoom area calculating processing in the locus parameter calculating processing.

FIG. 32 is a flowchart specifically showing the processing of Step S205 of FIG. 31, and FIG. 33 is a flowchart specifically showing the processing of Step S301 of FIG. 32.

Figure 34:
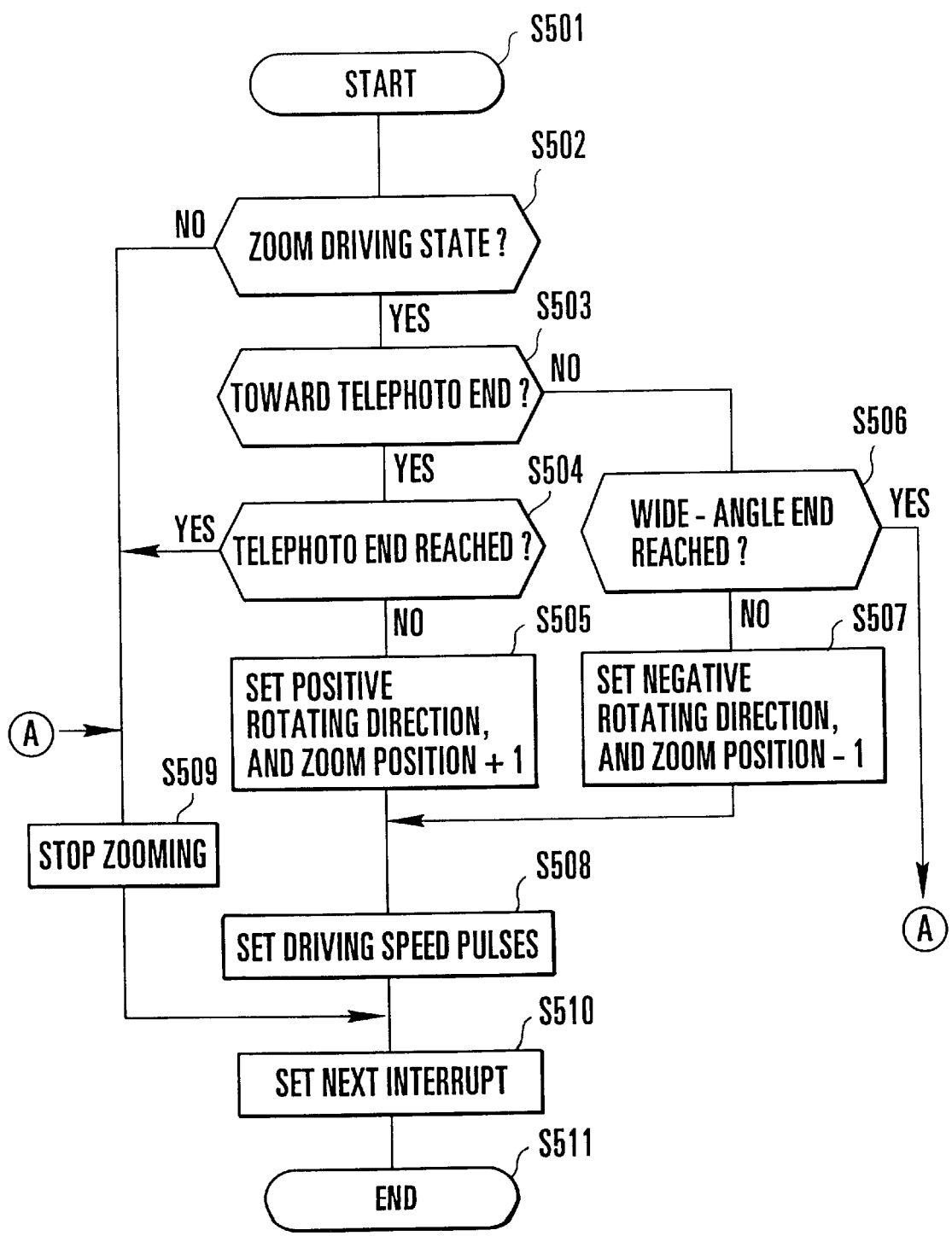
FIG. 34 is a flowchart aiding in describing the details of variator-lens driving processing in the zooming operation processing.

FIG. 34 is a flowchart specifically showing the processing of step S214 of FIG. 31.

Figure 35:
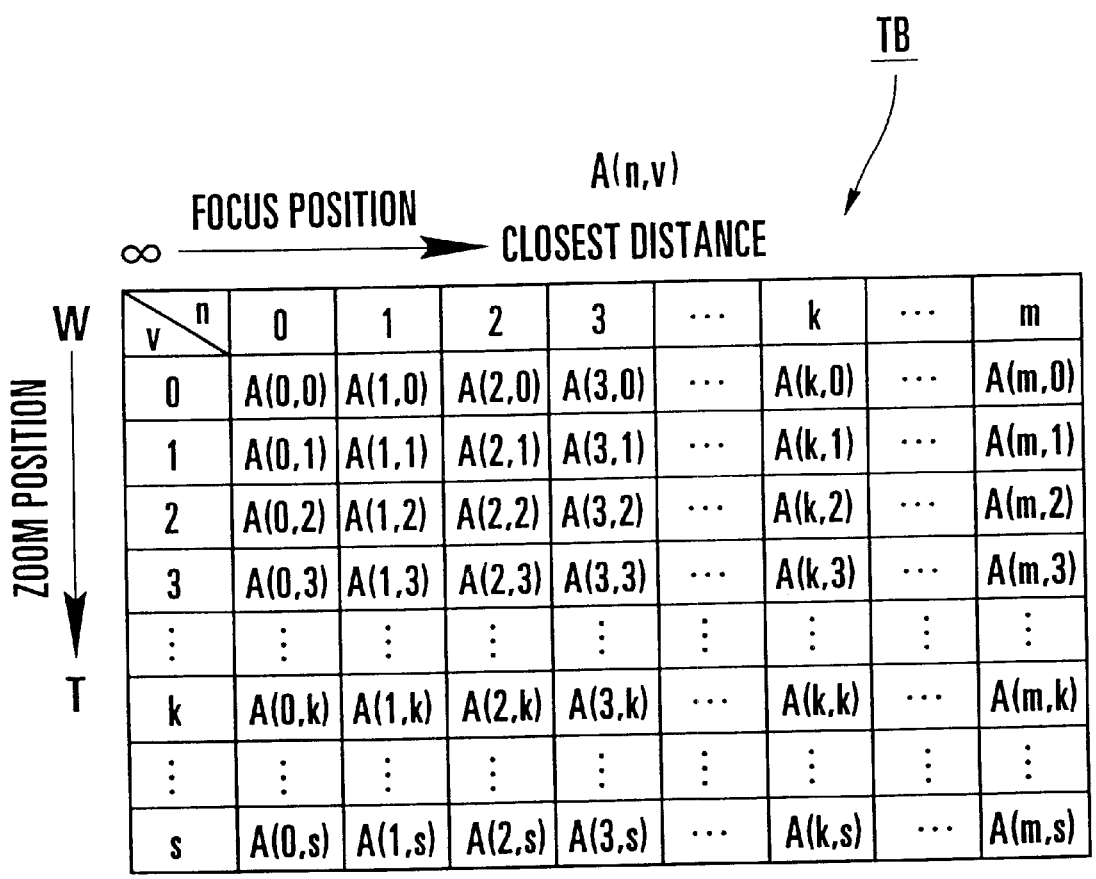
FIG. 35 is a view aiding in describing a data table of cam locus information.

FIG. 35 shows a data table TB of cam locus information, such as that shown in FIG. 3, which is stored in the AF microcomputer 812.

FIG. 35 shows in-focus position data A(n, v) for the focusing lens 105 for each subject distance, and the in-focus position of the focusing lens 105 varies according to the position of the variator lens 102 for each subject distance.

As shown in the data table TB, the position of the focusing lens 105 (subject distance) varies along the column of a variable (subject distance variable) n, and the position of the variator lens 102 (focal length) varies along the row of a variable (hereinafter referred to as an area or zoom area variable) v.

In this data table TB, n=0 represents the subject distance of a subject lying at infinity, and as n becomes larger, the subject distance varies toward a closest distance, and n=m represents a subject distance of 1 cm. Further, v=0 represents the position of the variator lens 102 lying at the wide-angle end, and as v becomes larger, the focal length increases, and v=s represents the position of the variator lens 102 lying at the telephoto end. According to the data table, one cam locus is drawn with one column of table data.

The zooming-operation control processing of the AF microcomputer 812 will be described below with reference to FIGS. 31 to 35.

First, the AF microcomputer 812 starts the zooming-operation control processing (Step S201) and reads a switch state of the zoom switch 823 (Step S202).

Then, the AF microcomputer 812 determines (Step S203) whether zooming is being executed, in accordance with the state of the zoom switch 823 which has been read in Step S202. If zooming is not being executed, the AF microcomputer 812 executes control for inhibiting the driving of the variator lens 102 and waits for the arrival of the next vertical synchronizing period (Step S216).

On the other hand, if zooming is being executed, the AF microcomputer 812 sets a zooming-operation driving speed (zooming speed) Zsp of the zooming motor 813 (Step S204), and executes Step S205 and the following processing.

Specifically, the distance to a subject which is being photographed is identified on the basis of the current positions of the variator lens 102 and the focusing lens 105, and information indicative of the identified subject distance is stored as three locus parameters α, β and γ in a RAM (random access memory) (not shown) or the like provided in the AF microcomputer 812 (Step S205).

The processing of Step S205 will be specifically described below. As shown in FIG. 32, for example, if an in-focus state is maintained with respect to the current positions of the variator lens 102 and the focusing lens 105, it is calculated (Step S301) which of the zoom areas v on the data table TB of FIG. 35 corresponds to a current position Zx of the variator lens 102, the zoom areas v being obtained by dividing the entire zoom area from the wide-angle end to the telephoto end into s equal areas, Step S301 will be specifically described below with reference to FIG. 33. Referring to FIG. 33, first, the zoom area variable v is cleared (Step S401).

Then, in Step S402, a zoom position Z(v) of the focusing lens 105 at a boundary in the area v is calculated by using the following equation:

$$Z(v)=(\text{zoom position for telephoto end}-\text{zoom position for wide-angle end})\times v/s+\text{zoom position for wide-angle end}. \quad (21)$$

This position Z(v) corresponds to any one of the positions Z0, Z1, Z2, ... of the variator lens 102 which are shown in FIG. 4 described previously.

Then, it is determined (Step S403) whether the zoom position Z(v) obtained in Step S402 is equal to a current zoom position Zx of the variator lens 102. If the zoom position Z(v) is equal to the zoom position Zx, it is determined (Step S407) that the zoom position Zx of the variator lens 102 lies on the boundary in the zoom area v, and a boundary flag is set to 1 (Step S407).

If the answer in Step S403 is false, it is determined whether the zoom position Z(v) calculated in Step S402 is greater than the current position Zx of the variator lens 102 (Step S404). If the answer in Step S404 is true, it is determined that the current position Zx of the variator lens 102 lies between Z(v−1) and Z(v), and the boundary flag is set to 0 (Step S406).

If the answer in Step S404 is false, the area (variable) v is incremented (v=v+1), and the process returns to Step S402.

When the above-described steps S401 to S407 are repeatedly performed and the processing of Step S301 which includes Step S401 to S407 is completed, it can be determined whether the current position Zx of the variator lens 102 is present in the k-th zoom area v on the data table TB shown in FIG. 35 and is present at a boundary in the k-th zoom area v.

When the area v is determined in the above-described processing of Step S301, it is calculated in Step S302 and the following processing where the position of the focusing lens 105 is on the data table TB shown in FIG. 35.

First, the subject distance variable n is cleared (Step S302).

Then, it is determined from the value of the aforesaid boundary flag whether the current position Zx of the variator lens 102 is present at a boundary in the k-th zoom area v (Step S303). If the value of the boundary flag is 0, it is determined that the current position Zx does not lie on the boundary, and Zk←Z(v) and Zk−1←Z(v−1) are set (Step S305).

Then, four table data A(n, v−1), A(n, v), A(n+1, v−1) and A(n+1, v) are read from the data table TB shown in FIG. 35 (Step S306), and ax and bx are calculated from the respective equations (2) and (3) described above (Step S307).

On the other hand, if it is determined in Step S303 that the value of the boundary flag is 1, it is determined that current position Zx of the variator lens 102 is present at the boundary, and the subject distance n and the in-focus positions A(n, v) and A(n+1, v) are read from the data table TB shown in FIG. 35, and memorized as ax and bx, respectively (Step S304).

If ax and bx are obtained in the processing of Step S307 or Step S304, then it is determined whether a current position Px of the focusing lens 105 is not less than ax (Step S308).

If the answer in Step S308 is true, it is determined whether the current position Px of the focusing lens 105 is not less than bx (Step S309).

If the answer in Step S309 is false, the following setting is performed:

α=Px−ax (Step S313),

β=bx−ax (Step S314), and

γ=n (Step S315).

If the answer in Step S308 is false, it is determined that the current position Px of the focusing lens 105 is at ultra infinity and the locus parameter α is set to α=0 (Step S312). Then, the above-described processing of Steps S314 and S315 is performed, and locus parameters for infinity are stored in the RAM.

If the answer in Step S309 is true, it is determined that the position Px of the focusing lens 105 is closer to the closest-distance end, and the subject distance n is incremented (n=n+1) (Step S310).

Then, it is determined whether the subject distance n is not greater than a closest subject distance m (Step S311). If the answer is true, the process returns to Step S303.

If the answer in Step S311 is false, it is determined that the position Px of the focusing lens 105 is at an ultra close distance, and the process proceeds to Step S312 and the following processing, in which the locus parameters α, β and γ for the closest distance are stored in the RAM.

Through Step S205 of FIG. 31 which includes the above-described steps S301 to S315, the locus parameters α, β and γ are stored in the RAM which indicate at which position on the cam loci shown in FIG. 2 the current positions of the variator lens 102 and the focusing lens 105 are present.

Then, a zoom position Zx' to be reached by the variator lens 102 after one vertical synchronizing period is calculated (Step S206).

Letting Zsp (pps) be the zooming speed set in Step S204, the zoom position Zx' to be reached by the variator lens 102 after one vertical synchronizing period is given by the following equation (22):

$$Zx'=Zx\pm Zsp/(\text{vertical synchronizing frequency}). \quad (22)$$

In Equation (22), the unit "pps" represents the rotating speed of the zooming motor 813, i.e., a stepping motor, and indicates the number of steps per second of the stepping motor during rotation (1 step=1 pulse). The sign "±" used in Equation (7) indicates different moving directions of the variator lens 102, and the sign "+" indicates that the variator lens 102 moves toward the telephoto end, while the sign "−" indicates that the variator lens 102 moves toward the wide-angle end.

Then, it is determined in which area v' the position Zx' calculated in Step S206 is present (Step S207).

Step S207 is a processing similar to that shown in FIG. 32, and Zx→Zx' and v→v' are set in a manner similar to that shown in FIG. 32.

Then, on the basis of the value of the boundary flag which has been set in Step S207, it is determined whether the position Zx' of the variator lens 102 after 1V (one vertical synchronizing period) is present at a boundary in the area v' (Step S208). If the value of the boundary flag is 0, it is determined that the position Zx' is not present at a boundary, and Zk←Z(v') and Zk−1←Z(v'−1) are set (Step S209).

Then, four table data A(γ, v'−1), A(γ, v'), A(γ+1, v'−1) and A(γ+1, v') for the subject distance γ identified by the processing shown in FIG. 32 are read (Step S210), and ax' and bx' are calculated from the respective equations (2) and (3) described above (Step S211).

On the other hand, if the value of the boundary flag is 1 in Step S208, it is determined that the position Zx' is present at a boundary, and the in-focus positions A(γ, v') and A(γ+1, v') for the subject distance γ and the area v' are read, and are memorized as ax' and bx', respectively (Step S212).

When ax' and bx' are obtained in Step S211 or S212, an in-focus position Px' to be reached by the focusing lens 105 when the variator lens 102 reaches the position Zx' is calculated (Step S213).

This in-focus focus position Px', i.e., a target trace position to be reached by the focusing lens 105 after one vertical synchronizing period, is calculated by the following equation (23) by using the above-described equation (1):

$$Px'=(bx'-ax')\times\alpha/\beta+ax'. \qquad (23)$$

Then, the zooming motor driver 814 is controlled so that the zooming motor 813 is driven at the zooming speed set in Step S204 (Step S214).

The processing of Step S214 will be specifically described. The driving of the zooming motor 813 is effected by executing the processing (interrupt processing) of the flowchart shown in FIG. 34 at an interrupt period corresponding to the driving speed of the zooming motor 813.

As described previously, the driving of the variator lens 102 is effected by supplying to the zooming motor 813 a frequency signal corresponding to the driving speed of the zooming motor 813 and a direction signal corresponding to the driving direction of the same.

If this processing (interrupt processing) is started (Step S501), a decision is made as to the current state of driving of the variator lens 102 (Step S502). If it is determined that the variator lens 102 is in a non-driven state, the driven state of the variator lens 102 is set to a stopped state (Step S509) and the next interrupt period is set (Step S510), and the processing shown in FIG. 34 is completed (Step S511).

If it is determined in Step S502 that the variator lens 102 is in a driven state, i.e., zooming is being executed, it is determined whether to move the variator lens 102 toward the telephoto end (Step S503).

If it is determined in Step S503 that the variator lens 102 needs to be moved toward the telephoto end, it is determined that the variator lens 102 has already reached the telephoto end (Step S504). If it is determined in Step S503 that the variator lens 102 does not need to be moved toward the telephoto end, i.e., the variator lens 102 needs to be moved toward the wide-angle end, it is determined that the variator lens 102 has already reached the wide-angle end (Step S506).

If it is determined in Step S506 that the variator lens 102 has already reached the wide-angle end, the process proceeds to Step S509, in which the movement of the variator lens 102 is inhibited.

If it is determined in Step S504 that the variator lens 102 has already reached the telephoto end, the process similarly proceeds to Step S509, in which the movement of the variator lens 102 is inhibited.

If it is determined in Step S506 that the variator lens 102 has not yet reached the wide-angle end, the driving direction of the zooming motor driver 814 is set to a negative rotating direction and the position Zx of the variator lens 102 is decremented by 1 (Step S507).

If it is determined in Step S504 that the variator lens 102 has not yet reached the telephoto end, the driving direction of the zooming motor driver 814 is set to a positive rotating direction and the position Zx of the variator lens 102 is incremented by 1 (Step S505).

After the processing of Step S507 or S505, the logic of a current frequency signal is inverted so that a frequency signal corresponding to the driving speed of the variator lens 102 can be outputted to the zooming motor driver 814 (Step S508).

Specifically, in the processing of the fourth embodiment, since interrupts are caused in accordance with the driving frequency, the output logic for the zooming motor driver 814 is successively inverted in Step S508. Thus, a pulse train corresponding to the driving frequency is generated, and the zooming motor driver 814 rotates the zooming motor 813 by controlling the excitation phase of the zooming motor 813 in accordance with the switching of the logic of the pulse train and the driving direction of the zooming motor 813. Thus, the variator lens 102 moves in accordance with the rotation of the zooming motor 813.

Then, the next interrupt period is set (Step S510), and the processing shown in FIG. 34 is completed (Step S511).

When the variator lens 102 is moved by the processing of Step S214 which includes the above-described steps S501 to S511, the comparing circuit 817 is supplied with a target signal which corresponds to the target trace position Px' (obtained from Equation (23)) to be reached by the focusing lens 105 after one vertical synchronizing period (Step S215).

In this manner, the focusing lens 105 is moved to the target position at the response speed determined by the above-described loop control, and the focusing lens 105 is held at the target position until the next updating of the target position.

By executing the above-described control processing in accordance with the flowchart of FIG. 31, a destination to be reached by the variator lens 102 after one vertical synchronizing period is predicted, and a trace destination on a cam locus to be reached by the focusing lens 105 according to the position of the destination of the variator lens 102 is determined. Accordingly, it is possible to inhibit defocusing during the tracing of a cam locus.

The AF operation control processing of the AF microcomputer 812 will be described below.

Figure 36:
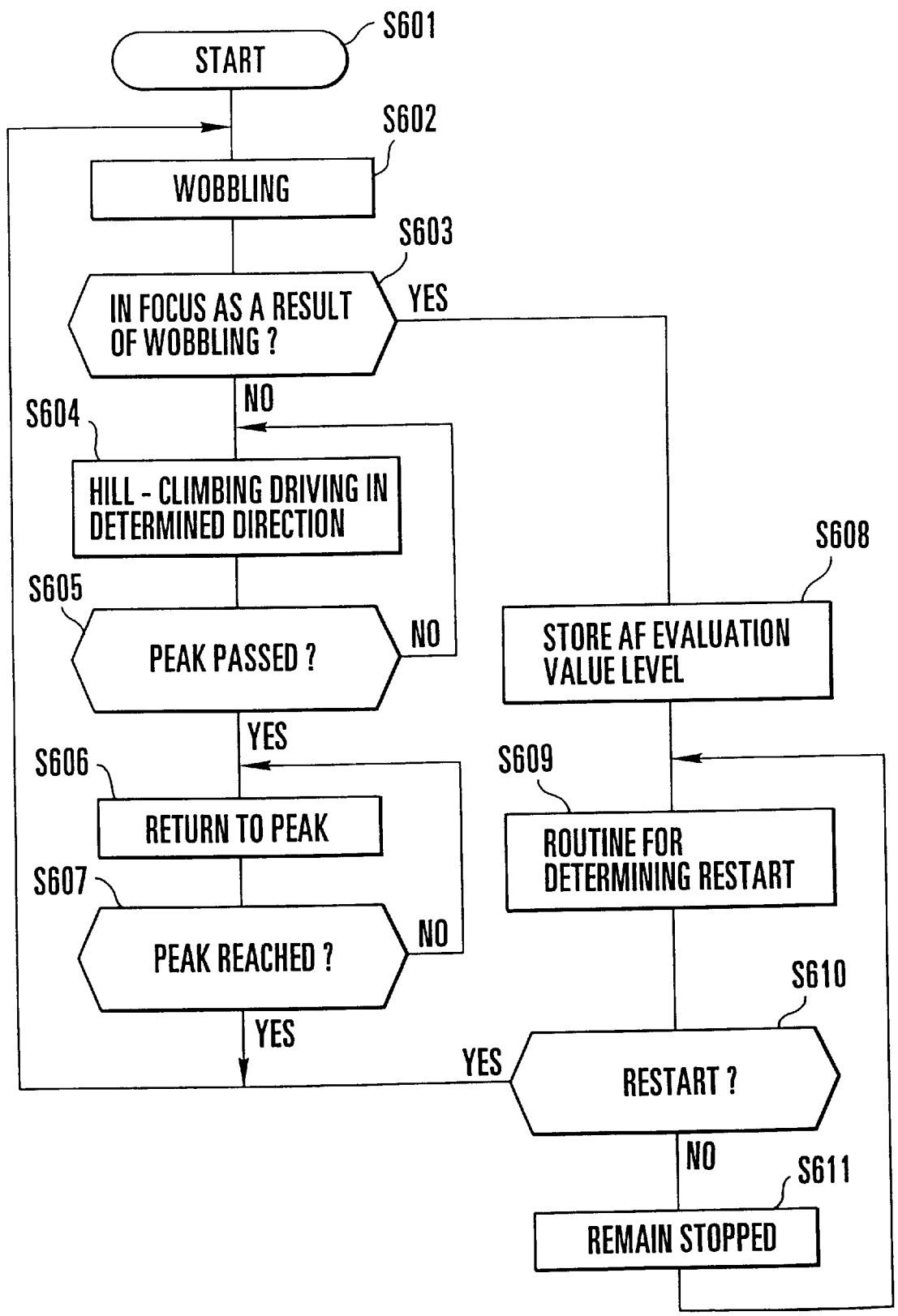
FIG. 36 is a flowchart aiding in describing autofocus operation processing.

Incidentally, in the flowchart of FIG. 36, the driving control of the focusing lens 105 is carried out by successively updating a target position which is a trace destination on a cam locus to be reached by the focusing lens 105, as described above with reference to the flowchart of FIG. 31.

When the processing is started (Step S601), the AF microcomputer 812 executes the control of driving the focusing lens 105 by a small amount through a wobbling operation, and obtains the above-described AF evaluation signal to determine whether the current state of focus is an in-focus state or an out-of-focus state (Step S602).

Incidentally, if it is determined that the state of focus is an out-of-focus state, it is determined whether the state of focus is a near-focus state or a far-focus state.

Then, the AF microcomputer 812 determines whether the focusing lens 105 is currently in focus, from the result of the wobbling operation of Step S602 (Step S603).

If the AF microcomputer 812 determines in Step S603 that the focusing lens 105 is in focus, the AF microcomputer 812 executes control for stopping the focusing lens 105, and the process proceeds to a restart monitoring routine (to be described later) which starts from Step S608.

On the other hand, if it is determined that the focusing lens 105 is not in focus, the process proceeds to a hill-climbing operation processing routine (to be described later) which starts from Step S604.

In the hill-climbing operation processing routine, first of all, the AF microcomputer 812 executes the hill-climbing operation of driving the focusing lens 105 in a defocusing direction in accordance with the result of the decision made in Step S602, i.e., according to whether the state of focus is a near-focus state or a far-focus state (Step S604).

Then, the AF microcomputer 812 determines whether an in-focus point, i.e., the peak of the AF evaluation signal has been passed (Step S605). If it is determined that the peak of the AF evaluation signal has not been passed, the process returns to Step S604 in which the AF microcomputer 812 continues the hill-climbing operation.

If the AF microcomputer 812 determines in Step S605 whether the peak has been passed, the AF microcomputer 812 executes the driving control of the focusing lens 105 so as to return the level of the AF evaluation signal to the peak (Step S606).

Then, the AF microcomputer 812 determines whether the level of the AF evaluation signal has reached the peak (Step S607), and if it is determined that the level of the AF evaluation signal has not reached the peak, the process returns to Step S606.

If it is determined in Step S607 that the level of the AF evaluation signal has reached the peak, the process returns to Step S602.

While the operation of returning the level of the AF evaluation signal to the peak is being performed, the state of a subject may vary, as by panning. For this reason, when the level of the AF evaluation signal reaches the peak, the process returns to Step S602 to again execute a wobbling operation in order to determine whether the current level of the AF evaluation signal has certainly reached the peak, i.e., whether the current position of the focusing lens 105 is an in-focus point.

In the restart monitoring routine, first, the AF microcomputer 812 memorizes the signal level of the AF evaluation signal level obtained during the in-focus state (Step S608).

Then, the AF microcomputer 812 determines whether the current signal level of the AF evaluation signal has varied compared to the signal level of the AF evaluation signal memorized in Step S608 during the in-focus state (step S609).

For example, if the current signal level of the AF evaluation signal has varied by not less than a predetermined percent with respect to the memorized signal level, it is determined that the state of the subject has changed, as by panning, and the driving of the focusing lens 105 needs to be restarted. If the amount of variation in the current signal level of the AF evaluation signal is less than the predetermined percent, it is determined that the state of the subject has not changed and the driving of the focusing lens 105 does not need to be restarted.

Then, it is determined whether to restart the driving of the focusing lens 105, according to the result of the decision made in Step S609 (Step S610). If a restart of the driving of the focusing lens 105 is not needed, the AF microcomputer 812 executes control for stopping the focusing lens 105 is stopped at a position where it is located at that time (Step S611). Then, the process returns to the restart determining routine of Step S609.

On the other hand, if it is determined in Step S610 that a restart of the driving of the focusing lens 105 is needed, the process returns to Step S602 and the processing which starts from Step S602, i.e., the wobbling operation, is again performed to determine in which direction to move the focusing lens 105.

By repeating the above-described processing of Step S602 to S611, the focusing lens 105 is driven so that the in-focus state is maintained at all times.

However, the above-described arrangement has a number of problems. For example, in the image pickup apparatus 800 shown in FIG. 30, i.e., a conventional image pickup apparatus using a linear motor for driving a focusing, during any of a hill-climbing operation for focus adjustment, a direction determining operation based on a wobbling operation and a hill-top determining operation, high-speed driving of the focusing lens is carried out in accordance with the response characteristics of feedback loop and the driving is immediately stopped when the focusing lens reaches a target position. For this reason, the repetition of a driven state and a stopped state appears on the picture of an image being picked up, so that a visually impaired video image which exhibits a non-smooth discontinuous motion is picked up during a movement of the focusing lens.

In particular, even if the state of focus is to be determined with the amount of driving of the focusing lens being kept within an allowable depth of field, as in the case of a wobbling operation which is executed near a hill top near an in-focus point, the frequency of switching of the focusing lens from the driven state to the stopped state is high. As a result, if a subject which exceeds an allowable depth of field outside an in-focus subject distance is present in the picture of an image being picked up, the repetition of the driven state and the stopped state particularly conspicuously appears on the picture.

In addition, as the amount of movement of the focusing lens to be moved becomes larger, current energy to be applied to the linear motor becomes larger, so that, for example, even if the focusing lens reaches a target position, the focusing lens overshoots the target position. Accordingly, the oscillation of the focusing lens at the target position increases and the time required for the focusing lens to stabilize at the target position becomes longer. Accordingly, a focus voltage signal according to an in-focus position is affected by the oscillation, and a malfunction may also be induced. The oscillation may also appear as defocusing on the picture of an image being picked up. Furthermore, since the positional error of an actual arrival position relative to the target position becomes large, a deviation occurs between the recognition of the position of the focusing lens by a lens control microcomputer or the like and an actual recognition of the position of the focusing lens, so that a problem occurs such as impairment of an AF operation.

Furthermore, in a zooming operation, before the variator lens reaches a predicted position after one vertical synchronizing period, the focusing lens may reach a focus correction position relative to the predicted position, and if an image which is not blurred is picked up by photography using a low variation rate in an angle of view such as low-speed zooming, defocusing may become visible by an amount equivalent to the difference between the arrival times of the variator lens and the focusing lens.

Furthermore, if the respective lens positions of the focusing and variator lenses are controlled by actuators having different response characteristics, for example, a linear motor is used as an actuator for driving the focusing lens and a stepping motor is used as an actuator for driving the variator lens, it is difficult to establish synchronization such as adjustment of stop positions of both lenses.

Specifically, if a stepping motor is used as an actuator for driving the focusing lens, the focusing lens is moved at an optimum focus tracing speed according to the inclination of a cam locus and a variation in the position of the focusing lens coincides with the slope of the cam locus so that an in-focus state can be maintained with respect to an arbitrary position of the variator lens. In contrast, if a linear motor or the like is used, since the above-described loop control is executed, the moving speed of the focusing lens is determined by the response characteristics of a loop, so that it becomes difficult to execute the control of moving the focusing lens at a moving speed at a moving speed according to the slope of a cam locus.

Specifically, in a zooming operation with the linear motor, as described above, since the position of the variator lens approaches an in-focus point within one vertical synchronizing period after the focusing lens reaches a target in-focus position, defocusing occurs for only a short time, but does not appear on the picture of an image being picked up. However, in the processing based on the flowchart of FIG. 34, if the variator lens reaches a zoom end before the position of the variator lens reaches a predicted position to be reached by the variator lens after one vertical synchronizing period, the movement of the variator lens is inhibited before one vertical synchronizing period elapses, so that the variator becomes unable to approach the predicted position any more. However, since the focusing lens already reaches a focus correction position relative to the above-described predicted position, the time period of occurrence of defocusing becomes long and visible defocusing occurs when the variator lens reaches th zoom end.

In this manner, although the zooming operation using the linear motor can realize high-speed zooming because of its superior high-speed performance, it is difficult to establish synchronization, such as adjustment of the stop positions of both of the focusing lens and the variator lens, owing to the difference in response performance between the different kinds of actuators for driving the focusing lens and the variator lens.

Each embodiment to be described later is intended to eliminate the above-described defects, and its object is to provide an image pickup apparatus, a control method therefor, a storage medium in which such control method is stored and a lens control apparatus all of which are capable of realizing comfortable autofocus and zooming operations by enabling pseudo speed control even in the case of lens position control using a linear motor.

Another object of each of the following embodiments is to provide an image pickup apparatus, a control method therefor, a storage medium in which such control method is stored and a lens control apparatus all of which are capable of realizing a comfortable zooming operation by correcting a deviation between the response performances of actuators having different response characteristics, such as a linear motor and a stepping motor, even in the case of lens position control using such actuators.

To achieve the above objects, there is provided an image pickup apparatus which comprises image pickup means, a movable part which is movable along an optical axis for performing focus adjustment, an actuator for driving the movable part, position-of-movable-part detecting means for detecting a position of the movable part, focus control means for extracting a predetermined focus signal from an output of the image pickup means, determining a state of focus and supplying a driving signal which causes the movable part to move toward an in-focus position, according to the determined state of focus, and position control means for performing position control of the movable part via the actuator by updating the driving signal by a plurality of times during a predetermined time period so that an average moving speed of the movable part during the predetermined time period becomes a predetermined speed.

In addition, the actuator is a linear motor, and the position control means updates a target position n times during the predetermined time period by an amount of movement, s/n, at a time with respect to an amount of movement, s, by which the movable part moves at the predetermined speed, and uses a driving signal corresponding to the updated target position as the driving signal to be supplied to the linear motor by the focus control means.

In addition, there is provided an image pickup apparatus which comprises image pickup means including a lens and an image pickup element, an actuator for moving a movable part along an optical axis defined by the lens and the image pickup element, the movable part being either one of the lens and the image pickup element, position-of-movable-part detecting means for detecting a position of the movable part, extracting means for extracting a focus voltage signal from an output signal of the image pickup means, and focus control means for determining whether a state of focus is an in-focus state, according to a signal level of the focus voltage signal extracted by the extracting means, and supplying a driving signal which causes the movable part to move toward an in-focus position, to the actuator according to the determined state of focus, the focus control means including first control means for calculating a target position to which the movable part is made to move, on a first control cycle according to the signal level of the focus voltage signal extracted by the extracting means, and second control means for updating the driving signal to be supplied to the actuator, on a second control cycle, the second control means executing updating of the driving signal on the second control cycle so that an average moving speed at which the movable part continues to move until the movable part reaches the target position calculated by the first control means becomes a predetermined speed, as well as so that the movable part gradually approaches the target position until the movable part reaches the target position.

In addition, there is provided an image pickup apparatus which comprises a first lens group for performing a magnification varying operation, a second lens group and an image pickup element either one of which constitutes a movable part for correcting a movement of a focal plane during a movement of the first lens group, position-of-movable-part detecting means for detecting a position of the movable part, driving means for driving the movable part by supplying a driving signal to an actuator for moving the movable part along an optical axis, storage means for storing, according to a subject distance, an in-focus position of the movable part relative to a position of the first lens group, predicting means for predicting a destination position to be reached by the first lens group after a predetermined time period, during the magnification varying operation, calculating means for calculating a correction position of the movable part for correcting a movement of the focal plane with respect to the destination position predicted by the predicting means according to information stored in the storage means, and position control means for performing position control of the movable part so that, after the predetermined time period, the movable part reaches the correction position calculated by the calculating means, the position control means controlling a movement of the movable part so that an average moving speed of the movable part during the predetermined time period becomes a predetermined speed.

In addition, there is provided an arrangement which comprises a first lens group for performing a magnification varying operation, first driving means for moving the first lens group, a second lens group and an image pickup element either one of which constitutes a movable part for correcting a movement of a focal plane during a movement of the first lens group, position-of-movable-part detecting means for detecting a position of the movable part, second driving means for driving the movable part by supplying a driving signal to an actuator for moving the movable part along an optical axis, storage means for storing, according to a subject distance, an in-focus position of the movable part relative to a position of the first lens group, predicting means for predicting a destination position to be reached by the first lens group after a predetermined time period, during the magnification varying operation, calculating means for calculating a correction position of the movable part for correcting a movement of the focal plane with respect to the destination position predicted by the predicting means according to information stored in the storage means, and position control means for performing position control of the movable part so that, after the predetermined time period, the movable part reaches the correction position calculated by the calculating means, a moving speed of the first lens group being controlled so that a position to be reached by the first lens group after the predetermined time period becomes coincident with an end position of a movable range of the first lens group if the destination position predicted by the predicting means exceeds the end position.

In addition, there is provided an image pickup apparatus which comprises a first lens group for performing a magnification varying operation, first driving means for moving the first lens group, a second lens group and an image pickup element either one of which constitutes a movable part for correcting a movement of a focal plane during a movement of the first lens group, position-of-movable-part detecting means for detecting a position of the movable part, second driving means for driving the movable part by supplying a driving signal to an actuator for moving the movable part along an optical axis, storage means for storing, according to a subject distance, an in-focus position of the movable part relative to a position of the first lens group, and control means for performing position control of the movable part for correcting a movement of the focal plane due to a variation in position of the first lens group during the magnification varying operation, according to information stored in the storage means, the movable part being forcedly moved to an in-focus position relative to a stop position of the first lens group at the instant when the magnification varying operation stops.

In addition, there is provided an image pickup apparatus which comprises a first lens group for performing a magnification varying operation, a second lens group and an image pickup element either one of which constitutes a movable part for performing focus adjustment as well as correcting a movement of a focal plane during the magnification varying operation, first control means for performing position control of the first lens group to move the first lens group along an optical axis, and second control means for performing position control of the movable part to move the movable part along the optical axis, a control cycle of the second control means being made shorter than a control cycle of the first control means at least if a position of the first lens group is present in a predetermined area.

In addition, there is provided a method of controlling an image pickup apparatus, which comprises the steps of causing an actuator to move a movable part along an optical axis defined by a lens and an image pickup element, the movable part being either one of the lens and the image pickup element, determining a state of focus, and performing position control of the movable part so that the movable part moves toward an in-focus position, according to the determined state of focus, a driving signal for moving the movable part being given to the actuator while being updated by a plurality of times during a predetermined time period so that an average moving speed of the movable part during the predetermined time period becomes a predetermined speed.

In addition, there is provided a method of controlling an image pickup apparatus, which comprises the steps of causing an actuator to move a movable part along an optical axis defined by a lens and an image pickup element, the movable part being either one of the lens and the image pickup element, determining whether a state of focus is an in-focus state, according to a signal level of a focus voltage signal obtained from an output signal of the image pickup element, and performing position control of the movable part so that the movable part moves toward an in-focus position, according to the determined state of focus, a target position to which the movable part is made to move according to the signal level of the focus voltage signal being calculated on a first control cycle, and the driving signal to be given to the actuator being updated on a second control cycle so that an average moving speed at which the movable part continues to move until the movable part reaches the calculated target position becomes a predetermined speed, as well as so that the movable part gradually approaches the target position until the movable part reaches the target position.

In addition, there is provided a method of controlling an image pickup apparatus, which comprises the steps of causing an actuator to move either one of a second lens group and an image pickup element, which constitutes a movable part for correcting a movement of a focal plane during a movement of a first lens group for performing a magnification varying operation, along an optical axis defined by the second lens group and the image pickup element, predicting a destination position to be reached by the first lens group after a predetermined time period during the magnification varying operation, and calculating a correction position of the movable part for correcting a movement of the focal plane with respect to the predicted destination position of the first lens group, by means of a memory which stores an in-focus position of the movable part relative to a position of the first lens group according to a subject distance, and performing position control of the movable part so that, after the predetermined time period, the movable part reaches the calculated correction position, a movement of the movable part being controlled so that an average moving speed of the movable part during the predetermined time period becomes a predetermined speed.

In addition, there is provided a method of controlling an image pickup apparatus, which comprises the steps of causing an actuator to move either one of a second lens group and an image pickup element, which constitutes a movable part for correcting a movement of a focal plane during a movement of a first lens group for performing a magnification varying operation, along an optical axis defined by the second lens group and the image pickup element, predicting a destination position to be reached by the first lens group after a predetermined time period during the magnification varying operation, and calculating a correction position of the movable part for correcting a movement of the focal plane with respect to the predicted destination position of the first lens group, by means of a memory which stores an in-focus position of the movable part relative to a position of the first lens group according to a subject distance, and performing position control of the movable part so that, after the predetermined time period, the movable part reaches the calculated correction position, a moving speed of the first lens group being controlled so that a position to be reached by the first lens group after the predetermined time period becomes coincident with an end position of a movable range of the first lens group if the destination position predicted by the predicting means exceeds the end position.

In addition, there is provided a method of controlling an image pickup apparatus, which comprises the steps of causing an actuator to move either one of a second lens group and an image pickup element, which constitutes a movable part for correcting a movement of a focal plane during a movement of a first lens group for performing a magnification varying operation, along an optical axis defined by the second lens group and the image pickup element, predicting a destination position to be reached by the first lens group after a predetermined time period during the magnification varying operation, and calculating a correction position of the movable part for correcting a movement of the focal plane with respect to the predicted destination position of the first lens group, by means of a memory which stores an in-focus position of the movable part relative to a position of the first lens group according to a subject distance, and performing position control of the movable part so that, after the predetermined time period, the movable part reaches the calculated correction position, the movable part being forcedly moved to an in-focus position relative to a stop position of the first lens group at the instant when the magnification varying operation stops.

In addition, there is provided a method of controlling an image pickup apparatus which performs position control of a first lens group for performing a magnification varying operation and either one of a second lens group and an image pickup element, which constitutes a movable part for performing focus adjustment as well as correcting a movement of a focal plane during the magnification varying operation, so that the first lens group and the movable part are respectively moved along an optical axis, a control cycle of the movable part being made shorter than a control cycle of the first lens group at least if a position of the first lens group is present in a predetermined area.

In addition, there is provided an arrangement which comprises a movable part which is movable along an optical axis for performing focus adjustment, an actuator for driving the movable part, position-of-movable-part detecting means for detecting a position of the movable part, focus control means for determining a state of focus and supplying to the actuator a driving signal which causes the movable part to move toward an in-focus position, according to the determined state of focus, and position control means for performing position control of the movable part via the actuator by updating the driving signal by a plurality of times during a predetermined time period so that an average moving speed of the movable part during the predetermined time period becomes a predetermined speed.

Fourth Embodiment

A fourth embodiment of the present invention will be described below with reference to the accompanying drawings.

Figure 18:
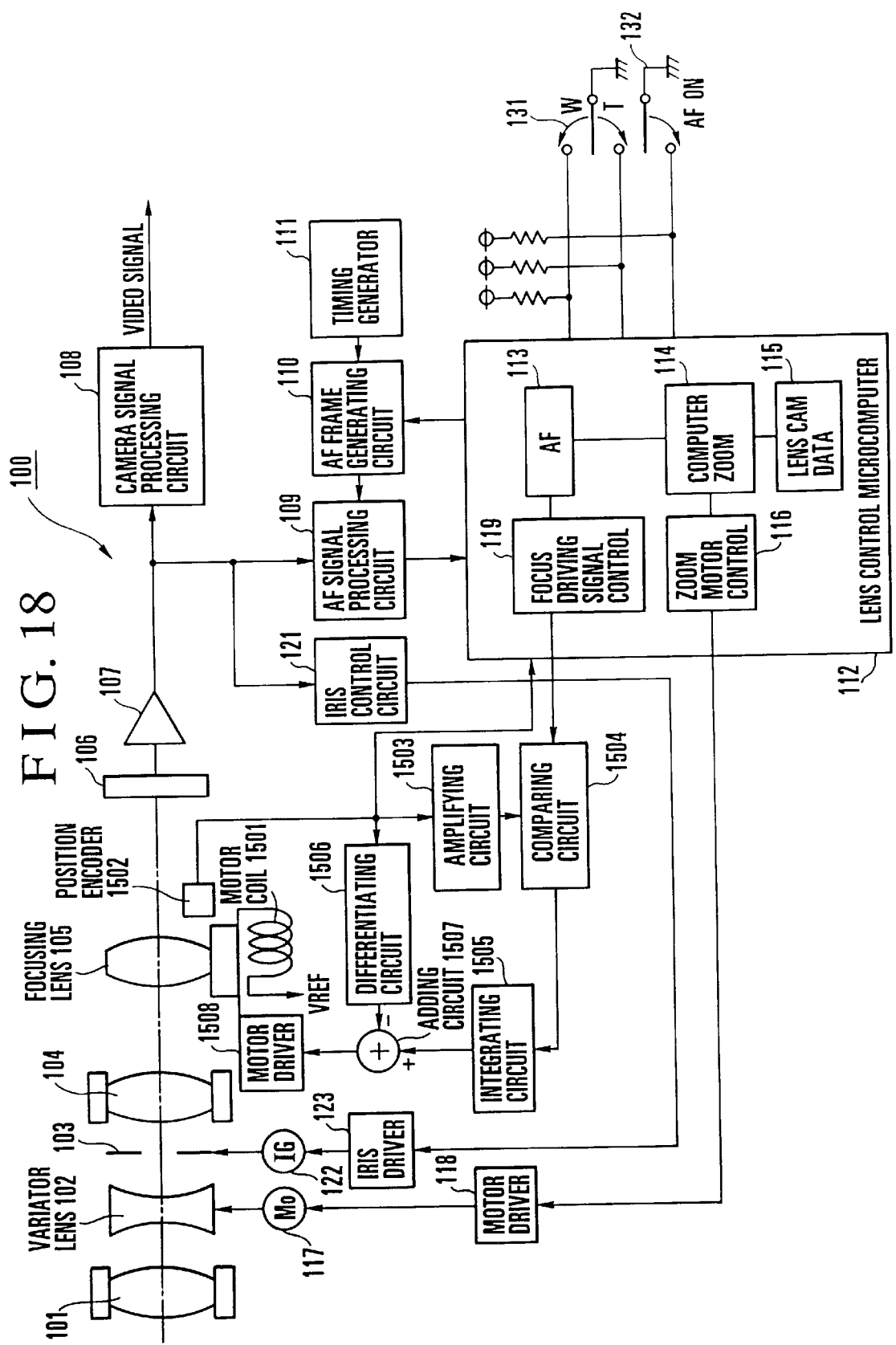
FIG. 18 is a block diagram showing the arrangement of an image pickup apparatus according to a fourth embodiment of the present invention.

A method of controlling an image pickup apparatus according to the fourth embodiment of the present invention is carried out by using the image pickup apparatus 100 shown in FIG. 18 by way of example.

The image pickup apparatus 100 is one example to which the image pickup apparatus or the lens control apparatus according to the present invention is applied, and a storage medium according to the present invention is applied to various processing programs built in the lens control microcomputer 112 (which will be described later) of the image pickup apparatus 100.

As shown in FIG. 18, the image pickup apparatus 100 adopts an inner focus type of lens system which includes the fixed first lens group 101, the second lens group (variator lens) 102 arranged to perform a magnification varying operation, the iris 103, the fixed third lens group 104, and the fourth lens group (focusing lens) 105 which has both a focus adjusting function and the function of correcting the movement of a focal plane (compensation function).

The image pickup apparatus 100 also includes the image pickup element 106 on which image light passing through the aforesaid lens system is focused, the amplifier 107 to which the output of the image pickup element 106 is supplied, a camera signal processing circuit 108, an iris control circuit 128, the AF signal processing circuit 109, the output of the amplifier 107 being supplied to each of the circuits 108, 128 and 109, the lens control microcomputer 112 to which the output of the AF signal processing circuit 109 is supplied, the timing generator 111, and the AF frame generating circuit 110 to which the output of the timing generator 111 is supplied. The output of the AF frame generating circuit 110 is supplied to the AF signal processing circuit 109, while the output of the lens control microcomputer 112 is supplied to the AF frame generating circuit 110, and a video signal obtained by picking up an image is outputted from the camera signal processing circuit 108.

The image pickup apparatus 100 also includes the position encoder 1502 for detecting the positional state of the focusing lens 105, the amplifying circuit 1503 and the differentiating circuit 1506 to each of which the output of the position encoder 1502 is supplied, the comparing circuit 1504 to which the output of the amplifying circuit 1503 and the output of the lens control microcomputer 112 are supplied, the integrating circuit 1505 to which the output of the comparing circuit 1504 is supplied, the adding circuit 1507 to which the output of the differentiating circuit 1506 and the output of the integrating circuit 1505 are supplied, the motor driver 1508 to which the output of the adding circuit 1507 is supplied, and the motor 1501 for the focusing lens 105 to which the output of the motor driver 1508 is supplied. The output of the position encoder 1502 is also supplied to the lens control microcomputer 112.

The image pickup apparatus 100 further includes the motor driver 118 to which the output of the lens control microcomputer 112 is supplied, the motor 117 for the variator lens 102 to which the output of the motor driver 118 is supplied, the iris driver 123 to which the output of the iris control circuit 121 is supplied, and the IG meter 122 to which the output of the iris driver 123 is supplied.

A sequence of operations of the above-described image pickup apparatus 100 will be described below.

Light (image light) from a subject (not shown) passes through the first lens group 101, the variator lens 102, the iris 103, the third lens group 104 and the focusing lens 105 in that order, and is focused on the image pickup surface of the image pickup element 106 made from a CCD or the like. The focused image light is converted into a video signal by photoelectric conversion in the image pickup element 106, and the video signal is supplied to the amplifier 107.

The amplifier 107 amplifies the video signal supplied from the image pickup element 106 to an optimum signal level, and supplies the amplified signal to the camera signal processing circuit 108.

The camera signal processing circuit 108 performs predetermined signal processing on the video signal supplied from the amplifier 107, and generates a standard television signal. The camera signal processing circuit 108 outputs th standard television signal to, for example, a display part or a recording part (not shown).

The video signal amplified by the amplifier 107 is also supplied to each of the AF signal processing circuit 109 and the iris control circuit 121.

The iris control circuit 121 drives and controls the IG meter 122 via the iris driver 123 according to the level of the video signal supplied from the amplifier 107, thereby making adjustment of the amount of light at the iris 103.

At this time, the AF frame generating circuit 110 generates a gate signal for gating a predetermined area of an image picked up on the image pickup surface of the image pickup element 106, in response to vertical and horizontal synchronizing signals supplied from the timing generator 111 in accordance with AF-frame control (to be described later) provided by the lens control microcomputer 112, and outputs the gate signal to the AF signal processing circuit 109.

The AF signal processing circuit 109 extracts only a high-frequency component of the video signal contained in an AF frame from the video signal supplied from the amplifier 107, in response to the gate signal supplied from the AF frame generating circuit 110, and performs predetermined processing such as the processing of generating an AF evaluation signal.

The lens control microcomputer 112 is an AF microcomputer for lens control, and includes, for example, the AF program 113 for making focus adjustment according to the strength of the AF evaluation signal generated by the AF signal processing circuit 109, the zoom control program 114 for maintaining the focusing lens 105 in an in-focus state while causing the focusing lens 105 to trace a cam locus, the lens cam data 115 to be referred to by the lens control microcomputer 112 during the tracing of a cam locus, the zooming motor control program 116 for driving the variator lens 102 during zooming, and a focus control program 119 for driving the focusing lens 105 during AF. The lens control microcomputer 112 is arranged to perform control of lens driving, AF frame control for varying a distance measuring area, and the like.

Incidentally, various processing programs such as the AF program 113, the zoom control program 114, the lens cam data 115, the zooming motor control program 116 and the focus control program 119 may also be stored in, for example, a ROM (read-only memory) which is externally connected to the apparatus.

The AF microcomputer 112 is arranged to be supplied with information indicative of the switch state of each of a zoom switch 131 and an AF switch 132 which are provided on the apparatus, and executes the aforesaid various programs on the basis of such switch-state information, thereby carrying out various control processing such as the control of lens driving and the AF frame control.

The lens control microcomputer 112 supplies an instruction to drive the variator lens 102 to the motor driver (hereinafter referred to as the zooming motor driver) 118, in accordance with the switch state of the zoom switch 131, thereby causing the zooming motor driver 118 to drive the motor (hereinafter referred to as the zooming motor) 117 for variator lens 102.

The zooming motor 117 consists of, for example, a stepping motor, and determines the driving speed of the zooming motor 117 by executing the zooming motor control program 116 and supplies the determined driving speed to the zooming motor driver 118 as a rotating-frequency signal for the zooming motor 117.

The lens control microcomputer 112 also supplies a drive/stop signal and a rotating-direction instruction signal for the zooming motor 117 to the zooming motor driver 118.

The drive/stop signal and the rotating-direction instruction signal correspond to the switch state of the zoom switch 131, and the zooming motor driver 118 sets the phase order of four motor excitation phases to a phase order for forward rotation or a phase order for reverse rotation according to the rotating-direction instruction signal supplied from the lens control microcomputer 112, and outputs voltages (or currents) for the respective four motor excitation phases to the zooming motor 117 while varying the voltages (or the currents), according to the drive/stop signal supplied from the lens control microcomputer 112.

Thus, the rotating direction and rotating frequency of the zooming motor 117 are controlled, while the zooming motor driver 118 turns on/off its output to the zooming motor 117 according to the aforesaid drive/stop signal.

The position of the focusing lens 105 is detected by the position encoder 1502, and the detection result is appropriately gain-controlled by the amplifying circuit 1503 and supplied from the amplifying circuit 1503 to the comparing circuit 1504.

In the meantime, a target signal for moving the focusing lens 105 to a target position is supplied from the lens control microcomputer 112 to the comparing circuit 1504.

The comparing circuit 1504 compares the signal from the amplifying circuit 1503 and the target signal from the lens control microcomputer 112, generates a deviation signal equivalent to the difference between the two signals, and supplies the deviation signal to the integrating circuit 1505.

The integrating circuit 1505 performs integration processing on the deviation signal supplied from the comparing circuit 1504, and supplies the integral result to the adding circuit 1507.

At this time, the detection result outputted from the position encoder 1502 is differentiated by the differentiating circuit 1506, and the differential result outputted from the differentiating circuit 1506, i.e., information indicative of the current driving speed of the focusing lens 105, is also supplied to the adding circuit 1507.

The adding circuit 1507 adds together the integral result of the integrating circuit 1505 and the differential result of the differentiating circuit 1506, and sends the sum to the motor driver 1508.

The motor driver 1508 applies to the motor 1501 a current according to the sum supplied from the adding circuit 1507.

The motor 1501 consists of, for example, a linear motor such as a moving coil type of voice coil motor, and is arranged to drive the focusing lens 105 by means of the moving mechanism shown in FIGS. 16(A) and 16(B).

Specifically, a reference voltage is applied to one end of the motor (motor coil) 1501. The motor driver 1508 applies to the other end (to which the reference voltage is not applied) of the motor coil 1501 a voltage which is positive or negative with respect to the reference voltage, thereby switching the polarity of the current flowing through the motor coil 1501 to change the moving direction of the focusing lens 105. In addition, the motor driver 1508 varies the levels of the voltages applied to the motor coil 1501, thereby varying the amount of driving of the focusing lens 105.

Loop control is performed in the above-described manner. The purpose of feeding back the driving speed of the focusing lens 105 (the differential result of the differentiating circuit 1506) by means of the differentiating circuit 1506 is to stabilize the entire loop control system and to inhibit an abrupt movement of the focusing lens 105 so that a natural picked-up image is obtained as well as so that the focusing lens 105 can be prevented from moving beyond its movable range and colliding with a mechanical member of the image pickup apparatus 100.

The target signal supplied from the lens control microcomputer 112 to the comparing circuit 1504 is generated by referring to a data table for a desired position to which the focusing lens 105 is to be moved. The data table contains, for example, the correlation between the output level of the target signal and the position of the focusing lens 105, and is previously stored in the lens control microcomputer 112.

The driving control of the focusing lens 105 in the AF mode will be described below.

In the image pickup apparatus 100, the present invention is applied to a steady moving operation of the focusing lens 105, such as a hill-climbing operation, and the motor coil 1501 for driving the focusing lens 105, i.e., the linear motor, is driven so that the average moving speed of the focusing lens 105 becomes a predetermined speed during the AF mode.

The focus control program 119 contains, for example, a processing program based on the flowchart of FIG. 36, and this processing program is executed by the lens control microcomputer 112. In the fourth embodiment, the processing contents of Step S604 (hill-climbing operation) and Step S606 (the operation of returning the position of the focusing lens 105 to "the top of the hill") in the above-described flowchart are greatly different from the conventional ones.

Figure 19:
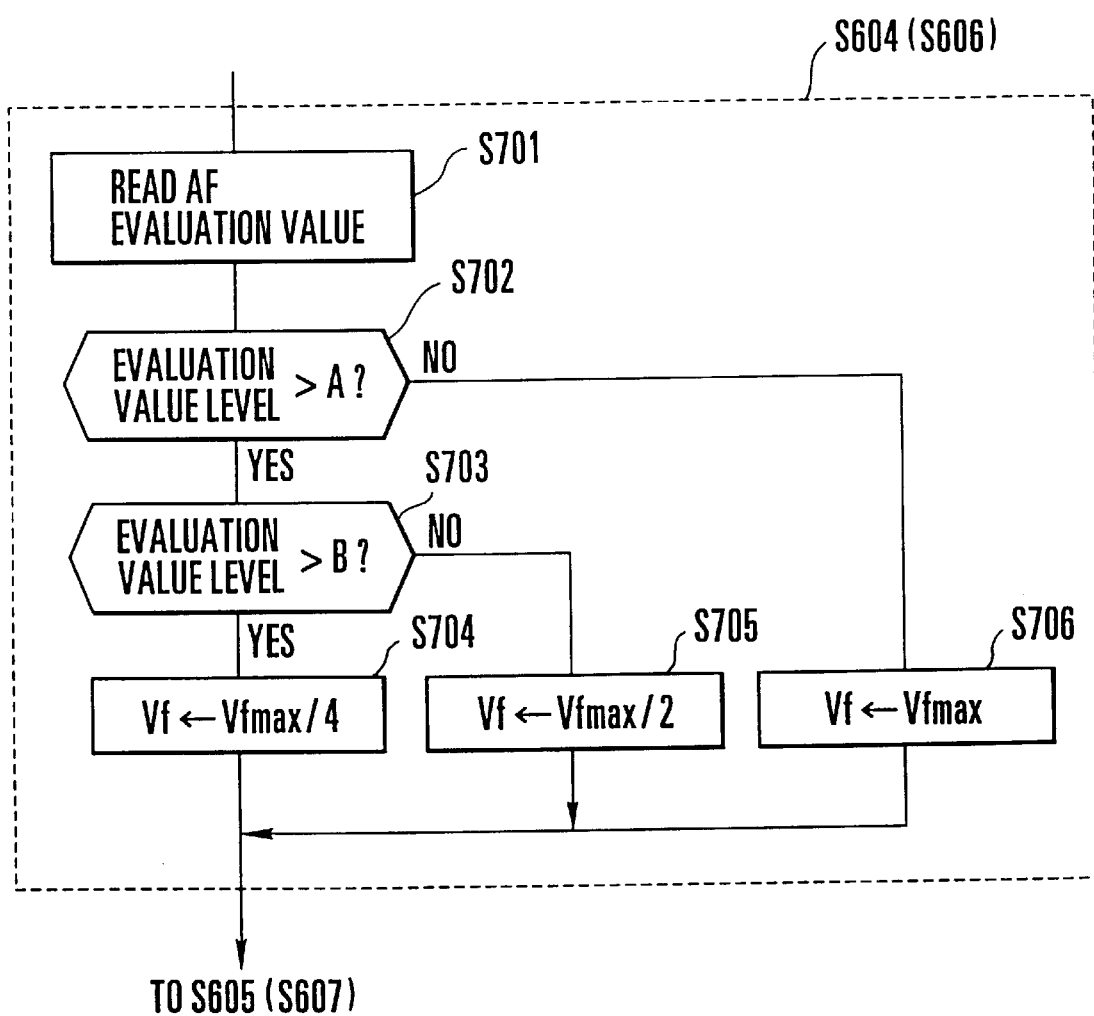
FIG. 19 is a flowchart aiding in describing the details of high-climbing driving processing in the fourth embodiment.

FIG. 19 is a flowchart specifically showing the processing of Step S604 in the fourth embodiment, and as shown in FIG. 19, the processing of Step S604 is similar to that of Step S606.

Figure 20:
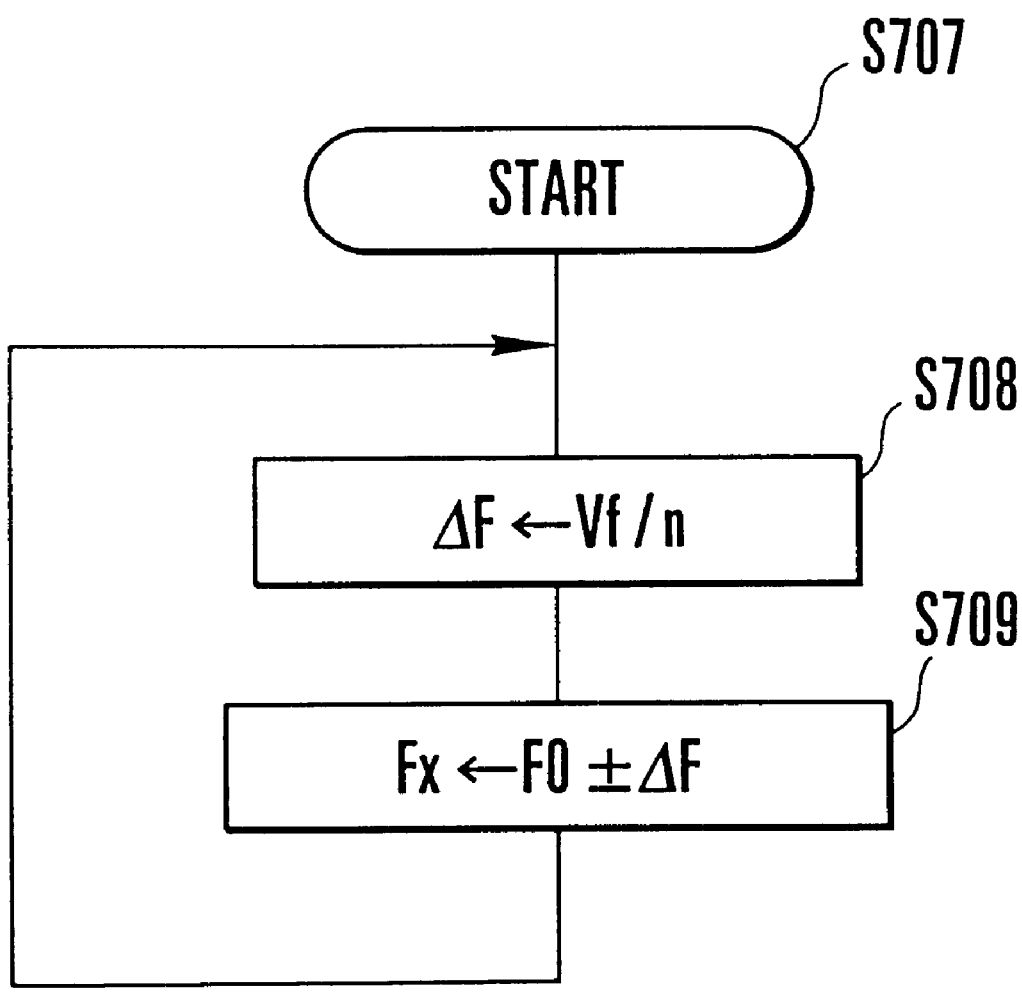
FIG. 20 is a flowchart aiding in describing the processing of generating a driving target signal to be supplied from a microcomputer to a comparing circuit in the fourth embodiment.

FIG. 20 is a flowchart showing the processing of generating a target signal to be supplied from the lens control microcomputer 112 to the comparing circuit 1504.

Processing steps to be executed before and after Steps S604 and S606 have been described previously, and the detailed description of the processing steps is omitted.

As shown in FIG. 19, first, the lens control microcomputer 112 reads an AF evaluation signal (focus voltage signal) relative to the current position of the focusing lens 105 (Step S701) and determines whether the signal level of the read AF evaluation signal is greater than a threshold A (Step S702).

If it is determined in Step S702 that the signal level of the AF evaluation signal is greater than the threshold A, the lens control microcomputer 112 determines whether the signal level of the AF evaluation signal is greater than a threshold B (Step S703).

If it is determined in Step S703 that the signal level of the AF evaluation signal is greater than the threshold B, i.e., the signal level of the AF evaluation signal is greater than each of the thresholds A and B, the lens control microcomputer 112 determines that the focusing lens 105 is positioned near the top of the hill and is approximately in focus (defocused to a small extent), and executes the processing of Step S704 which will be described later.

If it is determined in Step S703 that the signal level of the AF evaluation signal is not greater than the threshold B, i.e., the signal level of the AF evaluation signal is greater than the threshold A and is less than the threshold B, the lens control microcomputer 112 determines that the focusing lens 105 is positioned halfway up the hill and defocused to a medium extent. Then, the lens control microcomputer 112 executes the processing of Step S705 which will be described later.

If it is determined in Step S702 that the signal level of the AF evaluation signal is not greater than the threshold A, the lens control microcomputer 112 determines that the focusing lens 105 is positioned at the foot of the hill and defocused to a great extent. Then, the lens control microcomputer 112 executes the processing of Step S706 which will be described later.

In the above-described hill-climbing operation, it is desirable to control the moving speed of the focusing lens 105 so that the position of the focusing lens 105 can move as fast as possible near the foot of the hill.

In this case, an image is picked up in a defocused state, so that the movement of the focusing lens 105 is not visually observed.

In addition, it is desirable to control the moving speed of the focusing lens 105 so that as the focusing lens 105 approaches the top of the hill, the moving speed of the focusing lens 105 is decreased so as to prevent the motion of the focusing lens 105 from appearing on a picked-up image.

If it is determined through Step S702 and Step S703 that the focusing lens 105 is defocused to a great extent, the moving speed per unit time, Vf, of the focusing lens 105 is set to a maximum speed Vfmax to which the focusing lens 105 can respond (Step S706). If the focusing lens 105 is defocused to a medium extent, the moving speed Vf is set to Vfmax/2 (Step S705). If the focusing lens 105 is defocused to a small extent, the moving speed Vf is set to Vfmax/4 (Step S704).

After the completion of all of the above-described steps, the process proceeds to Step S605 or S607 of FIG. 36, in which the processing of Step S701 to Step S706 shown in FIG. 19 is repeated until the position of the focusing lens 105 passes or returns to the top of the hill. Thus, the moving speed of the focusing lens 105 is controlled according to the signal level of the AF evaluation signal.

During the above-described processing according to the flowchart of FIG. 19, the updating of the position of the focusing lens 105 is performed by processing according to the flowchart shown in FIG. 20.

It is assumed here that although the processing shown in FIG. 19 is performed sixty times per unit time (in the case of the NTSC system) in synchronism with each vertical synchronizing period, the processing shown in FIG. 20 is performed n times per unit time at a processing cycle shorter than the cycle of the processing shown in FIG. 19.

First, if the processing of FIG. 20 is started (Step S707), the amount of movement, $\Delta F$, by which the focusing lens 105 is moved each time the processing shown in FIG. 20 is executed once is calculated (Step S708).

The amount of movement $\Delta F$ is calculated with Equation (24) by using the moving speed per unit time, Vf, of the focusing lens 105 obtained in the processing of FIG. 19:

$$\Delta F = Vf/n. \tag{24}$$

Then, a target position Fx to which the focusing lens 105 is to be moved is calculated from a current position F0 of the focusing lens 105 by using Equation (25) (Step S709):

$$Fx = F0 \pm \Delta F. \tag{25}$$

The sign "±" used in Equation (25) indicates different moving directions of the focusing lens 105, and the sign "+" indicates the movement of the focusing lens 105 toward the closest-distance end, while the sign "−" indicates the movement of the focusing lens 105 toward the infinity end. The driving direction in which to move the focusing lens 105 is obtained from the result of the wobbling operation or a direction in which to return the position of the focusing lens 105 to the top of the hill, in the processing of the flowchart shown in FIG. 36.

Accordingly, a driving voltage signal corresponding to the target position Fx obtained in Step S709 is supplied from the lens control microcomputer 112 to the comparing circuit 1504, and the movement of the focusing lens 105 is performed by the feedback loop system.

As the above-described processing of Step S707 to Step S709 is repeatedly performed, the moving speed of the focusing lens 105 per one cycle becomes a moving speed determined by feedback loop characteristics, while the average moving speed of the focusing lens 105 for one vertical synchronizing period becomes equivalent to the moving speed Vf obtained by the above-described processing shown in FIG. 19.

Accordingly, if a linear motor is used as the motor 1501 for driving the focusing lens 105, pseudo control of the speed of the focusing lens 105 is performed so that a smooth focus adjustment operation can be performed.

Fifth Embodiment

A fifth embodiment of the present invention will be described below.

In the above description of the fourth embodiment, reference has been made to the example in which the present invention is applied to the steady moving operation of the focusing lens 105, such as a hill-climbing operation, in the image pickup apparatus 100 shown in FIG. 18. In the following description of the fifth embodiment, reference will be made to an example in which the present invention is applied to a wobbling operation in a case where the amount of movement of the focusing lens 105, i.e., the amount of movement which is equivalent to an amplitude for the wobbling operation, is determined.

As in the case of the above-described fourth embodiment, the processing program based on the above-described flowchart of FIG. 36 is contained in, for example, the focus control program 119, and the processing program is executed by the lens control microcomputer 112. However, in the fifth embodiment, the processing contents of Step S602 greatly differ from those of Step S602 which have been described above with reference to FIG. 36.

Figure 21:
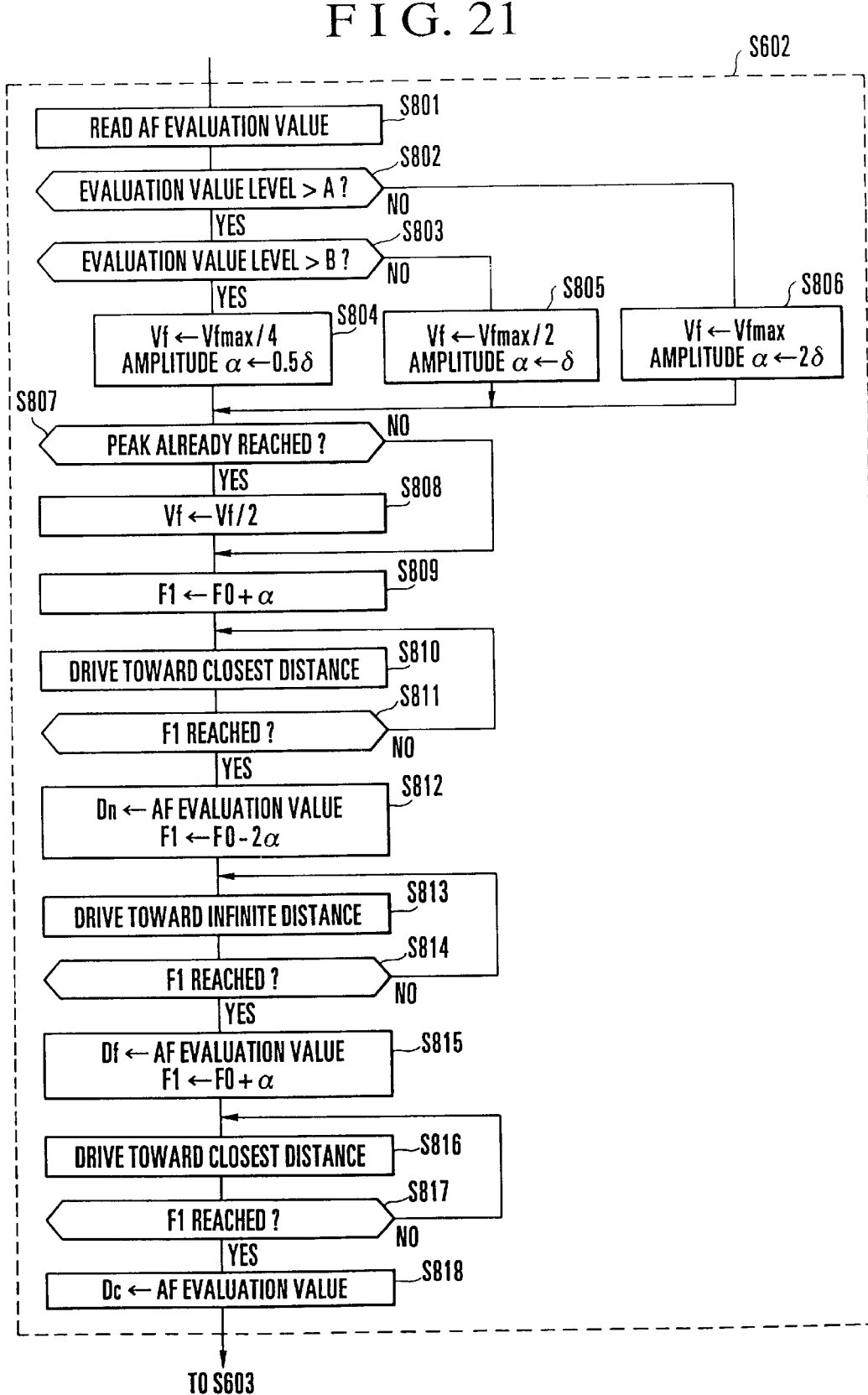
FIG. 21 is a flowchart aiding in describing the details of wobbling operation processing in a fifth embodiment of the present invention.

FIG. 21 is a flowchart specifically showing the processing of Step S602 according to the fifth embodiment.

Figure 22:
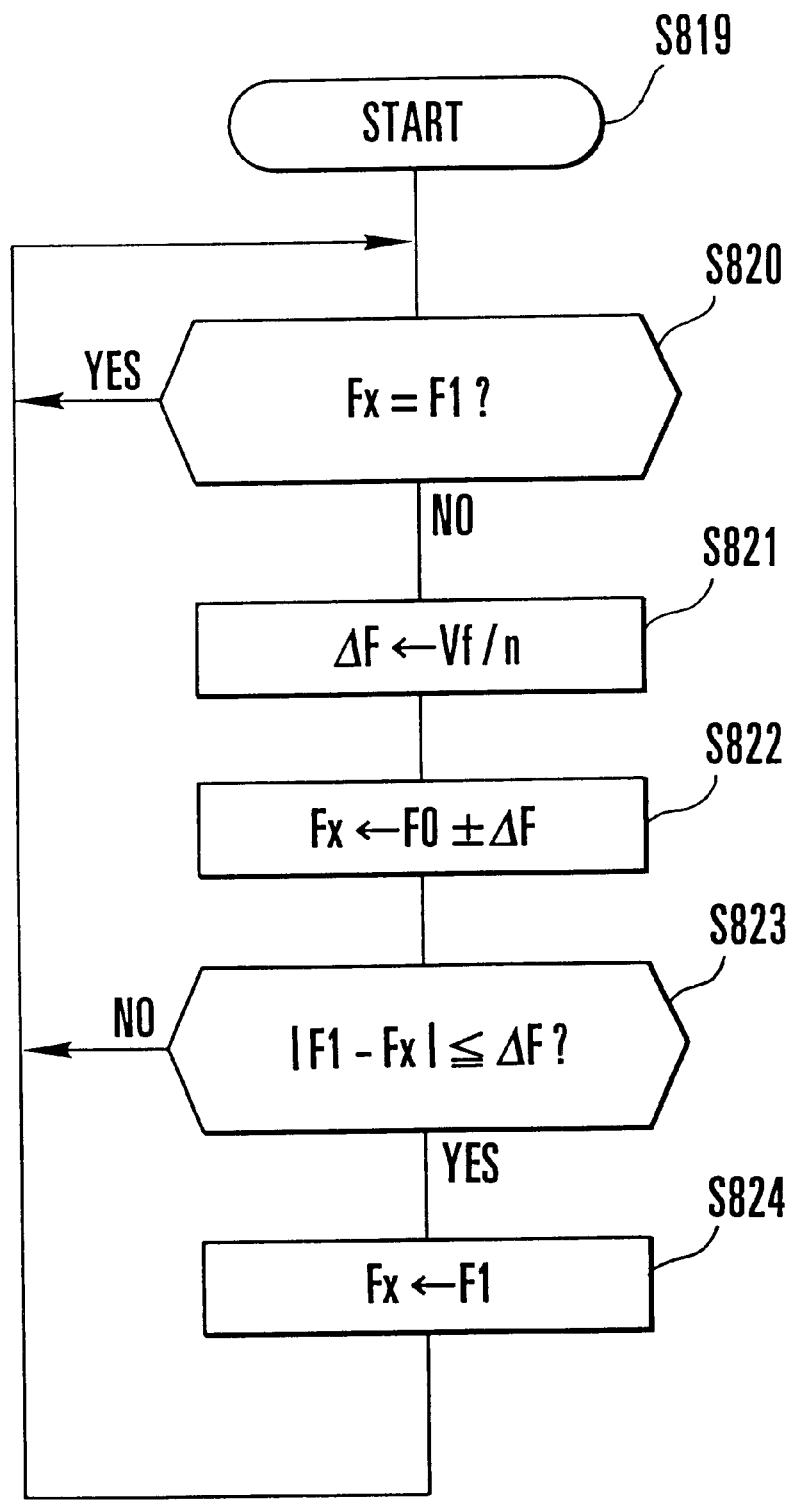
FIG. 22 is a flowchart aiding in describing position control processing for the focusing lens during a wobbling operation.

FIG. 22 is a flowchart showing the processing of performing position control of the focusing lens 105 during a wobbling operation. A processing program based on this flowchart is also contained in the focus control program 119, and is executed by the lens control microcomputer 112.

The wobbling operation and its amplitude will be described below with reference to FIG. 23 before the wobbling operation according to the fifth embodiment is described with reference to FIGS. 21 and 22.

Figure 23:
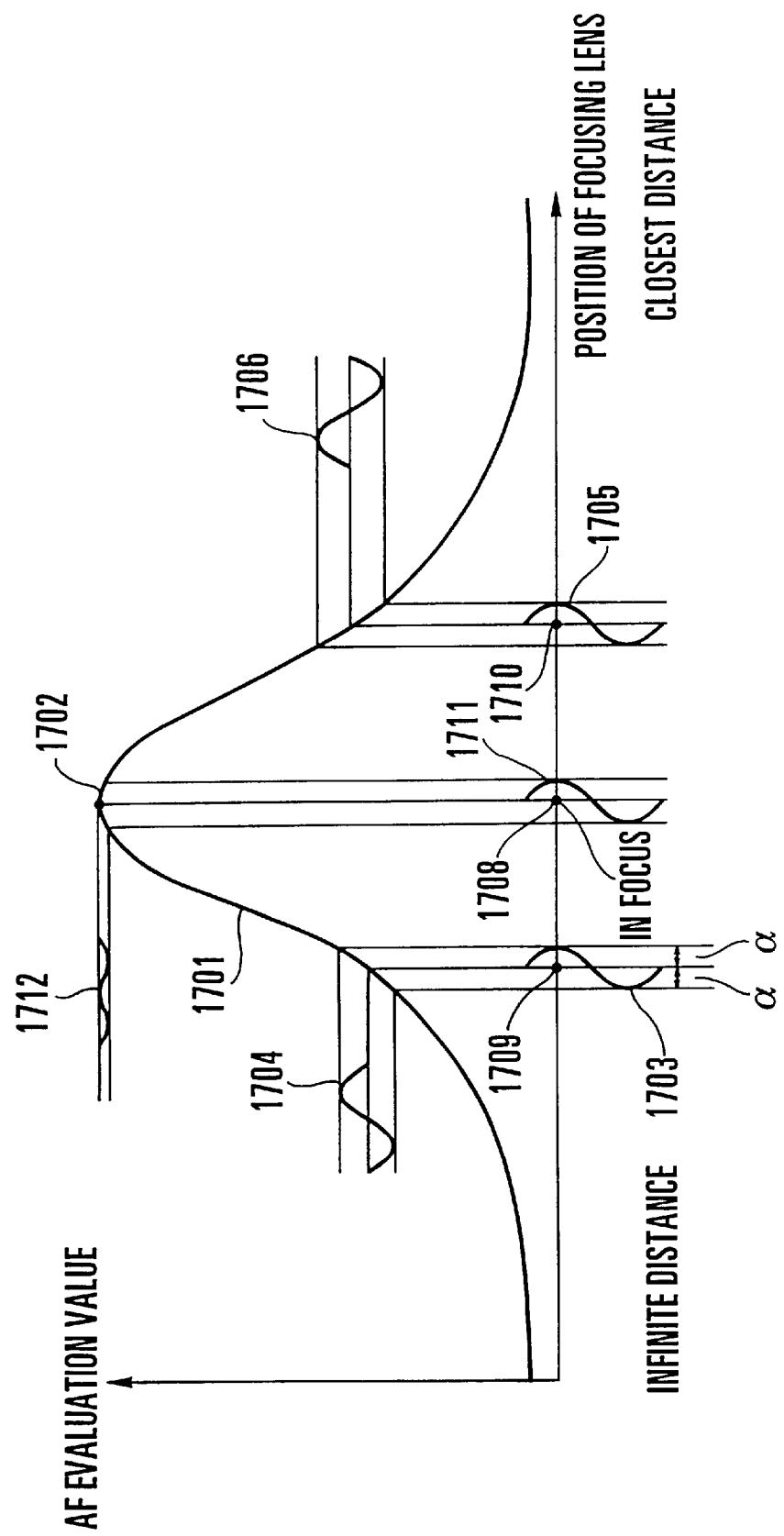
FIG. 23 is a view aiding in describing the wobbling operation and its amplitude.

FIG. 23 is a graph showing a hill 1701 representative of a variation in the signal level of an AF evaluation signal obtained when the focusing lens 105 is moved from the infinity end to the closest-distance end with respect to an arbitrary subject.

In FIG. 23, the horizontal axis represents the position of the focusing lens 105, while the vertical axis represents the signal level of the AF evaluation signal.

An in-focus point lies at a point 1702 at which the signal level of the AF evaluation signal reaches a maximum, and the position of the focusing lens 105 is controlled so that the signal level of the AF evaluation signal is maintained at the maximum level at all times.

Incidentally, the position of the focusing lens 105 which corresponds to the point 1702 at which the signal level of the AF evaluation signal reaches the maximum is an in-focus position 1708.

The wobbling operation is performed to determine whether an in-focus point is present on a closest-distance side or on an infinity side.

Specifically, the wobbling operation is the operation of obtaining an AF evaluation signal while driving the focusing lens 105 by a small amount, to determine whether the state of focus is currently an in-focus state or an out-of-focus state, as well as to determine whether the out-of-focus state is a near-focus state or a far-focus state if the state of focus is the out-of-focus state.

For example, when the current position of the focusing lens 105 is on the infinity side of the in-focus point (i.e., a position 1709), if the wobbling operation is executed to drive the focusing lens 105 by a small amount in a direction away from the closest-distance side, i.e., if the position of the focusing lens 105 is moved as shown at 1703 (the time axis extends from the top to the bottom of the sheet surface of FIG. 23), the AF evaluation signal shown at 1704 is obtained at that time.

On the other hand, when the current position of the focusing lens 105 is on the closest-distance side of the in-focus point (i.e., a position 1710), if the focusing lens 105 is driven by a small amount as shown at 1705, the AF evaluation signal shown at 1706 is obtained at that time.

Accordingly, since the signals 1704 and 1706 are out of phase with each other, if the state of phase is identified, it is possible to determine a direction in which to move the focusing lens 105 toward the in-focus point.

If the focusing lens 105 is driven as shown at 1711 by a small amount on the top of the hill 1701, the amplitude of the AF evaluation signal obtained at that time is small and shows a different waveform, as shown at 1712, compared to either of the signals 1704 and 1705. It is, therefore, possible to determine whether the current state of focus is an in-focus state or an out-of-focus state.

If the wobbling operation is performed near the in-focus point, defocusing may occur depending on the amount of driving amplitude, α, by which to drive the focusing lens 105. It is, therefore, necessary to ensure a minimum amplitude for which the signal level of the AF evaluation signal can be fully obtained.

On the other hand, if the focusing lens 105 is driven by a small amount near the foot of the hill 1701, it may not be possible to obtain the signal level of the AP evaluation signal which is high enough to identify the moving direction of the focusing lens 105. It is, therefore, desirable to increase the driving amplitude of the focusing lens 105.

In addition, the speed of the above-described wobbling operation is an important parameter required to invisibly carry out the wobbling operation.

Specifically, in a case where a plurality of subjects lying at different distances are present in a scene whose image is being picked up, even if a main subject is in focus, other subjects may be defocused to a small extent. This phenomenon occurs, particularly when the focusing lens 105 is positioned on the wide-angle side.

If the driving amplitude at this time is reduced to a minimum amplitude the amount of which does not exceed a depth of field, a wobbling operation will be visible since the subjects defocused to a small extent are outside an allowable depth of field.

Particularly if a wobbling operation is performed at a high speed, the states of images of the subjects defocused to a small extent vary at high speeds, so that the wobbling operation becomes extremely easily visible.

Accordingly, as in the case of wide-angle photography in which a plurality of subjects are easily contained in a scene, if all the subjects lying at different distances are focused to some extent and hence the signal level of an AF evaluation signal is high, it is preferable to reduce the speed of the wobbling operation and lengthen the period of the operation of driving the focusing lens 105 by a small amount so that image quality can be improved.

In this case, as the period of the wobbling operation is made longer, it takes a longer time to determine in which direction to drive the focusing lens 105. However, in the case of wide-angle photography or the like, since any subject is visible in a considerably focused state, high-speed focusing is not needed.

On the basis of the above description of the wobbling operation, a wobbling operation to be executed in the fifth embodiment will be specifically described below with reference to FIGS. 21 and 22.

Processing steps to be executed before and after Step S602 are as described previously with reference to FIG. 36, and the detailed description of the processing steps is omitted.

As shown in FIG. 21, first, the lens control microcomputer 112 reads an AF evaluation signal (Step S801) and determines whether the signal level of the read AF evaluation signal is greater than a threshold A (Step S802).

If it is determined in Step S802 that the signal level of the AF evaluation signal is greater than the threshold A, the lens control microcomputer 112 determines whether the signal level of the AF evaluation signal is greater than a threshold B (Step S803).

If it is determined in Step S803 that the signal level of the AF evaluation signal is greater than the threshold B, i.e., the signal level of the AF evaluation signal is greater than each of the thresholds A and B, the lens control microcomputer 112 determines that the focusing lens 105 is positioned near the top of the hill and is approximately in focus (defocused to a small extent), and executes the processing of Step S804 which will be described later.

If it is determined in Step S803 that the signal level of the AF evaluation signal is not greater than the threshold B, i.e., the signal level of the AF evaluation signal is greater than the threshold A and is less than the threshold B, the lens control microcomputer 112 determines that the focusing lens 105 is positioned halfway up the hill and defocused to a medium extent. Then, the lens control microcomputer 112 executes the processing of Step S805 which will be described later.

If it is determined in Step S802 that the signal level of the AF evaluation signal is not greater than the threshold A, the lens control microcomputer 112 determines that the focusing lens 105 is positioned at the foot of the hill and defocused to a great extent. Then, the lens control microcomputer 112 executes the processing of Step S806 which will be described later.

If it is determined through Step S802 and Step S803 that the focusing lens 105 is defocused to a great extent, the moving speed per unit time, Vf, of the focusing lens 105 is set to a maximum speed Vfmax to which the focusing lens 105 can respond, and an amplitude α for a wobbling operation is set to an amplitude equivalent to twice a depth of field δ according to the state of the iris 103 (Step S806).

The depth of field δ is selected to be a value which does not allow defocusing to occur if the position of the focusing lens 105 is moved from an in-focus point.

If the focusing lens 105 is defocused to a medium extent, the moving speed Vf is set to Vfmax/2 and the amplitude α is set to an amplitude equivalent to the depth of field δ (Step S805).

If the focusing lens 105 is defocused to a small extent, the moving speed Vf is set to Vfmax/4 and the amplitude α is set to an amplitude equivalent to half the depth of field δ (Step S804).

In the above-described steps, the moving speed Vf is set according to the signal level of the AF evaluation signal, but if the focal length is additionally used as a parameter for speed setting, it becomes easier to optimize the driving amplitude and the moving speed of the focusing lens 105 for all kinds of subjects.

After the completion of Steps S804, S805 and S806, it is determined whether the wobbling operation to be presently executed follows Step S607 of FIG. 36 or Step S610 of FIG. 30 (Step S807).

If it is determined in Step S807 that the wobbling operation follows Step S607, i.e., if the signal level of the AF evaluation signal has reached a peak, the focusing speed Vf of the focusing lens 105 is reduced to half (Step S808), and the process proceeds to Step S809.

If it is determined in Step S807 that the wobbling operation follows Step S610, i.e., if the signal level of the AF evaluation signal has not yet reached the peak, the process directly proceeds to Step S809.

Step S809 and the following steps are provided for executing the processing of driving the focusing lens 105 by a small amount, as described previously with reference to FIG. 23.

First, a destination F1 of the focusing lens 105 is obtained by adding the amplitude α of the wobbling operation to the current position F0 of the focusing lens 105 by using Equation (25) (Step S809):

$$F1=F0+\alpha. \quad (25)$$

Then, the focusing lens 105 is driven to move toward the closest-distance side (Step S810).

Then, it is determined whether the current position F0 of the focusing lens 105 has reached the destination F1 calculated in Step S809 (Step S811). If it is determined in Step S811 that the current position F0 has not reached the destination F1, the process returns to Step S810, in which the focusing lens 105 is driven to move toward the closest-distance side.

If it is determined in Step S811 that the current position F0 of the focusing lens 105 has reached the destination F1 calculated in Step S809, i.e., if the focusing lens 105 is driven by the amplitude α for the wobbling operation, the signal level of the AF evaluation signal at this time is stored in a memory Dn (not shown) inside the lens control microcomputer 112 as data for driving the focusing lens 105 toward the closest-distance side. Then, the destination F1 to be reached by the focusing lens 105 when the focusing lens 105 is driven toward the infinity side is calculated by using Equation (26) (Step S812):

$$F1=F0-2\alpha. \quad (26)$$

Then, the focusing lens 105 is driven to move toward the infinity side (Step S813).

Then, it is determined whether the current position F0 of the focusing lens 105 has reached the destination F1 set in Step S812 (Step S814). If it is determined that the current position F0 has not reached the destination F1, the process returns to Step S813, in which the focusing lens 105 is driven to move toward the infinity side.

If it is determined in Step S814 that the current position F0 of the focusing lens 105 has reached the destination F1 set in Step S812, i.e., if the focusing lens 105 is driven by the amplitude 2α for the wobbling operation, the signal level of the AF evaluation signal at this time is stored in a memory Df (not shown) inside the lens control microcomputer 112 as data for driving the focusing lens 105 toward the infinity side. Then, the destination F1 is again set by calculating Equation (27):

$$F1=F0+\alpha. \tag{27}$$

so that the focusing lens 105 is returned to the position at which it was located before the start of the wobbling operation (Step S815).

Then, the focusing lens 105 is driven to move toward the closest-distance side (Step S816).

Then, it is determined whether the current position F0 of the focusing lens 105 has reached the destination F1 calculated in Step S815 (Step S817). If it is determined that the current position F0 has not reached the destination F1, the process returns to Step S816, in which the focusing lens 105 is driven to move toward the closest-distance side.

If it is determined in Step S817 that the current position F0 of the focusing lens 105 has reached the destination F1 calculated in Step S815, i.e., if the focusing lens 105 is driven by the amplitude α for the wobbling operation, the signal level of the AF evaluation signal at this time is stored in a memory Dc (not shown) inside the lens control microcomputer 112 as data indicative of an initial position of the focusing lens 105 (step S818). Thus, the processing shown in FIG. 21 is completed, and the process proceeds to Step S603 of FIG. 36.

Then, in Step S603 and the following steps of FIG. 36, hill-climbing direction determining processing and in-focus position determining processing are performed on the basis of the signal levels of the AF evaluation signals which have been stored in the respective memories Dn, Df and Dc.

While the processing based on the flowchart of FIG. 21 is being executed, the movement of the position of the focusing lens 105 is executed by processing based on the flowchart shown in FIG. 22.

Although the processing shown in FIG. 21 is executed, for example, sixty times per unit time (in the case of the NTSC system) in synchronism with the vertical synchronizing period, the processing based on the flowchart of FIG. 22 is executed n times per unit time at a processing cycle shorter than the cycle of the processing shown in FIG. 21 similarly to the processing based on the flowchart of FIG. 20.

First, if the processing of FIG. 22 is started (Step S819), it is determined whether a target position Fx to which the focusing lens 105 is to be moved is already equal to the destination F1 (Step S820).

If it is determined in Step S820 that the target position Fx is equal to the destination F1, the process waits for the next control cycle.

If it is determined in Step S820 that the target position Fx is not equal to the destination F1, the amount of movement, ΔF, by which the focusing lens 105 is moved each time the processing shown in FIG. 22 is executed once is calculated (Step S821).

The amount of movement ΔF is calculated with Equation (28) by using the moving speed per unit time, Vf, of the focusing lens 105 obtained in the processing of FIG. 21:

$$\Delta F = Vf/n. \tag{28}$$

Then, the target position Fx to which the focusing lens 105 is to be moved is calculated from the current position F0 of the focusing lens 105 by using Equation (29) (Step S822):

$$Fx = F0 \pm \Delta F. \tag{29}$$

The sign "±" used in Equation (29) indicates different moving directions of the focusing lens 105, and the sign "+" indicates the movement of the focusing lens 105 toward the closest-distance end, while the sign "−" indicates the movement of the focusing lens 105 toward the infinity end. The driving direction in which to move the focusing lens 105 is obtained from the processing based on the flowchart shown in FIG. 21.

Then, a calculation is performed on the absolute value of the difference between the target position Fx calculated in Step S822 and the destination F1 to be reached by the focusing lens 105 which is driven by a small amount equivalent to the amplitude α for the wobbling operation, and it is determined whether the obtained absolute value is not greater than the amount of movement ΔF (calculated in Step S821) by which the focusing lens 105 is moved each time the processing shown in FIG. 22 is executed once (Step S823).

If it is determined in Step S823 that the absolute value is not greater than the amount of movement ΔF, it is determined that the current position of the focusing lens 105 is sufficiently close to the destination F1 and, in the next processing cycle, the position of the focusing lens 105 will pass the destination F1. Accordingly, the target position Fx is forcedly set as the destination F1 (Step S824). Then, the process returns to Step S820 and waits for the next start of the processing.

If it is determined in Step S823 that the absolute value is greater than the amount of movement ΔF, it is determined that the current position of the focusing lens 105 is still distant from the destination F1. Accordingly, the process returns to Step S820 so that the focusing lens 105 can be moved at the desired average moving speed, and waits for the next start of the processing.

The driving voltage signal corresponding to the target position Fx, which has been obtained in the above-described processing of Steps S819 to S824, is supplied from the lens control microcomputer 112 to the comparing circuit 1504, whereby the focusing lens 105 is driven to move at the average moving speed while holding the destination F1.

By executing the processing shown in FIGS. 21 and 22, it is possible to perform pseudo speed control of the focusing lens 105 even if the focusing lens 105 is to be moved by a predetermined amount of moving distance. Accordingly, for example, even if a small aperture size is selected and the focusing lens 105 needs to be moved by the amount of a large amplitude, the focusing lens 105 can be moved in such a manner as to gradually approach a predetermined position, whereby the focusing lens 105 can be prevented from oscillating at or overshooting the predetermined position. Accordingly, it is also possible to move the focusing lens 105 by a predetermined amount with high precision.

Sixth Embodiment

A sixth embodiment of the present invention will be described below.

In the following description of the sixth embodiment, reference will be made to an example in which the present invention is applied to a zooming operation in the image pickup apparatus 100 shown in FIG. 18.

Figure 24:
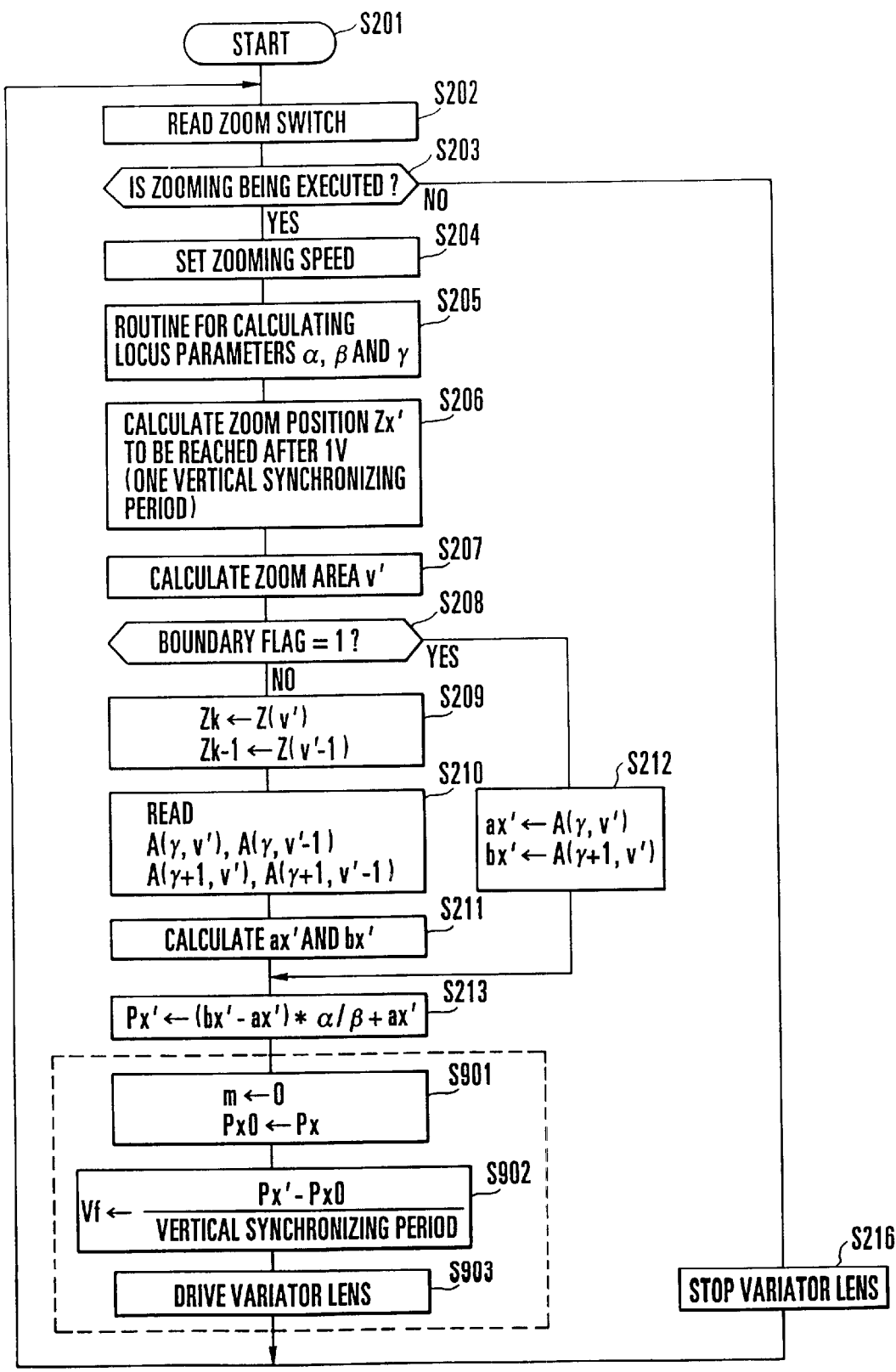
FIG. 24 is a flowchart aiding in describing zooming operation processing to be performed on a control cycle of one vertical synchronizing period in a sixth embodiment of the present invention.

A processing program based on the flowchart shown in FIG. 24 is contained in, for example, the zooming motor control program 116, and the processing program is executed by the lens control microcomputer 112.

The processing shown in FIG. 24 is similar to that shown in FIG. 31 except that Steps S901 to S903 are incorporated in place of Steps S214 and S215 of FIG. 31.

FIG. 24 shows the processing of a zooming operation executed at a control cycle equivalent to one vertical synchronizing period, and specifically shows one example of the processing of controlling the position of the focusing lens 105 in such a way as to predict a position to be reached by the variator lens 102 after one vertical synchronizing period and correct focus with respect to the predicted position.

In the flowchart shown in FIG. 24, identical reference numbers are used to denote processing steps similar to those shown in the flowchart of FIG. 31, and the detailed description thereof is omitted.

Figure 25:
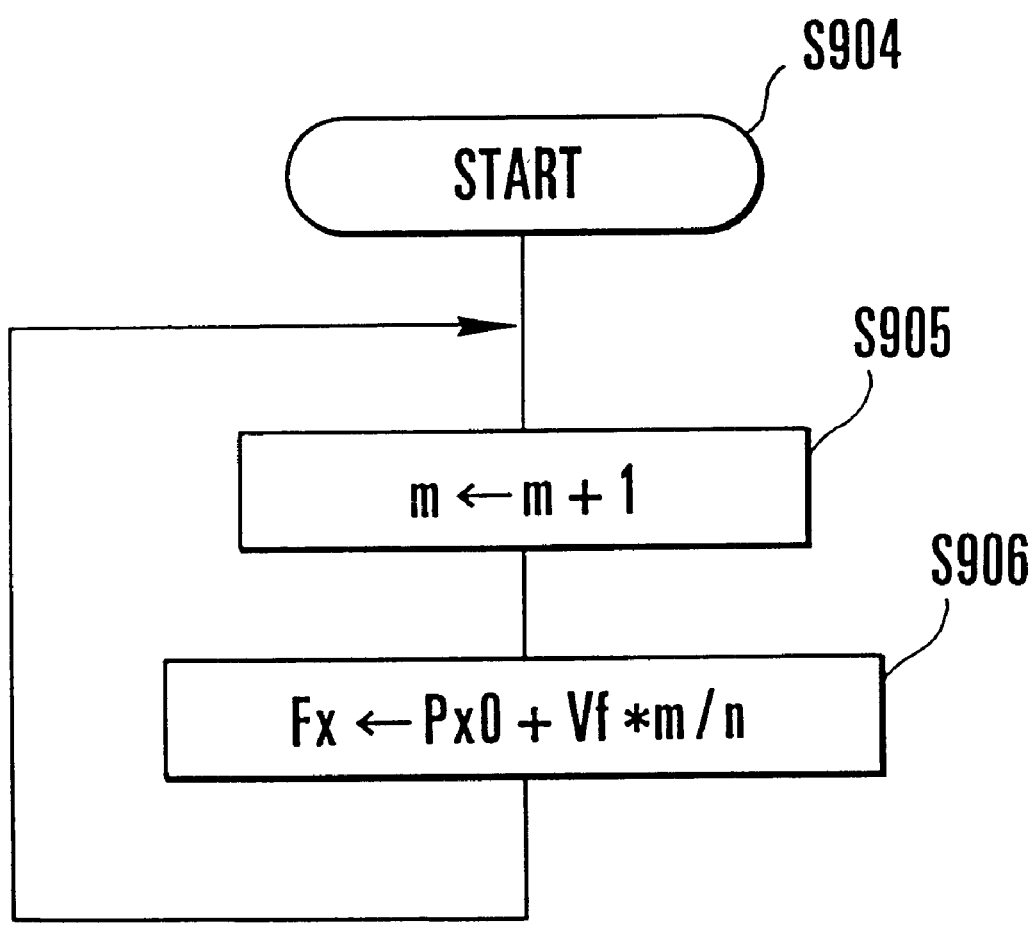
FIG. 25 is a flowchart aiding in describing compensation operation processing relative to a movement of the variator lens.

FIG. 25 is a flowchart showing driving control processing for the focusing lens 105 which performs a compensation operation according to the movement of the variator lens 102, and the processing cycle of the processing based on this flowchart is such that the processing is executed n times per unit time.

A processing program based on the flowchart of FIG. 25 is also contained in, for example, the zooming motor control program 116, and is executed by the lens control microcomputer 112.

First, as described previously, the destination Px' to be reached by the focusing lens 105 after one vertical synchronizing period is determined by the processing of Steps S201 to S213.

Then, the initializing processing of clearing a counter m to be used in the processing shown in FIG. 25 is executed, and a current position Px of the focusing lens 105 is stored in a memory Px0 (not shown) provided in the lens control microcomputer 112 (Step S901).

Then, the amount of movement (Px'−Px) of the focusing lens 105 per vertical synchronizing period is divided by the vertical synchronizing period to calculate a compensation speed Vf per unit time (Step S902).

Then, the zooming motor (stepping motor) 117 is driven at the zooming speed set in Step S204, thereby moving the variator lens 102 (step S903). Then, the process returns to Step S202 and waits for the next processing cycle.

While the above-described processing is being executed, the processing shown in FIG. 25 is executed on a processing cycle of n times per unit time.

Specifically, if the processing of FIG. 25 is started (Step S904), the counter m which has been cleared in Step S901 is incremented (Step S905).

Then, the target position Fx to be reached by the focusing lens 105 each time the processing of FIG. 25 is executed once is calculated (Step S906).

This target position Fx is obtained by a calculating method of sequentially adding the amount of movement, Vf/n, by which the focusing lens 105 is moved each time the processing of FIG. 25 is executed once to the reference position Px0 at which the focusing lens 105 was present when an in-focus position after one vertical synchronizing period was calculated.

Specifically, the target position Fx is calculated by using Equation (30):

$$Fx = Px0 + Vf \times m/n. \tag{30}$$

In Equation (30), "n" represents the number of times of processing per unit time, and the counter m is initialized at intervals of one vertical synchronizing period which is the processing cycle of the processing of FIG. 24. Accordingly, in a camera which conforms to, for example, the NTSC television system, the counter m takes on the following values:

$$m = 1, 2, 3, \ldots, n/60.$$

Therefore, when m=n/60, the target position Fx becomes:

$$Fx = Px0 + Vf/60 = Px'.$$

Thus, the focusing lens 105 reaches the position Px' after one vertical synchronizing period.

The reason why the value of the counter m is added to the reference position Px0 as a variable is to prevent the following phenomenon: if the operation of adding the amount of movement Vf/n by which the focusing lens 105 is moved each time the processing of FIG. 25 is executed once to the current position Px of the focusing lens 105 is repeated, an error due to the characteristics of loop control actually occurs between a target position and an actual position to which the focusing lens 105 is moved, and such error is accumulated so that the position to be reached by the focusing lens 105 after one vertical synchronizing period deviates from Px'.

Accordingly, by determining the target position Fx by using Equation (30), for example, even if an actual position of the focusing lens 105 deviates from a target position during the previous movement, the next target position to be calculated is not affected by the previous positional deviation, so that the previous positional deviation can be corrected.

By repeatedly executing the above-described processing shown in FIGS. 24 and 25, not only is it possible to maintain an in-focus state even after the passage of one vertical synchronizing period, but also the focusing lens 105 can continue to move at an average compensation speed at which the focusing lens 105 can maintain an in-focus state, even within one vertical synchronizing period during which the variator lens 102 is moving. Accordingly, it is possible to prevent defocusing from occurring during the vertical synchronizing period.

Seventh Embodiment

A seventh embodiment of the present invention will be described below.

In the following description of the seventh embodiment, reference will be made to an example in which the present invention is applied to the processing of eliminating defocusing which occurs when the variator lens 102 reaches a zoom end in the image pickup apparatus 100 shown in FIG. 18.

Figure 26:
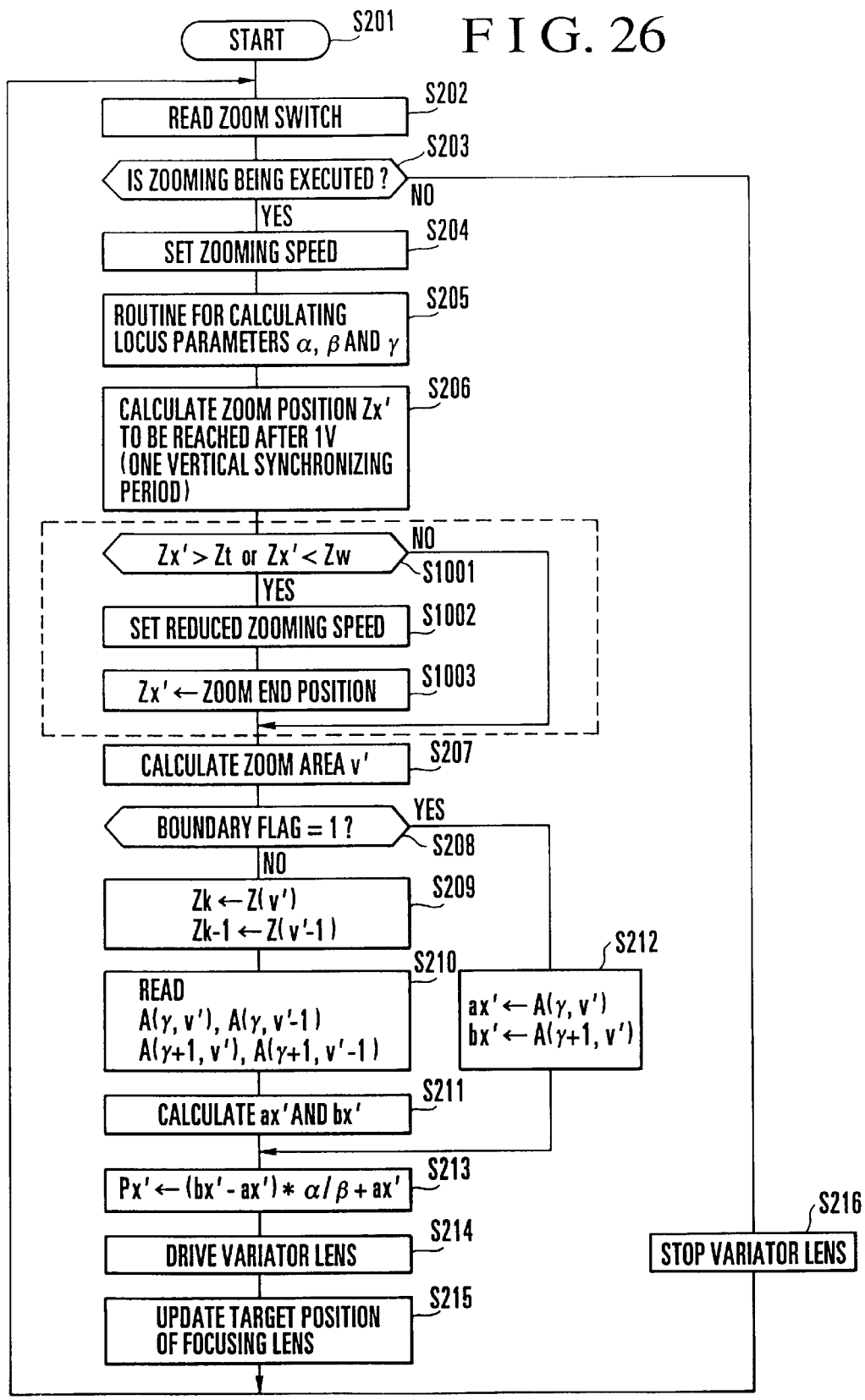
FIG. 26 is a flowchart aiding in describing zooming-speed resetting processing in a seventh embodiment of the present invention.

A processing program based on the flowchart shown in FIG. 26 is contained in, for example, the zooming motor control program 116, and the processing program is executed by the lens control microcomputer 112.

The processing shown in FIG. 26 is similar to that shown in FIG. 31 except that Steps S1001 to S1003 are inserted between Steps S206 and S207 of FIG. 31.

FIG. 26 shows one example of the processing of adjusting the speed of the variator lens 102 so that a predicted target position to be reached by the variator lens 102 after one vertical synchronizing period becomes accurately coincident with a zoom end if it is determined that such predicted target position exceeds the zoom end.

In the flowchart shown in FIG. 26, identical reference numbers are used to denote processing steps similar to those shown in the flowchart of FIG. 31, and the detailed description thereof is omitted.

First, as described previously, in the processing of Step S206, the position (predicted target position) Zx' to be reached by the variator lens 102 after one vertical synchronizing period is obtained from the above-described equation (22) (Zx'=Zx±Zsp/(vertical synchronizing frequency)) using the speed Zsp (pps) of the variator lens 102.

The sign "±" used in Equation (22) indicates different moving directions of the variator lens 102, and the sign "+" indicates the movement of the variator lens 102 toward the telephoto end, while the sign "−" indicates the movement of the variator lens 102 toward the wide-angle end.

Then, it is determined whether the position Zx' obtained in Step S206 is greater than a telephoto-end zoom position Zt or whether the position Zx' is smaller than a wide-angle-end zoom position Zw (Step S1001). Only if the position Zx' is greater than the telephoto-end zoom position Zt or the position Zx' is smaller than the wide-angle-end zoom position Zw, the processing of Steps S1002 and S1003 is executed.

If it is determined in Step S1001 that the position Zx' is greater than the telephoto-end zoom position Zt, the above equation (22) is converted into the following equation (31):

$$Zsp=(Zt-Zx) \times \text{vertical synchronizing frequency.} \quad (31)$$

Thus, the speed of the variator lens 102 to be speed-reduced is identified and set.

If it is determined in Step S1001 that the position Zx' is greater than the wide-angle-end zoom position Zw, the above equation (22) is converted into the following equation (32):

$$Zsp=(Zx-Zw) \times \text{vertical synchronizing frequency.} \quad (32)$$

Thus, the speed of the variator lens 102 to be speed-reduced is identified and set (Step S1002).

Then, the predicted target position Zx' of the variator lens 102 is reset to the telephoto-end zoom position Zt or the wide-angle-end zoom position Zw (Zx'=Zt or Zx'=Zw) (Step S1003).

Since the routine of resetting the speed of the variator lens 102 is executed as Steps S1001 to S1003 as described above, the position to be reached by the variator lens 102 after one vertical synchronizing period can be made coincident with a zoom end, whereby an in-focus position for the zoom end is set at the predicted target position of the focusing lens 105. Accordingly, even if the variator lens 102 stops moving immediately after having reached the zoom end, the position of the focusing lens 105 can be set as an in-focus position corresponding to the position of the zoom end, whereby it is possible to prevent occurrence of defocusing.

Eighth Embodiment

An eighth embodiment of the present invention will be described below.

In the above description of the seventh embodiment, reference has been made to the example in which if it is determined that a predicted target position to be reached by the variator lens 102 after one vertical synchronizing period exceeds a zoom end, the speed of the variator lens 102 is reduced so that the predicted target position becomes coincident with the position of the zoom end to prevent occurrence of defocusing. In the eighth embodiment, in the image pickup apparatus 100 shown in FIG. 18, the processing of forcedly moving the position of the focusing lens 105 to an in-focus position at the instant when the position of the variator lens 102 reaches a zoom end is executed in addition to the above-described processing according to the seventh embodiment, thereby reducing the time period of occurrence of defocusing and also thereby completely eliminating defocusing due to a calculation error or the like.

Figure 27:
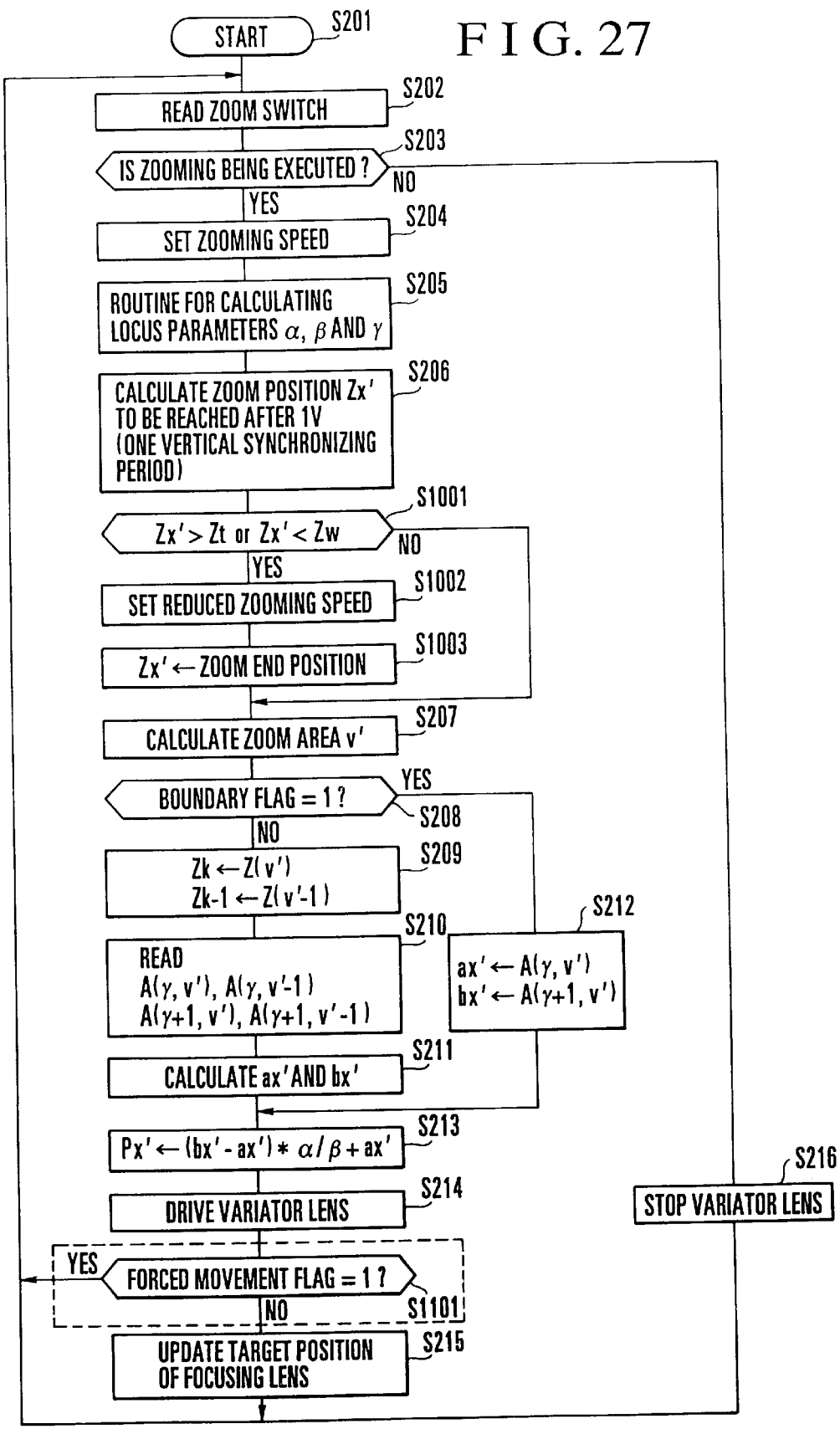
FIG. 27 is a flowchart aiding in describing the processing of determining whether to execute a forced movement of the focusing lens in an eighth embodiment of the present invention.
Figure 28:
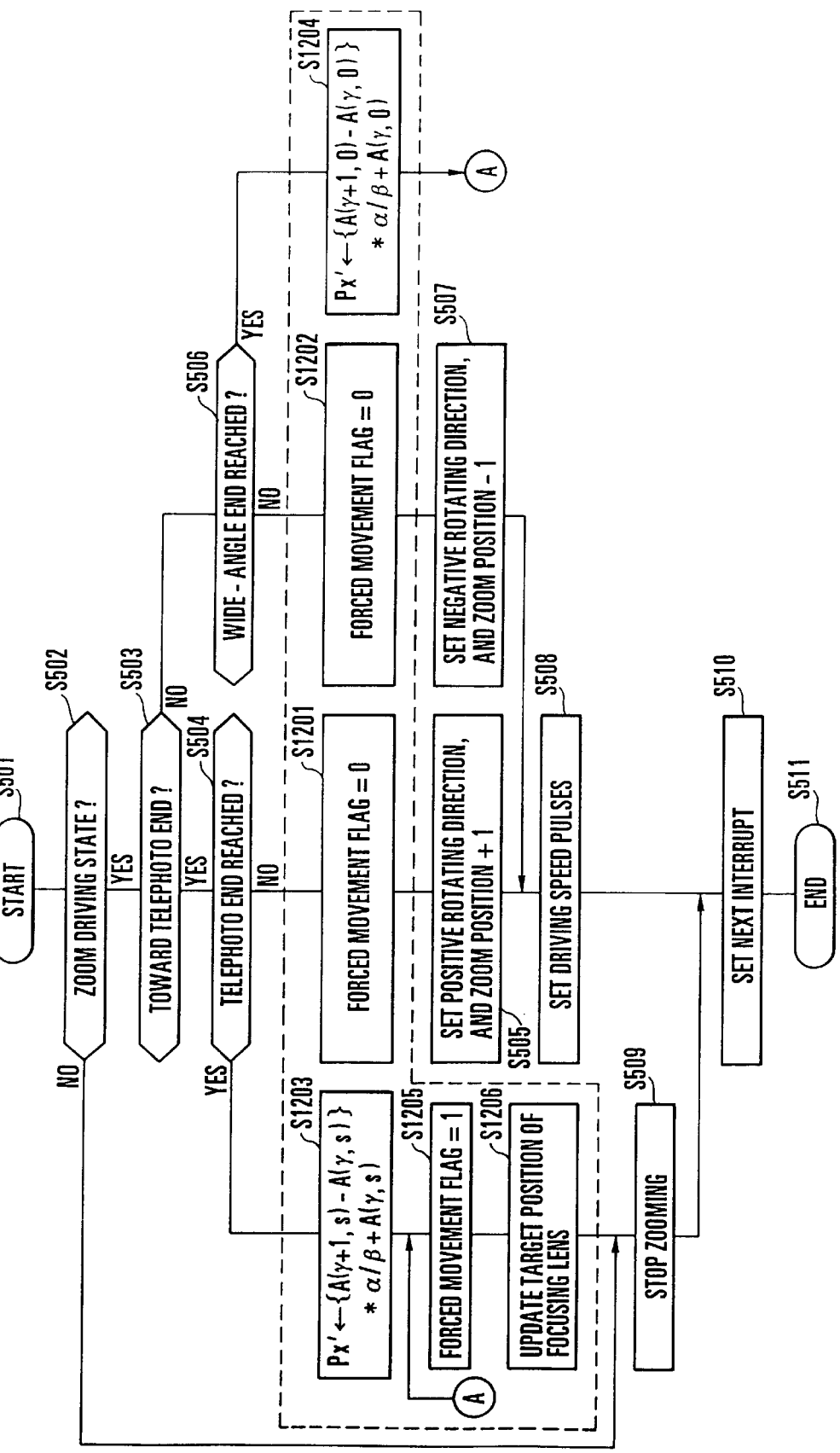
FIG. 28 is a flowchart aiding in describing the processing of resetting a forced movement flag indicative of the forced movement of the focusing lens.

For example, a processing program based on the flowchart shown in FIG. 27 is contained in the zooming motor control program 116, while a processing program based on the flowchart shown in FIG. 28 is contained in the AF program 113. The processing programs are executed by the lens control microcomputer 112.

The processing shown in FIG. 27 is similar to that shown in FIG. 26 except that Step S1101 is inserted between Steps S214 and S215 of FIG. 26.

The processing shown in FIG. 28 is similar to that shown in FIG. 34 except that Steps S1201 to S1206 are inserted between Steps S504, S506 and Steps S505, S507, S509.

In the flowcharts shown in FIGS. 27 and 28, identical reference numbers are used to denote processing steps similar to those shown in the flowcharts of FIGS. 26 and 34, and the detailed description thereof is omitted.

First, in the eighth embodiment, when the variator lens 102 stops at a zoom end position, an in-focus position of the focusing lens 105 relative to the zoom end position is calculated, and the focusing lens 105 is forcedly moved to the calculated in-focus position.

For this reason, during the forced movement of the focusing lens 105, it is necessary to inhibit the processing of setting the position Px' obtained in the above-described manner in Step S213 of FIG. 27 to a target position for the focusing lens 105.

Accordingly, as shown in FIG. 27, a decision is made as to the state of a forced movement flag which indicates whether the focusing lens 105 is being forcedly moved (Step S1101).

If it is determined in Step S1101 that the focusing lens 105 is being forcedly moved, the process returns to Step S202 without updating the target position of the focusing lens 105 in Step S215.

The value of the forced movement flag is set to a value indicative of the state of movement of the focusing lens 105, in the processing of FIG. 28 which will be described later, and is cleared (="0") so long as a instruction to drive the variator lens 102 in a direction in which the position of the variator lens 102 exceeds a zoom end position is not given.

The processing of forcedly moving the focusing lens 105 will be described below with reference to FIG. 28. First, if the processing shown in FIG. 28 is started (Step S501), it is determined whether the variator lens 102 is in a driven state, according to the state of movement of the variator lens 102 which has already been determined in the processing of FIG.

27 (Step S502). If the variator lens 102 is in a non-driven state, the variator lens 102 is made to stop (Step S509) and the next interrupt period is set (Step S510). Thus, the processing of FIG. 28 is completed (Step S511).

On the other hand, if the variator lens 102 is in a driven state, it is determined in which direction the variator lens 102 is to be driven (Step S503). If the variator lens 102 needs to be driven toward the telephoto end, the process proceeds to Step S504, whereas if the variator lens 102 needs to be driven toward the wide-angle end, the process proceeds to Step S506.

In Step S504, it is determined whether the variator lens 102 has already reached the telephoto end.

If it is determined in Step S504 that the variator lens 102 has not yet reached the telephoto end, the above-described forced movement flag is cleared (Step S1201). Then, the driving direction of the zooming motor driver 118 is set to a positive rotating direction and the position counter Zx for the variator lens 102 is incremented (Step S505).

If it is determined in Step S504 that the variator lens 102 has already reached the telephoto end, the process proceeds to Step S506, in which it is determined whether the variator lens 102 has already reached the wide-angle end.

If it is determined in Step S506 whether the variator lens 102 has not yet reached the wide-angle end, the forced movement flag is cleared (Step S1202). Then, the driving direction of the zooming motor driver 118 is set to a negative rotating direction and the position counter Zx for the variator lens 102 is decremented by 1 (Step S507).

After the processing of Step S505 or S507, the logic of a current frequency signal is inverted so that a frequency signal corresponding to the driving speed of the variator lens 102 can be outputted to the zooming motor driver 118 (Step S508).

Specifically, in the processing shown in FIG. 28, since interrupts are caused in accordance with the driving frequency, the output logic for the zooming motor driver 118 is successively inverted in Step S508. Thus, a pulse train corresponding to the driving frequency is generated, and the zooming motor driver 118 controls the excitation phase of the zooming motor (stepping motor) 117 in accordance with the switching of the logic of the pulse train and the driving direction of the zooming motor 118. Thus, the variator lens 102 moves in accordance with such control.

The processing of FIG. 27 is repeatedly performed during the movement of the variator lens 102 until the variator lens 102 reaches the position of a zoom end.

If the variator lens 102 reaches the position of the zoom end, the movement of the variator lens 102 is inhibited and the focusing lens 105 is forcedly moved at a high speed to an in-focus position relative to the position of the zoom end so as not to allow a photographer to notice defocusing.

Incidentally, in the eighth embodiment, since a linear motor capable of driving the motor 1501 at a high speed is used for driving the focusing lens 105, if the focusing lens 105 is made to reach an in-focus point immediately after the stop of the variator lens 102 in accordance with the loop characteristics of a focusing system, it is possible to prevent the photographer from noticing defocusing.

Specifically, if the variator lens 102 reaches the telephoto end while it is moving toward the telephoto end, the answer in Step S504 is true.

In this case, the in-focus position Px' to be reached by the focusing lens 105 when the variator lens 102 is positioned at the telephoto end is calculated as a forced movement target position for the focusing lens 105 (Step S1203).

This in-focus position Px' is calculated by using the above-described equation (23) with the zoom area V'=s (k=s in the data table TB shown in FIG. 35).

If the variator lens 102 reaches the wide-angle end while it is moving toward the wide-angle end, the answer in Step S506 is true.

In this case, the in-focus position Px' to be reached by the focusing lens 105 when the variator lens 102 is positioned at the wide-angle end is calculated as a forced movement target position for the focusing lens 105 (Step S1204).

This in-focus position Px' is calculated by using the above-described equation (23) with the zoom area V'=0 (k=0 in the data table TB shown in FIG. 35).

After the processing of Step S1203 or Step S1204, the forced movement flag is set to 1 (Step S1205) and the target position of the focusing lens 105 is set to the in-focus position Px' calculated in Step S1203 or Step S1204 (Step S1206), and a driving signal is outputted to the motor (linear motor) 1501.

Then, the driven state of the variator lens 102 is set to a stopped state (Step S509) and the next interrupt is set (Step S510). Thus, the processing shown in FIG. 28 is completed (Step S511).

In the eighth embodiment, when the position of the variator lens 102 reaches an end of its movable range, the movement of the variator lens 102 is brought to a stop in a manner similar to that described previously in connection with the seventh embodiment. However, it is also possible to adopt an arrangement which brings the movement of the variator lens 102 to a stop when a photographer interrupts a key operation for zooming or the like during a zooming operation.

In this arrangement, for example, a switching of the driven state of the variator lens 102 is detected, and if it is detected that the variator lens 102 has changed from the driven state to a stopped state, an in-focus position of the focusing lens 105 relative to the stop position of the variator lens 102 is calculated, and the calculated in-focus position is used as a forced movement target value for the focusing lens 105.

As is apparent from the above description, even in an arrangement in which different actuators having different response characteristics are used as actuators for driving the variator lens 102 and the focusing lens 105, i.e., a stepping motor is used as the zooming motor 117 and a linear motor is used as the motor 1501, it is possible to realize a comfortable zooming operation (zooming) which does not allow a photographer to notice defocusing even if either one of the motors comes to a stop.

Ninth Embodiment

A ninth embodiment of the present invention will be described below.

According to the ninth embodiment, in the image pickup apparatus 100 shown in FIG. 18, the cycle of position control of the focusing lens 105 is made short relative to the cycle of position control of the variator lens 102 so that when the variator lens 102 is stopped, the focusing lens 105 is immediately stopped.

When the variator lens 102 is to be stopped, it is necessary to perform fine position control so that an in-focus state can be maintained.

Specifically, not only is it necessary to maintain an in-focus state even after one vertical synchronizing period, as in the case of a conventional example, but it is also necessary to maintain an in-focus state even if the variator lens 102 stops at an arbitrary position within one vertical synchronizing period.

As described above, if a motor for driving a focusing lens is a stepping motor as described above, the focusing lens is driven at an optimum focus tracing speed according to the inclination of a cam locus and the rate of variation in the position of the focusing lens becomes coincident with the slope of the cam locus so that an in-focus state can be maintained with respect to an arbitrary position of a variator lens.

In contrast, in a system which provides loop control of the position of a linear motor or the like, since the moving speed of the focusing lens is determined by the response characteristics of a loop, it is difficult to control the moving speed of the focusing at a moving speed according to the slope of a cam locus. However, since the position of the variator lens approaches an in-focus point within one vertical synchronizing period after the focusing lens reaches a target in-focus position, defocusing invisibly occurs for only a short time.

However, if the variator lens stops at an arbitrary position, a defocusing preventing effect due to the movement of the variator lens disappears and defocusing becomes visible.

According to the ninth embodiment, even in a system which performs position loop control, fine position control is executed to effect pseudo speed control, thereby improving the quality of zooming performance. In addition, the frequency of the control cycle required for fine position control is made much higher than the frequency of a zoom control cycle, thereby solving the above-described problem which occurs when the variator lens reaches a zoom end or the like and a zooming operation is interrupted, As in the case of the above-described sixth embodiment, for example, a processing program based on the flowchart of FIG. 24 is contained in, for example, the zooming motor control program 116, and is executed by the lens control microcomputer 112.

Figure 29:
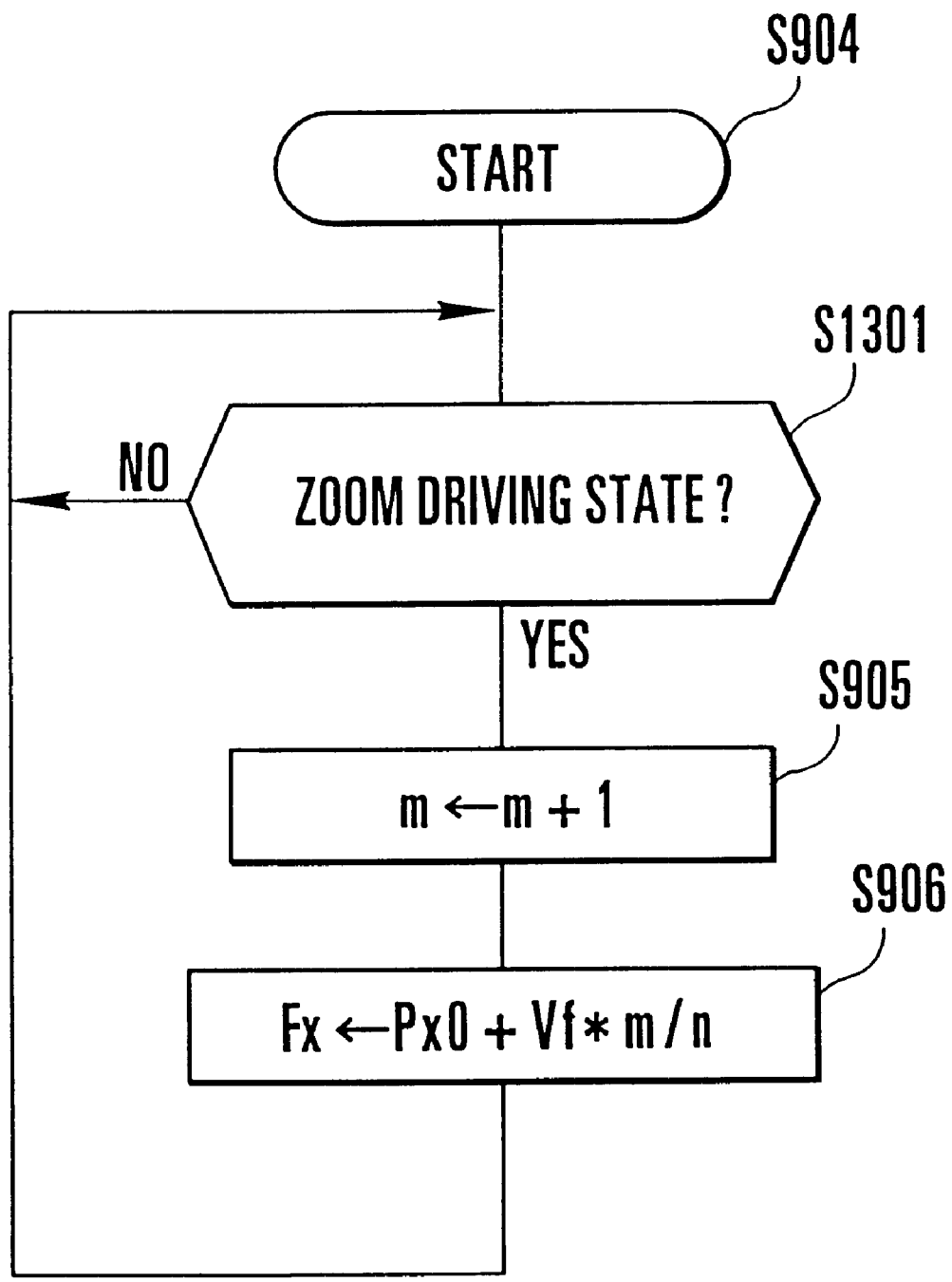
FIG. 29 is a flowchart aiding in describing compensation operation processing relative to a movement of the focusing lens in a ninth embodiment of the present invention.

FIG. 29 is a flowchart showing driving control processing for the focusing lens 105 which performs a compensation operation according to the movement of the variator lens 102. The processing shown in FIG. 29 is similar to that of FIG. 25 used in the above description of the sixth embodiment, except that Step S1301 is inserted immediately before Step S905.

The processing cycle shown in FIG. 29 is also such that the processing is executed n times per unit time.

A processing program based on the flowchart of FIG. 25 is also contained in, for example, the zooming motor control program 116, and is executed by the lens control microcomputer 112.

Since the processing of FIG. 24 has been described previously, the detailed description thereof is omitted.

In the flowchart of FIG. 29, identical reference numerals are used to denote processing steps similar to those of the flowchart of FIG. 25, and the detailed description thereof is omitted.

First, as described previously, the destination Px' to be reached by the focusing lens 105 after one vertical synchronizing period is determined by the processing of Steps S201 to 212.

Then, the initializing processing of clearing the counter m to be used in the processing shown in FIG. 29 is executed, and the current position Px of the focusing lens 105 is stored in the memory Px0 (not shown) provided in the lens control microcomputer 112 (Step S901).

Then, the amount of movement (Px'−Px) of the focusing lens 105 per vertical synchronizing period is divided by the vertical synchronizing period to calculate the compensation speed Vf per unit time (Step S902).

Then, the zooming motor (stepping motor) 117 is driven at the zooming speed set in Step S204, thereby moving the variator lens 102 (Step S903). Then, the process returns to Step S202 and waits for the next processing cycle.

While the above-described processing is being executed, the processing shown in FIG. 29 is executed on a processing cycle of n times per unit time.

Specifically, if the processing of FIG. 29 is started (Step S904), a decision is made as to the current state of driving of the variator lens 102 (Step S1301).

If it is determined in Step S1301 that the variator lens 102 is in a stopped state, the process remains in a wait state.

If it is determined in Step S1301 that the variator lens 102 is in driven state, the counter m which has been cleared in Step S901 is incremented (Step S905).

Then, the target position Fx to be reached by the focusing lens 105 each time the processing of FIG. 25 is executed once is calculated (Step S906).

This target position Fx is obtained by a calculating method of sequentially adding the amount of movement, Vf/n, by which the focusing lens 105 is moved each time the processing of FIG. 29 is executed once to the reference position Px0 at which the focusing lens 105 was present when an in-focus position after one vertical synchronizing period was calculated.

Specifically, the target position Fx is calculated by using Equation (30) (Fx=Px0+Vf×m/n).

As described previously, in Equation (30), "n" represents the number of times of processing per unit time, and the counter m is initialized at intervals of one vertical synchronizing period which is the processing cycle of the processing of FIG. 24. Accordingly, in a camera which conforms to, for example, the NTSC television system, the counter m takes on the following values:

$$m=1, 2, 3, \ldots, n/60.$$

Therefore, when m=n/60, the target position Fx becomes:

$$Fx=Px0+Vf/60=Px'.$$

Thus, the focusing lens 105 reaches the position Px' after one vertical synchronizing period.

The reason why the value of the counter m is added to the reference position Px0 as a variable is to prevent the following phenomenon: if the operation of adding the amount of movement Vf/n by which the focusing lens 105 is moved each time the processing of FIG. 25 is executed once to the current position Px of the focusing lens 105 is repeated, an error due to the characteristics of loop control actually occurs between a target position and an actual position to which the focusing lens 105 is moved, and such error is accumulated so that the position to be reached by the focusing lens 105 after one vertical synchronizing period deviates from Px'.

Accordingly, by determining the target position Fx by using Equation (30), for example, even if an actual position of the focusing lens 105 deviates from a target position during the previous movement, the next target position to be calculated is not affected by the previous positional deviation, so that the previous positional deviation can be corrected.

By repeatedly executing the above-described processing shown in FIGS. 24 and 29, not only is it possible to maintain an in-focus state even after the passage of one vertical synchronizing period, but also the focusing lens 105 can continue to move at an average compensation speed at which the focusing lens 105 can maintain an in-focus state, even within one vertical synchronizing period during which the variator lens 102 is moving. Accordingly, it is possible to prevent defocusing from occurring during the vertical synchronizing period.

In addition, if the processing cycle of FIG. 29 is made faster than a maximum speed Vzmax of the variator lens 102, for example, if n=3 kHz which is approximately three times the maximum speed Vzmax, the processing of FIG. 29 can be executed once at the time of a decision as to whether the variator lens 102 has reached a zoom end. Accordingly, at the same time that the variator lens 102 stops, the movement of the focusing lens 105 can be stopped while the focusing lens 105 is being maintained in an in-focus state.

Accordingly, not only when the variator lens 102 stops at a zoom end, but also when a photographer interrupts a zooming operation by a key operation or the like, defocusing does not occur.

Incidentally, since the above-described processing is executed by the lens control microcomputer 112, the lens control microcomputer 112 is heavily loaded due to the high-speed processing. However, because of the characteristics of each cam loci, the inclination of the cam loci is unsharp at any focal length other than a telephoto range, and cam loci for different subject distances tend to converge, whereby even if the processing cycle of FIG. 29 is made slower than the processing cycle of the position control processing of the focusing lens 105 shown in each of FIGS. 34 and 28, the amount of defocusing is extremely small.

Accordingly, if the load on the lens control microcomputer 112 is taken into account, it is desirable to optimally set the processing cycle of FIG. 29 according to the focal length or the like, as by making fast the processing cycle of FIG. 29 only near the telephoto end at which the inclinations of the cam loci become sharp.

In each of the above-described fourth to ninth embodiments, although a linear motor is used as the motor 1501 for driving the focusing lens 105, the motor 1501 is not limited to the linear motor only and a high-speed control system using a stepping motor or the like may also be adopted.

As is apparent from the above description, according to each of the above-described fourth to ninth embodiments, since there is provided an arrangement in which a driving signal is updated and supplied to an actuator by a plurality of times during a predetermined time period so that the average moving speed of a movable part during the predetermined time period becomes a predetermined speed, it is possible to execute position control and pseudo speed control of the movable part at the same time. Accordingly, even in a lens position control system using a linear motor, it is possible to realize a smooth high-speed autofocus operation according to the shape and size of the hill of a focus signal. Accordingly, even if lens control position is executed with a linear motor, pseudo speed control is enabled so that comfortable autofocus and zooming operations can be realized.

In addition, since there is provided an arrangement in which a target position is updated n times during a predetermined time period by the amount of movement, s/n, at a time with respect to the amount of movement, s, by which the movable part moves at a predetermined speed during the predetermined time period, the actual average moving speed of the movable part can be held at a uniform speed. Accordingly, it is possible to prevent a phenomenon which occurs during a hill-climbing operation or the like for focus adjustment, such as the phenomenon in which the movable part is driven at a high speed in accordance with the response characteristics of feedback loop, and when the movable part reaches the target position, the driving of the movable part is immediately stopped and the repetition of drive and stop appears on the picture of an image being picked up. Furthermore, if a linear motor is used as an actuator, it is possible to realize an ultra-high-speed zooming mechanism as well as to reduce the size and weight thereof.

In addition, since there is provided an arrangement in which the average moving speed at which the movable part moves by the predetermined amount of movement can be controlled even in the case of moving the movable part by a predetermined amount of movement, such as a wobbling operation in an autofocus operation, it is possible to prevent a visually impaired video image, such as that which exhibits a non-smooth discontinuous motion, due to the repetition of drive and stop of the movable part, which occurs in a moving-direction determining operation or a hill top determining operation of the movable part in the wobbling operation or the like. In particular, even if a subject in an in-focus state and a subject in a slightly defocused state are present in the picture of an image being picked up, as in the case of a wobbling operation which is executed near a hill top near an in-focus point, it is possible to lower the frequency of switching of the movable part from a driven state to a stopped state in the wobbling operation or the like, as by reducing the average moving speed. Accordingly, it is possible to realize a wobbling operation or the like which is not visible to a photographer. Accordingly, even in the case of lens position control using a linear motor, it is possible to realize comfortable autofocus and zooming operations by enabling pseudo speed control.

In addition, there is provided an arrangement in which the operation of dividing a predetermined amount of movement to progressively move the movable part toward a target position until the movable part completes the predetermined amount of movement and the operation of moving the movable part toward the target position by the predetermined amount of movement at a time are selectively executed according to the amount of movement of the movable part to be moved. Accordingly, even if the predetermined amount of movement is large, by dividing the predetermined amount of movement to progressively move the movable part, it is possible to prevent a vibration from occurring when the movable part is near the target position and eliminate the effect of such vibration on a focus voltage signal, whereby it is possible to prevent a malfunction during an autofocus operation or the like. In addition, since there is provided an arrangement in which the movable part can be forcedly moved at a time according to the amount of movement of the movable part, it is possible to prevent the movable part from moving past the predetermined amount, and it is also possible to move the movable part at a maximum speed within a range in which the motion of the movable part is not visible, on the picture of an image being picked up. Furthermore, if a linear motor is used as an actuator, it is possible to realize ultra-high-speed zooming as well as to reduce the size and weight of the entire mechanism.

In addition, since there is provided an arrangement capable of varying the aforesaid predetermined speed according to the signal level or focus state of the focus voltage signal, it is possible to realize a smooth autofocus operation which is optimum for any subject.

In addition, there is provided an arrangement which, in a magnification varying (zooming) operation, predicts a position to be reached by a first lens group after a predetermined time period (for example, after one vertical synchronizing period), calculates an in-focus position of the movable part relative to the predicted position, and executes position control of the movable part so that the average moving speed of the moving part becomes a predetermined speed (for example, a predetermined compensation speed) in such a manner that the movable part gradually approaches the in-focus position during the predetermined time period in which the first lens group is moving. Accordingly, it is possible to prevent a phenomenon in which before the first lens group arrives at the predicted position in the predetermined time period, the movable part arrives at a focus correction position relative to the predicted position and defocusing becomes visible by an amount equivalent to the difference between the arrival times of the first lens group and the movable part. Accordingly, even in the case of lens position control using a linear motor, it is possible to realize comfortable autofocus and zooming operations by enabling pseudo speed control.

In addition, since there is provided an arrangement in which the aforesaid predetermined speed is made equivalent to the moving speed at which the movable part moves past the positional difference between the current position of the movable part and a position to be reached by the movable part after the predetermined time period, the movable part not only can maintain an in-focus state even after the predetermined time period, but also can continue to move at an average moving speed which enables the movable part to maintain an in-focus state according to the movement of the first lens group even within the predetermined time period in which the first lens group is moving.

In addition, there is provided an arrangement which, in the magnification varying (zooming) operation, during the operation (zooming operation) of predicting a position to be reached by the first lens group after the predetermined time period (for example, after one vertical synchronizing period) and obtaining an in-focus position of the movable part relative to the predicted position as a target position to be reached by the movable part after the predetermined time period, the moving speed of the first lens group can be reduced so that if the predicted position exceeds the movable range of the first lens group, the position of the first lens group after the predetermined time period becomes equivalent to an end position of the movable range. Accordingly, it is possible to inexpensively reduce defocusing when the first lens group reaches the end position (zoom end), without using a special circuit. Accordingly, even if lens position control is executed by using actuators having different response characteristics, such as a linear motor and a stepping motor, it is possible to realize a comfortable zooming operation by correcting a deviation between the response performances of the actuators.

In addition, since there is provided an arrangement in which when the magnification varying (zooming) operation stops due to the fact that the first lens group reaches the end position (zoom end) of the movable range, the movable part is forcedly moved at a high speed to an in-focus position relative to the stop position of the first lens group, whereby it is possible to prevent a photographer from noticing the occurrence of defocusing when the zooming operation stops. Accordingly, even if lens position control is executed by using actuators having different response characteristics, such as a linear motor and a stepping motor, it is possible to realize a comfortable zooming operation by correcting a deviation between the response performances of the actuators.

In addition, since there is provided an arrangement in which, in the magnification varying (zooming) operation, even in a system which performs position control of the first lens group, fine position control is executed to realize pseudo speed control, and in addition, the control cycle of fine position control of the movable part is made faster than the control cycle of position control of the first lens group when at least the position of the first lens group is in a predetermined range. Accordingly, since the movable part can be instantly stopped in an in-focus state when the first lens group abruptly stops at an arbitrary position, it is possible to prevent the occurrence of defocusing while realizing a smooth compensation operation or the like and improved image quality. Accordingly, even if lens position control is executed by using actuators having different response characteristics, such as a linear motor and a stepping motor, it is possible to realize a comfortable zooming operation by correcting a deviation between the response performances of the actuators.

In addition, in the above-described arrangement, since the aforesaid predetermined range is set to a long focal length range on a telephoto side, for example, a telephoto end at which the slope of a cam locus is sharp, the load on a lens control microcomputer can be reduced, whereby it is possible to realize a high-quality zooming operation without using an expensive microcomputer or the like.

In addition, since there is provided an arrangement in which a driving signal is updated and supplied to an actuator by a plurality of times during a predetermined time period so that the average moving speed of a movable part during the predetermined time period becomes a predetermined speed, it is possible to execute position control and pseudo speed control of the movable part at the same time. Accordingly, even in a lens position control system using a linear motor, it is possible to realize a smooth high-speed autofocus operation according to the shape and size of the hill of a focus signal. Accordingly, even if lens control position is executed with a linear motor, pseudo speed control is enabled so that comfortable autofocus and zooming operations can be realized.

In addition, since there is provided an arrangement in which a target position is updated n times during a predetermined time period by the amount of movement, s/n, at a time with respect to the amount of movement, s, by which the movable part moves at a predetermined speed during the predetermined time period, the actual average moving speed of the movable part can be held at a uniform speed. Accordingly, it is possible to prevent a phenomenon which occurs during a hill-climbing operation or the like for focus adjustment, such as the phenomenon in which the movable part is driven at a high speed in accordance with the response characteristics of feedback loop, and when the movable part reaches the target position, the driving of the movable part is immediately stopped and the repetition of drive and stop appears on the picture of an image being picked up. Furthermore, if a linear motor is used as an actuator, it is possible to realize an ultra-high-speed zooming mechanism as well as to reduce the size and weight thereof.

In addition, since there is provided an arrangement in which the average moving speed at which the movable part moves by the predetermined amount of movement can be controlled even in the case of moving the movable part by a predetermined amount of movement, such as a wobbling operation in an autofocus operation, it is possible to prevent a visually impaired video image, such as that which exhibits a non-smooth discontinuous motion, due to the repetition of drive and stop of the movable part, which occurs in a moving-direction determining operation or a hill top determining operation of the movable part in the wobbling operation or the like. In particular, even if a subject in an in-focus state and a subject in a slightly defocused state are present in the picture of an image being picked up, as in the case of a wobbling operation which is executed near a hill top near an in-focus point, it is possible to lower the frequency of switching of the movable part from a driven state to a stopped state in the wobbling operation or the like, as by reducing the average moving speed. Accordingly, it is possible to realize a wobbling operation or the like which is not visible to a photographer. Accordingly, even in the case of lens position control using a linear motor, it is possible to realize comfortable autofocus and zooming operations by enabling pseudo speed control.

In addition, there is provided an arrangement in which the operation of dividing a predetermined amount of movement to progressively move the movable part toward a target position until the movable part completes the predetermined amount of movement and the operation of moving the movable part toward the target position by the predetermined amount of movement at a time are selectively executed according to the amount of movement of the movable part to be moved. Accordingly, even if the predetermined amount of movement is large, by dividing the predetermined amount of movement to progressively move the movable part, it is possible to prevent a vibration from occurring when the movable part is near the target position and eliminate the effect of such vibration on a focus voltage signal, whereby it is possible to prevent a malfunction during an autofocus operation or the like. In addition, since there is provided an arrangement in which the movable part can be forcedly moved at a time according to the amount of movement of the movable part, it is possible to prevent the movable part from moving past the predetermined amount, and it is also possible to move the movable part at a maximum speed within a range in which the motion of the movable part is not visible, on the picture of an image being picked up. Furthermore, if a linear motor is used as an actuator, it is possible to realize ultra-high-speed zooming as well as to reduce the size and weight the entire mechanism.

In addition, since there is provided an arrangement capable of varying the aforesaid predetermined speed according to the signal level or focus state of the focus voltage signal, it is possible to realize a smooth autofocus operation which is optimum for any subject.

In addition, there is provided an arrangement which, in a magnification varying (zooming) operation, predicts a position to be reached by a first lens group after a predetermined time period (for example, after one vertical synchronizing period), calculates an in-focus position of the movable part relative to the predicted position, and executes position control of the movable part so that the average moving speed of the moving part becomes a predetermined speed (for example, a predetermined compensation speed) in such a manner that the movable part gradually approaches the in-focus position during the predetermined time period in which the first lens group is moving. Accordingly, it is possible to prevent a phenomenon in which before the first lens group arrives at the predicted position in the predetermined time period, the movable part arrives at a focus correction position relative to the predicted position and defocusing becomes visible by an amount equivalent to the difference between the arrival times of the first lens group and the movable part. Accordingly, even in the case of lens position control using a linear motor, it is possible to realize comfortable autofocus and zooming operations by enabling pseudo speed control.

In addition, since there is provided an arrangement in which the aforesaid predetermined speed is made equivalent to the moving speed at which the movable part moves past the positional difference between the current position of the movable part and a position to be reached by the movable part after the predetermined time period, the movable part not only can maintain an in-focus state even after the predetermined time period, but also can continue to move at an average moving speed which enables the movable part to maintain an in-focus state according to the movement of the first lens group even within the predetermined time period in which the first lens group is moving.

In addition, there is provided an arrangement which, in the magnification varying (zooming) operation, during the operation (zooming operation) of predicting a position to be reached by the first lens group after the predetermined time period (for example, after one vertical synchronizing period) and obtaining an in-focus position of the movable part relative to the predicted position as a target position to be reached by the movable part after the predetermined time period, the moving speed of the first lens group can be reduced so that if the predicted position exceeds the movable range of the first lens group, the position of the first lens group after the predetermined time period becomes equivalent to an end position of the movable range. Accordingly, it is possible to inexpensively reduce defocusing when the first lens group reaches the end position (zoom end), without using a special circuit. Accordingly, even if lens position control is executed by using actuators having different response characteristics, such as a linear motor and a stepping motor, it is possible to realize a comfortable zooming operation by correcting a deviation between the response performances of the actuators.

In addition, since there is provided an arrangement in which when the magnification varying (zooming) operation stops due to the fact that the first lens group reaches the end position (zoom end) of the movable range, the movable part is forcedly moved at a high speed to an in-focus position relative to the stop position of the first lens group, whereby it is possible to prevent a photographer from noticing the occurrence of defocusing when the zooming operation stops. Accordingly, even if lens position control is executed by using actuators having different response characteristics, such as a linear motor and a stepping motor, it is possible to realize a comfortable zooming operation by correcting a deviation between the response performances of the actuators.

In addition, since there is provided an arrangement in which, in the magnification varying (zooming) operation, even in a system which performs position control of the first lens group, fine position control is executed to realize pseudo speed control, and in addition, the control cycle of fine position control of the movable part is made faster than the control cycle of position control of the first lens group when at least the position of the first lens group is in a predetermined range. Accordingly, since the movable part can be instantly stopped in an in-focus state when the first lens group abruptly stops at an arbitrary position, it is possible to prevent the occurrence of defocusing while realizing a smooth compensation operation or the like and improved image quality. Accordingly, even if lens position control is executed by using actuators having different response characteristics, such as a linear motor and a stepping motor, it is possible to realize a comfortable zooming operation by correcting a deviation between the response performances of the actuators.

In addition, in the above-described arrangement, since the aforesaid predetermined range is set to a long focal length range on a telephoto side, for example, a telephoto end at which the slope of a cam locus is sharp, the load on a lens control microcomputer can be reduced, whereby it is possible to realize a high-quality zooming operation without using an expensive microcomputer or the like.

In addition, since there is provided an arrangement in which a driving signal is updated and supplied to an actuator by a plurality of times during a predetermined time period so that the average moving speed of a movable part during the predetermined time period becomes a predetermined speed, it is possible to execute position control and pseudo speed control of the movable part at the same time. Accordingly, even in a lens position control system using a linear motor, it is possible to realize a smooth high-speed autofocus operation according to the shape and size of the hill of a focus signal. Accordingly, even if lens control position is executed with a linear motor, pseudo speed control is enabled so that comfortable autofocus and zooming operations can be realized.

In addition, if a linear motor is used as the actuator, it is possible to reduce ultra-high-speed zooming as well as to reduce the size and weight of the entire mechanism.

In addition, since there is provided an arrangement which extracts a predetermined focus signal which varies according to the state of focus, from an picked-up image signal obtained by picking up an image of a subject via image pickup means, and determines the state of focus, it is possible to realize a smooth autofocus operation which is optimum for any subject.

In addition, since there is provided an arrangement in which a target position is updated n times during a predetermined time period by the amount of movement, s/n, at a time with respect to the amount of movement, s, by which the movable part moves at a predetermined speed during the predetermined time period, the actual average moving speed of the movable part can be held at a uniform speed. Accordingly, it is possible to prevent a phenomenon which occurs during a hill-climbing operation or the like for focus adjustment, such as the phenomenon in which the movable part is driven at a high speed in accordance with the response characteristics of feedback loop, and when the movable part reaches the target position, the driving of the movable part is immediately stopped and the repetition of drive and stop appears on the picture of an image being picked up.

What is claimed is:

1. An image pickup apparatus comprising:
   a first lens group for performing a magnification varying operation;
   a second lens group for correcting a movement of a focal plane during a movement of said first lens group;
   driving device adapted to respectively drive said first lens group and said second lens group;
   storage device adapted to store, according to a subject distance, an in-focus position of said second lens group relative to a position of said first lens group;
   predicting device adapted to predict a destination position to be reached by said first lens group after a predetermined time according to a moving speed of said first lens group, during the magnification varying operation; and
   control device adapted to compute an in-focus position of said second lens group corresponding to the destination position of said first lens group and a moving speed of said first lens group, and controlling said driving device to drive said second lens group at the moving speed so as to reach an in-focus position after the predetermined time.

2. An image pickup apparatus comprising:
   a first lens group for performing a magnification varying operation;
   a second lens group for correcting a movement of a focal plane during a movement of said first lens group;
   driving device adapted to respectively drive said first lens group and said second lens group;
   storage device adapted to store, according to a subject distance, an in-focus position of said second lens group relative to a position of said first lens group;
   focus detecting device adapted to output a focus signal;
   predicting device adapted to predict a destination position to be reached by said first lens group after a predetermined time according to a moving speed of said first lens group, during the magnification varying operation; and
   control device adapted to compute an in-focus position of said second lens group corresponding to the destination position of said first lens group and a moving speed of said first lens group, and controlling said driving device to drive said second lens group at the moving speed so as to reach at the in-focus position after the predetermined time while varying the moving speed according to an increase or decrease in the focus signal.

3. An image pickup apparatus comprising:
   a first lens group for performing a magnification varying operation;
   a second lens group for correcting a movement of a focal plane during a movement of said first lens group;
   driving device adapted to respectively drive said first lens group and said second lens group;
   storage device adapted to store, according to a subject distance, an in-focus position of said second lens group relative to a position of said first lens group;
   predicting device adapted to predict a destination position to be reached by said first lens group after a predetermined time according to a moving speed of said lint lens group, during the magnification varying operation;
   calculating device adapted to find a correction position of said second lens group for correcting a movement of a focal position with respect to the destination position, according to information stored in said storage device; and
   control device adapted to control a position of said second lens group so that said second lens group reaches the correction position after the predetermined time.

4. An image pickup apparatus comprising;
   a first lens group for perforating a magnification varying operation;
   a second lens group for correcting a movement of a focal plane during a movement of said first lens group;
   driving device adapted to respectively drive said first lei[]s group and said second lens group;
   storage device adapted to store, according to a subject distance, an in-focus position of said second lens group relative to a position of said first lens group;
   focus detecting device adapted to output a focus signal;

predicting device adapted to predict a destination position to be reached by said first lens group after a predetermined time according to a moving speed of said first lens group, during the magnification varying operation;

calculating device adapted to find a correction position of said second lens group for correcting a movement of a focal position with respect to the destination position, according to information stored in said storage device;

correction position changing device adapted to change the correction position according to an increase or decrease in the focus signal; and control device adapted to control a position of said second lens group so that said second lens group reaches the correction position after the predetermined time.

5. An image pickup apparatus according to one of claims 1 to 4, wherein the predetermined time is substantially equivalent to one vertical synchronizing period.

6. An image pickup apparatus according to one of claims 1 to 4, wherein a stepping motor is used as said driving means.

7. An image pickup apparatus according to one of claims 1 to 4, wherein a linear motor is used as said driving means.

8. An image pickup method of picking up an image by using a first lens group for performing a magnification varying operation, a second lens group for correcting a movement of a focal plane during a movement of said first lens group, driving device adapted to respectively drive said first lens group and said second lens group, storage device adapted to store, according to a subject distance, an in-focus position of said second lens group relative to a position of said first lens group, said image pickup method comprising the steps of:

predicting a destination position to be reached by said first lens group after a predetermined time according to a moving speed of said first lens group, during the magnification varying operation; and computing an in-focus position of said second lens group corresponding to the destination position of said first lens group and a moving speed of said first lens group, and controlling said driving device to drive said second lens group at the moving speed so as to reach at the in-focus position after the predetermined time.

9. An image pickup method of picking up an image by using a first lens group for performing a magnification varying operation, a second lens group for correcting a movement of a focal plane during a movement of said first lens group, driving device adapted to respectively drive said first lens group and said second lens group, storage device adapted to store, according to a subject distance, an in-focus position of said second lens group relative to a position of said first lens group, and extracting device adapted to extract a focus signal from a signal of an image picked up by image pickup device, said image pickup method comprising the steps of:

predicting a destination position to be reached by said first lens group after a predetermined time according to a moving speed of said first lens group, dining the magnification varying operation; and computing an in-focus position of said second lens group corresponding to the destination position of said first lens group and a moving speed of said first lens group, and controlling said driving device to drive said second lens group at the moving speed so as to reach at the in-focus position after the predetermined time while varying the moving speed according to an increase or decrease in the focus signal.

10. An image pickup method of picking up an image by using a first lens group for performing a magnification varying operation, a second lens group for correcting a movement of a focal plane during a movement of said first lens group, driving device adapted to respectively drive said first lens group and said second lens group, storage device adapted to store, according to a subject distance, an in-focus position of said second lens group relative to a position of said first lens group, said image pickup method comprising the steps of:

predicting a destination position to be reached by said first lens group after a predetermined time period according to a moving speed of said first lens group, during the magnification varying operation, finding a correction position of said second lens group for correcting a movement of a focal position with respect to the destination position, according to the information stored in said storage device; and controlling a position of said second lens group so that said second lens group reaches the correction position after the predetermined time.

11. An image pickup method of picking up an image by using a first lens group for performing a magnification varying operation, a second lens group for correcting a movement of a focal plane during a movement of said first lens group, driving device adapted to respectively drive said first lens group and said second lens group, storage device adapted to store, according to a subject distance, an in-focus position of said second lens group relative to a position of said first lens group, and extracting device adapted to extract a focus signal from a signal of an image picked up by image pickup, said image pickup method comprising the steps of:

predicting a destination position to be reached by said first lens group after a predetermined time according to a moving speed of said first lens group, during the magnification varying operation, finding a correction position of said second lens group for correcting a movement of a focal position with respect to the destination position, according to the information stored in said storage device;

changing the correction position according to an increase or decrease in the focus signal; and controlling a position of said second lens group so that said second lens group reaches the changed correction position after the predetermined time.

12. An image pickup method according to one of claims 8 to 11, wherein the predetermined is substantially equivalent to one vertical synchronizing period.

13. An image pickup method according to one of claims 8 to 11, wherein a stepping motor is used as a driving device.

14. An image pickup method according to one of claims 8 to 11, wherein a linear motor is used as said driving device.

15. An image pickup apparatus comprising;

a first lens group for performing a magnification varying operation;

a second lens group for correcting a movement of a focal plane during a movement of said first lens group;

detecting device adapted to detect a position of said second lens group;

driving device adapted to drive said second lens group by supplying a driving signal to an actuator for moving said second lens group along an optical axis;

storage device adapted to store, according to a subject distance, an in-focus position of said second lens group relative to a position of said first lens group;

predicting device adapted to predict a destination position to be reached by said first lens group after a predetermined time according to a moving speed of said first lens group, during the magnification varying operation;

calculating device adapted to calculate a correction position of said second lens group for correcting a movement of a focal position with respect to the destination position predicted by said predicting device according to information stored in said storage device; and position control device adapted to perform position control of said second lens group so that, after the predetermined time, said second lens group reaches the correction position calculated by said calculating device, wherein said position control device controls a movement of said second lens group so that an average moving speed of said second lens group during the predetermined time becomes a predetermined speed.

16. An image pickup apparatus according to claim 15, wherein the predetermined speed is substantially equivalent to a speed at which said second lens group moves past a positional difference between a current position of said second lens group and the correction position calculated by said calculating device, within the predetermined time.

17. An image pickup apparatus comprising:

a first lens group for performing a magnification varying operation;

first driving device adapted to move said first lens group;

a second lens group for correcting a movement of a focal plane during a movement of said first lens group;

detecting device adapted to detect a position of said second lens group;

second driving device adapted to drive said second lens group by supplying a driving signal to an actuator for moving said second lens group along an optical axis;

storage device adapted to store, according to a subject distance, an in-focus position of said second lens group relative to a position of said first lens group;

predicting device adapted to predict a destination position to be reached by said first lens group after a predetermined time according to a moving speed of said first lens group, during the magnification varying operation;

calculating device adapted to calculate a correction position of said second lens group for correcting a movement of a focal position with respect to the destination position predicted by said predicting:device according to information stored in said storage device; and position control device adapted to perform position control of said second lens group so that, after the predetermined time, said second lens group reaches the correction position calculated by said calculating device, a moving speed of said first lens group being controlled so that a position to be reached by said first lens group after the predetermined time becomes coincident with an end position of a movable range of said first lens group if the destination position predicted by said predicting device exceeds the end position.

18. An image pickup apparatus comprising:

a first lens group fir performing a magnification varying operation;

first driving device adapted to move said first lens group;

a second lens group for correcting a movement of a focal plane during a movement of said first lens group;

detecting device adapted to detect a position of said second lens group;

second driving device adapted to drive said second lens group by supplying a driving signal to an actuator for moving said second lens group along an optical axis;

storage device adapted to store, according to a subject distance, an in-focus position of said second lens group relative to a position of said first lens group;

predicting device adapted to predict an in-focus position corresponding to a predicted position of said first lens group to be reached after a predetermined time;

control device adapted to perform position control of said second lens group for correcting a movement of a focal position due to a variation in position of said first lens group during the magnification varying operation, according to information stored in said storage device, said second lens group moved a position corresponding to the predicted position of said first lens group and forcedly moved to an in-focus position relative to a stop position of said first lens group at the instant when the magnification varying operation stops.

19. An image pickup apparatus comprising:

a first lens group for performing a magnification varying operation;

a second lens group for correcting a movement of a focal plane during the magnification varying operation;

a first actuator for performing position control of said first lens group to move said first lens group along an optical axis;

a second actuator for performing position control of said second lens group to move said second lens group along the optical axis so as to reach an in-focus position when the magnification varying operation is completed by executing a computation of the position of said second lens group on the basis of the positions of said first and second lens groups, wherein the computation cycle of said second lens group being made shorter than a position control cycle of said first lens group located at least in a predetermined area.

20. An image pickup apparatus according to claim 19, wherein the predetermined area is a long focal length area on a telephoto side.

21. A method of controlling an image pickup apparatus, comprising the steps of:

causing an actuator to move a second lens group for correcting a movement of a focal plane during a movement of a first lens group for performing magnification varying operation;

predicting a destination position to be reached by said first lens group after a predetermined time according to a moving speed of said first lens group during the magnification varying operation; and calculating a correction position of said second lens group for correcting a movement of a focal position with respect to the predicted destination position of said first lens group, by means of a memory which stores an in-focus position of said second lens group relative to a position of said first lens group according to a subject distance, and performing position control of said second lens group so that, after the predetermined time, said second lens group reaches the calculated correction position, a movement of said second lens group being controlled so that an average moving speed of said second lens group during the predetermined time becomes a predetermined speed.

22. A method of controlling an image pickup apparatus according to claim 21, wherein the predetermined speed is substantially equivalent to a speed at which said second lens group moves past a positional difference between a current position of said second lens group and the correction position within the predetermined time.

23. A method of controlling an image pickup apparatus, comprising the steps of:

causing an actuator to move a second lens group for correcting a movement of a focal plane during a movement of a first lens group for performing a magnification varying operation;

predicting a destination position to be reached by said first lens group after a predetermined time according to a moving speed of said first lens group during the magnification varying operation; and calculating a correction position of said second lens group for correcting a movement of a focal position with respect to the predicted destination position of said first lens group, by means of a memory which stores an in-focus position of said second lens group relative to a position of said first lens group according to a subject distance, and performing position control of said second lens group so that, after the predetermined time, said second lens group reaches the calculated correction position, a moving speed of said first lens group being controlled so that a position to be reached by said first lens group after the predetermined time becomes coincident with an end position of a movable range of said first lens group if the predicted destination position exceeds the end position.

24. A method of controlling an image pickup apparatus, comprising the steps of:

causing an actuator to mow a second lens group for correcting a movement of a focal plane during a movement of a first lens group for performing a magnification varying operation;

predicting a destination position to be reached by said first lens group after a predetermined time according to a moving speed of said first lens group during the magnification varying operation; and calculating a correction position of said second lens group for correcting a movement of a focal position with respect to the predicted destination position of said first lens group, by means of a memory which stores an in-focus position of said second lens group relative to a position of said first lens group according to a subject distance, and performing position control of said second lens group so that, after the predetermined time, said second lens group reaches the calculated correction position, said second lens group being moved a position corresponding to the predicted position of said first lens group and forcedly moved to an in-focus position relative to a stop position of said first lens group at the instant when the magnification varying operation stops.

25. A method of controlling an image pickup apparatus which performs position control of a first lens group for performing a magnification varying operation and a second lens group for correcting a movement of a focal plane dining the magnification varying operation, comprising the steps of:

performing position control of said first lens group by a first actuator to move said first lens group along an optical axis;

performing a position control of said second lens group by a second actuator to move said second lens group along the optical axis so as to reach an in-focus position when the magnification varying operation is completed by executing a computation of the position of said second lens group on the basis of the positions of said first and second lens groups; and performing the computation cycle of said second lens group being made shorter than a position control cycle of said first lens group located at least in a predetermined area.

26. A method of controlling an image pickup apparatus according to claim 25, wherein the predetermined area is a long focal length area on a telephoto side.

* * * * *

UNITED STATES PATENT AND TRADEMARK OFFICE
CERTIFICATE OF CORRECTION

PATENT NO. : 6,577,343 B2
DATED : June 10, 2003
INVENTOR(S) : Hiroto Ohkawara

It is certified that error appears in the above-identified patent and that said Letters Patent is hereby corrected as shown below:

Column 12,
Line 11, delete "AID" and insert -- A/D --.

Column 16,
Line 33, delete "8" and insert -- δ --.

Column 25,
Line 50, delete "reduce" and insert -- reduce. --.
Line 50, insert a new paragraph before "In contrast,".

Column 66,
Line 46, delete "lint" and insert -- first --.

Column 67,
Line 58, delete "dining" and insert -- during --.

Column 68,
Line 48, delete "predetermined is" and insert -- predetermined time is --.

Column 71,
Line 36, delete "mow" and insert -- move --.

Column 72,
Line 21, delete "dining" and insert -- during --.

Signed and Sealed this

Twenty-eighth Day of October, 2003

JAMES E. ROGAN
*Director of the United States Patent and Trademark Office*